US009645811B2

(12) United States Patent
Carlen et al.

(10) Patent No.: US 9,645,811 B2
(45) Date of Patent: May 9, 2017

(54) FAULT TOLERANCE FOR A DISTRIBUTED COMPUTING SYSTEM

(71) Applicant: OC Acquisition LLC, Redwood City, CA (US)

(72) Inventors: Devin Carlen, Seattle, WA (US); Joe Heck, Seattle, WA (US); Mike Szilagyi, Seattle, WA (US); Mark Guis, Seattle, WA (US); Ken Caruso, Seattle, WA (US); Yona Benjamin Mankin, Cupertino, CA (US)

(73) Assignee: OC Acquisition LLC, Redwood Shores, CA (US)

( * ) Notice: Subject to any disclaimer, the term of this patent is extended or adjusted under 35 U.S.C. 154(b) by 318 days.

(21) Appl. No.: 14/242,655

(22) Filed: Apr. 1, 2014

(65) Prior Publication Data

US 2014/0298091 A1    Oct. 2, 2014

Related U.S. Application Data

(60) Provisional application No. 61/807,308, filed on Apr. 1, 2013.

(51) Int. Cl.
*G06F 11/00*    (2006.01)
*G06F 9/445*    (2006.01)
(Continued)

(52) U.S. Cl.
CPC .................. *G06F 8/65* (2013.01); *G06F 9/54* (2013.01); *G06F 11/0793* (2013.01);
(Continued)

(58) Field of Classification Search
CPC ............... G06F 11/0793; G06F 11/079; G06F 11/0709; G06F 9/54; G06F 8/65;
(Continued)

(56) References Cited

U.S. PATENT DOCUMENTS 6,529,966 B1    3/2003    Willman et al.
6,535,924 B1    3/2003    Kwok et al.
(Continued)

FOREIGN PATENT DOCUMENTS

WO    2014165538 A2    10/2014

OTHER PUBLICATIONS

U.S. Appl. No. 14/242,586, filed Apr. 1, 2014.
(Continued)

*Primary Examiner* — Yair Leibovich
(74) *Attorney, Agent, or Firm* — Precision IP

(57) ABSTRACT

In one embodiment, a method detects a failure of a container in a controller node where the container includes a service being performed and isolated from other services being performed in other containers on the controller node. The controller node terminates the container including the service and determines a known state for the service. The known state is known to be operational without including a cause of the failure and the service operated from the known state saving changes to the known state during operation separately from the known state. The controller node restarts the service in a new container that replaces the terminated container where the restarted service starts from the known state without using the changes.

16 Claims, 23 Drawing Sheets

(51) Int. Cl.
*G06F 11/07* (2006.01)
*H04L 29/06* (2006.01)
*H04L 29/08* (2006.01)
*G06F 9/54* (2006.01)
*H04L 29/14* (2006.01)

(52) U.S. Cl.
CPC .............. *H04L 65/80* (2013.01); *H04L 67/10* (2013.01); *H04L 67/34* (2013.01); *H04L 69/40* (2013.01); *G06F 11/0709* (2013.01); *G06F 11/079* (2013.01)

(58) Field of Classification Search
CPC ......... H04L 67/10; H04L 65/80; H04L 69/40; H04L 67/34
USPC .......................................................... 714/15
See application file for complete search history.

(56) References Cited

U.S. PATENT DOCUMENTS

| | | | |
|---|---|---|---|
| 6,647,510 B1 * | 11/2003 | Ganesh | ............... G06F 11/1474 714/16 |
| 6,665,731 B1 | 12/2003 | Kumar et al. | |
| 6,959,320 B2 | 10/2005 | Shah et al. | |
| 7,421,578 B1 | 9/2008 | Huang et al. | |
| 7,458,073 B1 | 11/2008 | Darling et al. | |
| 7,516,206 B2 | 4/2009 | Henseler et al. | |
| 7,584,467 B2 | 9/2009 | Wickham et al. | |
| 7,676,803 B2 | 3/2010 | Zhao et al. | |
| 7,743,372 B2 | 6/2010 | Armstrong et al. | |
| 7,757,228 B1 | 7/2010 | Eatough et al. | |
| 7,805,719 B2 | 9/2010 | O'Neill | |
| 7,996,829 B2 | 8/2011 | Depew et al. | |
| 8,151,021 B1 | 4/2012 | Glade et al. | |
| 8,261,256 B1 | 9/2012 | Adler et al. | |
| 8,266,615 B2 | 9/2012 | Shapiro | |
| 8,387,037 B2 | 2/2013 | Henseler et al. | |
| 8,464,241 B2 | 6/2013 | Hayton | |
| 8,527,979 B2 | 9/2013 | Wookey | |
| 8,533,704 B2 | 9/2013 | Wookey | |
| 8,555,273 B1 | 10/2013 | Chia et al. | |
| 8,584,113 B2 | 11/2013 | McCurdy et al. | |
| 8,620,851 B2 * | 12/2013 | Brown | ................... G06N 5/048 706/52 |
| 8,788,569 B2 | 7/2014 | Griffiths et al. | |
| 8,924,950 B2 | 12/2014 | McDonald et al. | |
| 8,924,952 B1 | 12/2014 | Hou | |
| 8,972,974 B2 | 3/2015 | McCurdy et al. | |
| 9,146,829 B1 * | 9/2015 | Allen | .................. G06F 11/3612 |
| 9,148,465 B2 | 9/2015 | Gambardella et al. | |
| 9,298,788 B1 * | 3/2016 | Kekre | ............... G06F 17/30569 |
| 2003/0187883 A1 | 10/2003 | Zelenka et al. | |
| 2004/0029638 A1 | 2/2004 | Hytcheson et al. | |
| 2004/0205101 A1 * | 10/2004 | Radhakrishnan | ..... G06F 9/5016 709/200 |
| 2004/0237081 A1 | 11/2004 | Homiller | |
| 2005/0132356 A1 | 6/2005 | Cross et al. | |
| 2005/0198359 A1 | 9/2005 | Basani et al. | |
| 2006/0055951 A1 | 3/2006 | Edmonds | |
| 2006/0101372 A1 | 5/2006 | Zhuo et al. | |
| 2006/0294413 A1 | 12/2006 | Filz et al. | |
| 2008/0307215 A1 | 12/2008 | Willems | |
| 2009/0307475 A1 | 12/2009 | Fried | |
| 2010/0185893 A1 | 7/2010 | Wang et al. | |
| 2011/0231833 A1 | 9/2011 | Narayanan et al. | |
| 2012/0203823 A1 | 8/2012 | Manglik et al. | |
| 2012/0222037 A1 | 8/2012 | Labat et al. | |
| 2012/0311002 A1 | 12/2012 | Akagawa et al. | |
| 2013/0212212 A1 | 8/2013 | Addepalli et al. | |
| 2013/0268932 A1 * | 10/2013 | Park | ................... G06F 9/45533 718/1 |
| 2013/0298242 A1 | 11/2013 | Kumar et al. | |
| 2014/0146055 A1 | 5/2014 | Bala et al. | |
| 2014/0280814 A1 | 9/2014 | Maity et al. | |
| 2014/0304398 A1 | 10/2014 | Carlen et al. | |
| 2014/0304695 A1 | 10/2014 | Gambardella et al. | |
| 2014/0304718 A1 | 10/2014 | Gambardella et al. | |
| 2016/0019053 A1 | 1/2016 | Gambardella et al. | |

OTHER PUBLICATIONS

International Search Report (from a corresponding foreign application), PCT/US2014/032571, mailed Sep. 22, 2014.
Freed, Andrew R., "Step by step how-to on integrating your application with IBM Tivoli Monitoring 6.1", IBM developerWorks, Jun. 28, 2007, 16 pages.

* cited by examiner

*/orchestration/controllers/2*            Controller Node State

{"status": "online",
"ip_addresses":
    {"data_net": "172.20.2.1",
     "switch_net": null,
     "pxe_net": 192.168.1.1,
     "mgmt_net": "172.17.2.1"},
"mac_address": "00:0e:1e:0e:08:88",
"controller_num": 2}

*/orchestration/nodes/1-00:8c:fa:10:b9:60*      Physical Node State

| Field | Value |
|---|---|
| "hw_addr_list": | ["00:8c:fa:10:b9:60", "00:8c:fa:10:b9:61"], |
| "last_detected": | 1362424474.728476, |
| "external_ip": | "10.130.56.25", |
| "ip_addresses": | {"data_net": "172.21.1.2", "mgmt_net": "172.18.1.2"}, |
| "memory": | 98304, |
| "port_num": | 2, |
| "state": | "online", |
| "node_type": | "computenode", |
| "last_installed": | 1362579334.307778, |
| "fail_count": | 0, |
| "mac_address": | "00:8c:fa:10:b9:60", |
| "lvm_configured": | true, |
| "cores": | 16, |
| "disk_space": | 0, |
| "controller_num": | 1 |

*/orchestration/containers/haproxy-1*      Container State

| Field | Value |
|---|---|
| {"status": | "online", |
| "controller_num": | 1, |
| "external_ip": | "10.130.56.8", |
| "state": | "running", |
| "fail_count": | 0, |
| "last_created_at": | "2013-03-04T18:54:12.698721", |
| "container_name": | "haproxy", |
| "last_seen": | 1362585509.382685, |
| "netmask": | "255.252.0.0", |
| "gateway": | "172.17.0.1", |
| "container_ip": | "172.17.1.80"} |

FIG. 12C

/orchestration/presence/controller/1-00:0e:1e:0e:08:c8

{"mac_address":     "00:0e:1e:0e:08:c8",
"ip_address":      "172.17.1.1",
"orchestration_type": "controller",
"controller_num":  1}

Presence State (Controller nodes)

/orchestration/presence/node/2-00:8c:fa:10:b7:90

{"mac_address":     "00:8c:fa:10:b7:90",
"ip_address":      "172.18.2.10",
"orchestration_type": "node",
"controller_num":  2}

Presence State (Physical Nodes)

/orchestration/presence/container/3-c2:7c:73:37:7e:61-rabbitmq

{"mac_address":     "c2:7c:73:37:7e:61",
"ip_address":      "172.17.3.20",
"orchestration_type": "container",
"controller_num":  3}

Presence State (Containers)

FIG. 12D

/orchestration/zone/election          Orchestration Zone Election

_c_60855840-7d0e-4426-8953-fae43d415760-lock-0000000000
    _c_898a913b-72ec-46f1-924f-d15453aa6fa1-lock-0000000013
    _c_41c9d9ac-80be-4921-bcb0-ceef3caeeedb-lock-0000000012

/orchestration/services/dnspublic/election          Orchestration DNSPublic Service Election

_c_1ebf44fd-a361-4ba9-b390-84d4d9c1c927-lock-0000000020
    _c_1df5ce5f-d1fb-4a68-ab50-ccec5c05a25c-lock-0000000022
    _c_71fdcd3d-f56a-4ae4-966b-d697109f5dfe-lock-0000000000

/orchestration/services/mysql/election          Orchestration MySQL Service Election

_c_65bcdac2-8382-4391-b016-d9ec951f2971-lock-0000000000
    _c_6c615ffe-4fd1-400b-a851-768dde763e82-lock-0000000014

FIG. 12E

| /orchestration/zone | Orchestration Zone state |
|---|---|

```
{"zone_ip":              "172.17.0.150",
"upgradeip":             "10.130.61.6",
"external_tls":          false,
"current_version":       "13.1-0nebula0",
"netmask":               "255.252.0.0",
"gateway":               "172.17.0.1",
"customer_config":
        {"guest_net_range":              "10.130.60.0/24",
        "diagnostics_storage_folder":    "lab11",
        "customer_domain":               "env11.mview.int.nebula.com",
        "diagnostics_storage_bucket":    "nebula-diagnostics-internal",
        "guest_net_gateway":             "10.130.60.1",
        "external_netmask":              "255.255.255.0",
        "customer_smtp_host":            "orchestra.mview.nebula.com",
        "customer_syslog_host_udp":      ["10.128.11.149"],
        "customer_dns_host":             ["10.146.8.7", "10.130.10.22"],
        "customer_ntp_host":             ["10.130.10.45"],
        "external_gateway":              "10.130.61.1",
        "admin_user":                    "admin",
        "upload_diagnostics":            true,
        "diagnostics_storage_key":       "Ik/huLPzzvPgiGplieYhY2Q5x+99dy9RU6Jws2q6",
        "customer_snmp_public":          "nebula",
        "diagnostics_storage_identity":  "AKIAIXRWURCOVKYAJT2A",
        "external_ip_range":             ["10.130.61.5", "10.130.61.255"],
        "admin_email":                   "",
        "alexandria_replication_factor": 3,
        "public_dns_ip":                 "10.130.61.5",
        "admin_password":                "secrete"}
}
```

FIG. 12F

FAULT TOLERANCE FOR A DISTRIBUTED COMPUTING SYSTEM

CROSS REFERENCE TO RELATED APPLICATIONS

The present disclosure claims priority to U.S. Provisional App. No. 61/807,308, entitled "Systems and Methods for Distributed Computing", filed Apr. 1, 2013, the contents of which is incorporated herein by reference in its entirety.

BACKGROUND

Unless otherwise indicated herein, the approaches described in this section are not prior art to the claims in this application and are not admitted to be prior art by inclusion in this section.

Failures within a computing system inevitably result. It is important for the system to recover from the failure in a timely manner. Typically, to recover from the failure, the failure must be detected and then evaluated. This involves first identifying the failure, which may involve matching the failure to a known state of a failure. This process may be difficult in itself. Then, once the failure is identified, the system needs to recover from the failure. This may involve determining any possible remedies for the known effects of the failure, and then recovering from the known effects. Even if the failure can be identified, there is no guarantee the remedy may resolve the failure. Recovering from the failure may take an indeterminate amount of time due to the uncertainty of identifying the failure and then applying the remedy. This is all time in which the computing system is down and not functioning. The down time may be even longer if the system cannot identify the failure. In this case, a technician may need to be called to debug and remedy the failure.

SUMMARY

In one embodiment, a method detects a failure of a container in a controller node where the container includes a service being performed and isolated from other services being performed in other containers on the controller node. The controller node terminates the container including the service and determines a known state for the service. The known state is known to be operational without including a cause of the failure and the service operated from the known state saving changes to the known state during operation separately from the known state. The controller node restarts the service in a new container that replaces the terminated container where the restarted service starts from the known state without using the changes.

In one embodiment, an apparatus includes: one or more computer processors; and a non-transitory computer-readable storage medium comprising instructions, that when executed, control the one or more computer processors to be configured for: detecting a failure of a container in a controller node, the container including a service being performed and isolated from other services being performed in other containers on the controller node; terminating, by the controller node, the container including the service; determining, by the controller node, a known state for the service, wherein the known state is known to be operational without including a cause of the failure, and wherein the service operated from the known state saving changes to the known state during operation separately from the known state; restarting, by the controller node, the service in a new container that replaces the terminated container, wherein the restarted service starts from the known state without using the changes.

In one embodiment, a non-transitory computer-readable storage medium contains instructions, that when executed, control a computer system to be configured for: detecting a failure of a container in a controller node, the container including a service being performed and isolated from other services being performed in other containers on the controller node; termininating, by the controller node, the container including the service; determining, by the controller node, a known state for the service, wherein the known state is known to be operational without including a cause of the failure, wherein the service operated from the known state saving changes to the known state during operation separately from the known state; restarting, by the controller node, the service in a new container that replaces the terminated container, wherein the restarted service starts from the known state without using the changes.

The following detailed description and accompanying drawings provide a better understanding of the nature and advantages of particular embodiments.

BRIEF DESCRIPTION OF THE DRAWINGS

FIG. 12C shows a naming scheme for the other system service containers.

FIG. 12D shows three examples of the presence state information registered on behalf of a controller node, a physical node, and a container when a presence service is configured in census mode according to one embodiment FIG. 12E shows the data objects for the orchestration service zone controller node as children in the path /orchestration/zone/election in the blackboard service according to one embodiment FIG. 12F shows state information for the /orchestration/zone data object in the blackboard service.

DETAILED DESCRIPTION

Figure 1:
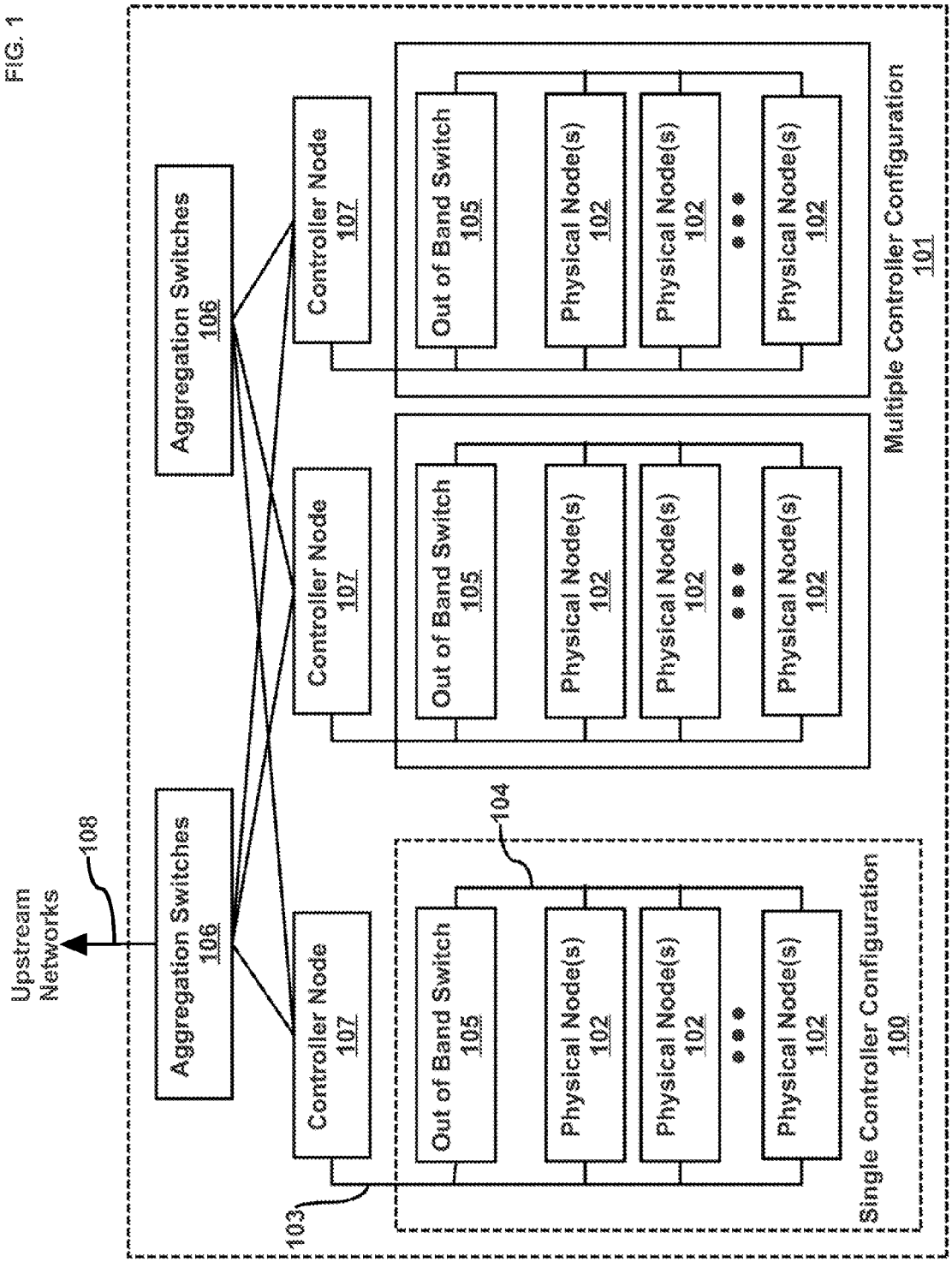
FIG. 1 depicts an example of a distributed computing system according to one embodiment.

Described herein are techniques for a distributed computing system for performing fault tolerance. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

System Overview

Features and advantages of numerous aspects and embodiments of the present disclosure are described with reference to particular example embodiments of a distributed computing system that may be used for cloud computing, referred to herein as a distributed computing system. The distributed computing system may be advantageously used in a cloud computing application, for example. In certain embodiments of the distributed computing system, an orchestration service may be responsible for creating and maintaining a cohesive and unified system that appears as a single system to a user, despite failures of both hardware and software, and for coordinating the execution and management of all system services and ensuring their availability. Features of an orchestration service may be advantageous in managing and running a distributed computing system, for example.

In one example embodiment, a distributed computing architecture is decentralized, and may include a zone, a controller node, a physical node, and a service container. Each controller node, physical node, and service container may run an instance of the orchestration service, which collectively implements the overall distributed computing system service. This loosely coupled collection of orchestration servers is organized in a manner that decentralizes the overall management of a zone, and may require little direct communication between servers, for example.

In one example embodiment, a distributed computing system is a turnkey Infrastructure-as-a-Service (IaaS) product that provides on-demand allocation of virtual machines (VMs), virtualized networking, and virtualized data storage, the key functionalities for a cloud computing environment in a private data center. In another example embodiment, the IaaS product provides on-demand allocation of physical computing resources without virtualization, including networking configuration and physical storage. In one example embodiment, a distributed computing system is a large distributed system, implemented as a hierarchical collection of physical nodes (e.g., servers) and controller nodes that communicate over a common network fabric and presents the appearance of a single large system with large quantities of compute power, storage capacity, and bandwidth.

In one example distributed computing hardware architecture, the server nodes, called physical nodes, are organized typically by racks into separate communication domains, each of which is controlled by a controller node, a specialized hardware, which is unique to a distributed computing system. All physical nodes and controller nodes may be connected by cable directly to their rack's controller node. In multi controller configurations, the controller nodes communicate over a common aggregation switch to weave all the controller nodes into a cloud fabric.

In the distributed computing software architecture, the distributed computing software is deployed as a set of system services in the hardware, running on the physical nodes and on the controller nodes. These services work together to implement the crucial functions expected of a cloud infrastructure, as well as to ensure that the infrastructure itself provides uninterrupted service in spite of failures anywhere in the system. The system services are structured into a logical hierarchy that separates responsibilities at different levels of granularity in the system and maps into underlying hardware organization.

Example Hardware Architecture

FIG. 1 depicts an example of a distributed computing system according to one embodiment. Distributed computing system may be organized around a controller node 107, with arrangements in either single controller configuration 100 or multi controller node configuration 101. The single controller configuration is a distributed computing system with a single controller and the multi controller node configuration is a distributed computing system with multiple controllers.

In each configuration, controller node 107 may be connected to one or more physical nodes 102 by a connection, such as a combined data and out of band management cable, hereinafter referred to as the cloud cable, or, if a cloud cable is not used, other compatible primary network cables 103 in conjunction with a separate out of band management network cable 104. The compatible primary network cables 103 and out of band management network cables 104 can include various types of conventional communication wires, such as CAT5e twisted pairs, CAT6 twisted pairs, and coaxial cable, for communication over Ethernet or other similar networking protocols. The network cables can also include fiber-optic bundles for communication over various optical network communication protocols. In one example embodiment, multi controller node configurations 101 of more than two controller nodes where over half of the controller nodes are available provide high availability of the distributed computing orchestration services and related cloud computing services. Each controller node in multi controller node configurations is connected to one or more physical nodes 102 by means of cloud cable or other compatible network cable 103.

Controller nodes 107 may communicate with each other via a connection. For example, each controller node 107 in a multi controller node configuration 101 may be attached to a separate out of band management switch 105. In such multi controller node configurations 101, controller nodes 107 are connected to one or more aggregation switches 106.

Aggregation switches 106 interconnect controller nodes 107 in multi controller configurations 101, permitting communication between the controller nodes 107.

Controller Node Configuration

Figure 2A:
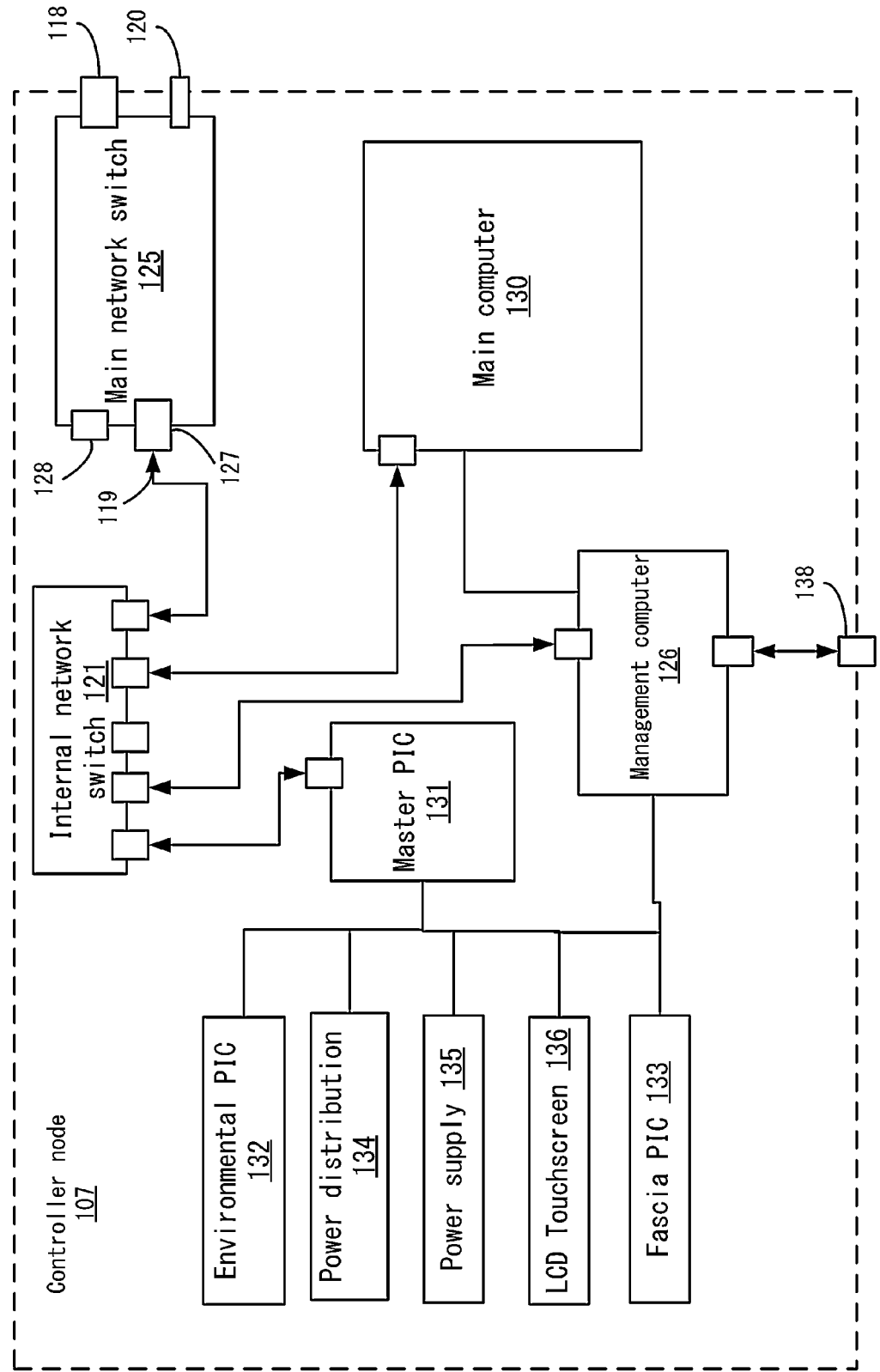
FIG. 2A illustrates an example controller node according to one embodiment.

FIG. 2A illustrates an example controller node 107 according to one embodiment. For example, a main network switch 125 in FIG. 2A on each controller node 107 may have one or more connections to aggregate switch 106. Aggregate switches 106 allow controller nodes 107 to connect with a large number of other controller nodes without requiring a large number of network connection ports on each controller node to be used for interconnection between each of controller nodes 107, for example. If controller nodes 107 attach to each of the other controller nodes 107 in a multi controller system, multiple network interfaces would need to be used, which may limit the number of available interfaces for interconnection with physical nodes. When used, aggregation switches 106 interconnect with upstream networks 108, providing communication between the distributed computing system and upstream networks.

Controller node 107 is an advantageous component of the distributed computing system to control orchestration functions and cloud services, including the provisioning and configuration of physical nodes 102. For example, when physical nodes 102 are attached to a controller node 107, controller node 107 exercises control over the physical node's basic power state and, in some embodiments, the physical node's boot order. Physical nodes 102 are configured to either seek boot images over their network interfaces or are configured to do so by the controller node. The physical node 102 then obtains its boot image from the controller node 107 which contains start up instructions that establish communication with the controller node such that the physical node is configured and included in the distributed computing resource pool. From there, controller node 107 may issue workloads to physical node 102 and physical node 102 will process the workloads, providing cloud services. In some embodiments, controller node 107 is a rack-mounted device of chassis dimensions substantially similar to typical rack-mounted server computers, including those attached to controller nodes as physical nodes 102. Rack-mounted embodiments of the controller node 107 include 4U, 2U, and 1U physical dimensions where a U is a rack unit of standard dimension, typically 1.75" high, 19" wide, and variable depth.

Referring to FIG. 2A, one example controller node 107 may be comprised of an main network switch 125; a main computer 130 (e.g., including its own central processing unit, storage, and memory (not shown)); an internal network switch 121; one or more microcontrollers (e.g., master microcontroller 131 described in more detail below), one or more internal communication and management networks; fault tolerant power supply 135 and distribution 134; management computer 126; environmental subsystem 132; one or more universal serial bus hubs; and physical administration interface 136 (e.g., an LCD touchscreen). Although main network switch 125 is shown as being included in controller node 107, main network switch 125 may be external to controller node 107. In this case, controller node 107 would communicate with main network switch 125 through an interface.

In one example, main network switch 125 is the interface by which the controller node 107 communicates with, provisions, and/or manages attached physical nodes 102, communicates with one or more aggregation switches 106, communicates with one or more out of band management switches 105 if a cloud cable is not used, communicates with one or more other controller nodes 107 (e.g., through aggregate switches), as well as the interface by which the attached physical nodes 102 communicate with one another. The resultant network is one example of what may be referred to as a cloud fabric. In one example, the interfaces on the main network switch 125 comprise one or more primary network interfaces 118, one or more management network interfaces 119, one or more serial management interfaces, and one or more universal serial bus interfaces 120.

Primary network interfaces 118 on the main network switch 125 form the network pathways between the controller node 107 and physical nodes 102 carrying the majority of traffic between the devices, including orchestration, cloud service, and client traffic. Example implementations of the primary network interfaces 118 may include RJ-45, small form-factor pluggable, quad small form-factor pluggable, or other network interface. Controller node 107 attaches to physical nodes 102 by means of one or more cloud cable or one or more compatible network cable 103 through the main network switch 125. When more than one cloud cable or compatible network cable is utilized to attach a physical node 102 to controller node 107, such connections may be combined or bonded for either redundancy or increased throughput where the effective base network throughput between controller node 107 and physical node 102 is multiplied by the number of such additional connections. This method of channel bonding permits high throughput configurations. In some embodiments, the primary network interfaces 118 on the controller node's main network switch 125 are configured to utilize an inter-integrated circuit communication protocol management ("I2C") bus present in the cloud cable. This configuration permits primary network traffic, inter-integrated circuit communication protocol management traffic, and inter-integrated circuit communication protocol system traffic to transit through any primary network interface 118 on the main network switch 125 to the attached physical nodes 102. Inter-integrated circuit communication protocol management traffic comprises distributed computing-specific traffic to the physical node, including control messages, management sessions, and other configuration and management data. Inter-integrated circuit communication protocol system traffic comprises messages normally issued in the course of initialization and operation of a network switch when attached to network cables capable of responding to data inquires, including manufacturer data, cable length, and connection status. When a cloud cable is used and attached to a cloud card in physical node 102, two effective network connections are established over a single physical link. In other embodiments, a separate out of band management network is created by attaching the main network switch 125 to a physically separate out of band management switch 105. Out of band management networks are used to communicate basic instructions such as turn on, turn off, change configuration, change boot order, and load operating system, for example, from a controller node 107 to an internal processor in each physical node 102 (e.g., a baseboard management controller chip operating according to the intelligent platform management interface protocol). In such embodiments, physical nodes 102 attached to controller node 107 by primary compatible network cable may also be connected to the separate out of band management switch, forming a secondary data network between controller node 107 and attached physical nodes 102. The out of band management switch 105 attaches to out of band management ports on the physical nodes 102, permitting controller node 107 to issue configuration and control messages to physical nodes 102 by means of an intelligent platform management interface. This out of band management data network is advantageous in communicating with, configuring, and provisioning physical nodes 102 when such physical node's primary network interface is not configured or not functional, such as when there is no operating system on physical node 102 or any operating system on physical node 102 is misconfigured, damaged, or otherwise in a degraded state which impacts the operation of the primary network interface.

The management network interfaces 119 on the main network switch 125 are coupled to management computer 126 through the controller node's internal network switch 121. In one example, management computer 126 uses interfaces 119 to establish administrative access to main network switch 125 and configure main network switch 125 it for use in the distributed computing system, including, virtual network configuration, routing configuration, network interface configuration, and other processes and configurations advantageous to rendering cloud computing services. Some main network switches 125 expose the management network interfaces 119 in-line with, or offset from but facing in the same direction as, the primary network interfaces 118 making them physical accessible from outside the controller node chassis. In some embodiments, such physical in-line management network interfaces 119 are disabled, and the corresponding logical interfaces on main network switch 125 are redirected to inward facing interfaces. In other embodiments, such physical in-line management network interfaces 119 are additional and subordinate to internal secondary management interfaces.

Management network interfaces 119 may take the form of one or more dedicated network interfaces or an Ethernet-to-universal serial bus adapter connected directly to an available universal serial bus interface, or universal serial bus hub connected to a universal serial bus interface, on a motherboard of the main network switch 125, exposing an additional physical and logical interface to the operating system on main network switch 125. The use of a universal serial bus hub permits multiple universal serial bus devices to be connected to main network switch 125 by means of one universal serial bus port on the main network switch's motherboard. When used, an Ethernet-to-universal serial bus adapter exposes an additional physical and logical interface to the operating system on main network switch 125.

Main network switch 125 is configured using standard device manager functions of the main network switch operating system to remap the logical secondary management interface to the logical interface exposed by the physical Ethernet-to-universal serial bus adapter interface. Internal network switch 121, management network interfaces 119 on the main network switch 125, and connections between the two devices are internal to the controller node, controlled by management computer 126, with no logical or physical user facing interfaces other than through the management computer when configured as a support gateway.

The serial management interfaces 127 on main network switch 125 are attached to serial interfaces on the controller node's management computer 126. These interfaces provide an additional pathway for management computer 126, or a technician leveraging access through management computer 126, to interface with the main network switch 125 in the event that the network management interfaces become unavailable or unreliable, such as in the case of misconfiguration. This pathway guards against software errors by permitting another channel for correcting errors which disable communication over the man network switch's internal network management interfaces. Some main network switches expose serial management interfaces in-line with, or offset from but facing in the same direction as, the primary network interfaces, making them physically accessible from outside the controller node chassis. In some embodiments, such physical in-line serial management interfaces are disabled, and the corresponding logical interfaces on the externally facing switch are redirected to inward facing interfaces. In other embodiments, such physical in-line serial management interfaces are additional and subordinate to internal serial management interfaces 127. Internal serial management interfaces 127 may take the form of one or more dedicated serial interfaces or a serial-to-universal serial bus adapter connected directly to an available universal serial bus interface or universal serial bus hub connected to a universal serial bus interface on main network switch 125 motherboard, exposing an additional physical and logical interface to the operating system on the main network switch 125. When a serial-to-universal serial bus adapter is used, the main network switch is configured using standard device manager functions on the main network switch operating system to remap the logical serial management interface to the logical interface exposed by the physical serial-to-universal serial bus adapter interface.

The universal serial bus interfaces 120 on main network switch's 125 may be both inward facing such that they may be attached to other controller nodes 107 or interfaces by wire or other physical pathway, or they may be externally facing interfaces in-line with, or offset from but facing in the same direction as, the primary network interfaces 118 making them accessible from outside the controller's node physical chassis. In some embodiments, such physical externally facing and externally accessible universal serial bus interfaces 120 are disabled, leaving only the internally facing interfaces operational and available for interconnection with other controller node interfaces. In other embodiments, such physical in-line universal serial buses interfaces 120 are additional to internal universal serial bus interfaces 128. The universal serial bus interfaces on main network switch 125 may advantageously be used to provide for additional communication pathways between main network switch 125 and other controller node components, such as management computer 126, beyond those interfaces physical present on the main network switch 125.

In one example embodiment, the controller node's main computer 130 includes a central processing unit, memory, and storage 140, for example, configured to operate the distributed computing software architecture, including the base operating system, orchestration service, and system service containers. Main computer 130 is the base platform from which distributed computing services are rendered. Typically, distributed computing services, including cloud computing services such as the main workload scheduler, identity service, storage service, disk image service, and user interface services; reside on and are independent servers. Many of these services are dependent on one another to perform their functions. This distributed computing system requires that communication between the services conducted through network interfaces. In order to approximate the expected barrier between cloud services, main computer 130 isolates services into partitions which each possess full virtual network interfaces and are independently addressable. The distributed computing orchestration service creates these network enabled and addressable partitions, populates them with the requisite software to enable the desired service, and configures the partition, the partition's network interface, and the service software within the partition to provide the desired service function. By using this partitioning scheme, main computer 130 is able to render cloud computer services requiring network communication with other services from within a single physical server.

The controller node's main computer 130 is coupled to other components of controller node 107 by one or more primary network interfaces, one or more secondary management network interfaces, one or more serial interfaces, one or more storage interfaces, one or more inter-integrated circuit communication protocol pathways, and by front panel header connections such as power switch, reset switch, and activity indicator lamp. These interfaces provide multiple independent pathways for other components in controller node 107 to connect with the main computer. As an integrated appliance, the availability of redundant interfaces is advantageous to guard against the failure or misconfiguration of any one interface, which would otherwise render the overall controller node unusable. These pathways provide both programmatic and technician access to the main computer to assist in configuration, reconfiguration, troubleshooting, diagnostics, and recovery from fault conditions including misconfiguration, primary operating system failure, or other interface failure. The main computer's primary network interfaces are attached to the controller node's main network switch 125 by one or more compatible network cables and carry cloud service traffic to and from the physical nodes. When multiple network cables are used, the channels may be bonded for redundancy or to multiply base effective throughput by the number of such additional connections. The main computer's management network interfaces are attached to the controller node's internal network switch by means of wire or other physical pathway and carry management traffic to and from the management computer. The main computer's serial interfaces are attached to main computer 130, permitting main computer 130 to obtain console access to main computer 130 as another means of controlling the main computer. The main computer's storage interfaces attach to storage devices within management computer 126. The intelligent management platform bus header on main computer 130 is attached to the master microcontroller by means of inter-integrated circuit communication protocol pathway so that the master microcontroller, or management computer through the master microcontroller, may control the state and configuration of main computer 130. The master microcontroller also attaches to the main computer's front panel header and thereby has a second means of controlling the main computer's state, as well as monitoring its activity.

The controller node's internal network switch 121 connects several of the controller node's internal systems and routes Ethernet based management traffic among them. Among the systems in this internal network are the main computer 130, main network switch 125, primary microcontroller 131, and the management computer 126. These interconnections are by means of wire, PCB trace, or other physical pathway, for example.

Controller node 107 hosts a number of microcontrollers and nonvolatile memories. Printed circuit boards in controller node 107 that host microcontrollers or other active logic circuitry, as opposed to simple circuit pathway or structural boards, contain nonvolatile memories for a variety of purposes. In some embodiments, nonvolatile memory is in the form of Electrically Erasable Programmable Read-Only Memory. Active printed circuit boards contain at least one nonvolatile memory for the storage of version, manufacture data such as date and location, and related metadata regarding the host printed circuit board. Each such metadata nonvolatile memory is electrically coupled with the primary microcontroller by means of inter-integrated circuit communication protocol pathways. Additional nonvolatile memories are present in some active printed circuit boards in order to store configuration or state data needed for the logic functions of other circuits on a given printed circuit board. One such nonvolatile memory stores the configuration data for the controller node's internal network switch. Another such nonvolatile memory stores font cache data used in the visual rendering of the controller node's physical administration interface.

The controller node microcontrollers comprise a master microcontroller 131, environmental microcontroller 132, and fascia microcontroller 133. The master microcontroller is responsible for general hardware regulation within the controller node, controlling power state and monitoring hardware health status. The master microcontroller 131 is attached by inter-integrated circuit communication protocol pathways to all metadata nonvolatile memories in the controller node, thermal probes in some printed circuit boards, the power distribution unit 134 by means of PMBus protocol, other microcontrollers, the physical administration interface 136, the intelligent platform management bus header on the main computer 130, by network interface to the internal network switch 121, and by universal serial bus to the management computer 126. The master microcontroller 131 is powered when electricity is supplied to controller node 107, even during a thermal or other fault related power interrupt condition, and provides overall orchestration and logic for the operation of base hardware components throughout controller node 107. In those embodiments where master microcontroller 131 has access to metadata nonvolatile memories, environmental microcontroller 132 and its fan speed data, the power distribution unit 134 and its PMBus data, and low level management control of main computer 130 by means of intelligent platform management interface, master microcontroller 131 is capable of performing health checks against major controller node subsystems. Health checks, which can take the form of thermal monitoring; power consumption monitoring, basic test functions, and electrical presence; are important in the operation of the controller node due to the multitude of internal, typically independent system components. Centrally gathering such health data and presenting the same through the controller node's physical administration interface 136 aids in system diagnostics and troubleshooting.

Master microcontroller 131 powers the controller node's physical administration interface 136. In some embodiments, this interface takes the form of a touchscreen liquid crystal display ("LCD"). Touch input from such a display is captured and relayed to master microcontroller 131 as user input, permitting the user to select among various options and issue commands to the master controller. Such commands include toggling the power state of controller node 107, configuring physical nodes 102, performing configuration or other audits, and entering support mode. Physical administration interface 136 is also used to display a range of information about controller node 107 and attached physical nodes 102, including the controller node's operational status, state, performance, configuration, and overall system capacity.

Master microcontroller 131 participates in environmental regulation by monitoring some thermal sensors in controller node 107. In the event master microcontroller 131 detects temperatures that exceed the controller node's maximum safe operating temperature, master microcontroller 131 may issue a power interrupt request to the power distribution unit 134 and shut controller node 107 down. Master microcontroller 131 also accepts power interrupt requests from management computer 126, and can issue fan duty cycle override commands to the environmental microcontroller.

Master microcontroller 131 bridges base hardware components in the controller with distributed computing orchestration software by means of interaction with management computer 126. An application programming interface (API), such as a RESTful HTTP API endpoint, on management computer 126 accessible by network connection provides the interface by which other software components in controller node 107 may issue requests to base hardware. Such API calls are received by management computer 126, processed, converted into a corresponding universal serial bus human interface device class function, conveyed to master microcontroller 131 by means of the universal serial bus interface, processed, and converted into a specified command addressed to a hardware component.

Environmental microcontroller 132 is responsible for regulating environmental conditions within controller node 107. This task may be made complicated by the presence of multiple independent components within controller node 107, some of which may typically have independent thermal management systems and which may not function correctly without first verifying the presence of specific thermal management systems. The environmental microcontroller accommodates these components by maintaining overall thermal conditions and emulating the presence of expected thermal management systems for each component requiring such systems in the manner expected. For example, some components will verify the number of expected cooling fans before operating. The environmental microcontroller emulates the presence of the expected number of cooling fans, thus enabling operation of the affected component. Among the environmental microcontroller's functions are processing thermal data and control messages, including monitoring various thermal probes, monitoring fan performance, adjusting fan duty cycle in response to prevailing environmental conditions, responding to thermal sensor inquires and duty cycle adjustment requests from controller node sub-components, and issuing power interrupts as necessary to prevent thermal related damage from occurring. A fan duty cycle is the percentage of time the fan is active in a given timespan. The environmental microcontroller 132 is attached to and responsible for the operation of controller node chassis fans. The environmental microcontroller 132 collects thermal sensor data from thermal probes on printed circuit boards distributed throughout the controller and calculates the appropriate fan duty cycle for overall controller node cooling requirements based on this data. The cooling curve is defined according to the operating requirements of all components within controller node 107 such that the controller node's internal temperature approximates as nearly as possible the median optimal operating temperature of all controller node components while never exceeding the maximum thermal rating of any individual component. The environmental microcontroller 132 also monitors chassis fan performance. If fan performance degrades, or if fans fail, the environmental microcontroller 132 can trigger a fault alarm or interrupt power to the chassis, as necessary, to prevent thermal damage to controller node 107. In some embodiments, a dedicated interrupt circuit between the master microcontroller 131 and the environmental microcontroller 132 serves to effect power interruption. In such embodiments, if either microcontroller determines that a system fault or environmental condition necessitates a power interruption, the master microcontroller 131 will issue an interrupt request to the power distribution subsystem 134.

Controller node components hosting independent environmental regulation systems, such as fan speed sensors and logic for adjusting fan duty cycle in response to sensor data, are attached to the environmental microcontroller 132. Environmental microcontroller 132 intercepts and responds to both temperature data requests and duty cycle control signals from such components, including main network switch 125 and main computer 130. Reply messages to requesting components emulate expected responses, thereby maintaining the operational norm of the requesting components. In some embodiments, duty cycle control signals and thermal data from components with independent environmental regulation systems are weighted and factored when the environmental microcontroller 132 calculates the appropriate duty cycle for controller node chassis fans. In other embodiments, only the prevailing environmental condition as determined by a plurality of available thermal sensors is used in calculating the appropriate fan duty cycle suitable for overall controller node 107 operation.

Fascia microcontroller 133 is attached to management computer 126 by means of serial interface connection and powers the controller node's fascia 136. Fascia microcontroller 133 controls the face panel of the controller chassis, which may be a touch screen interface, for example. In some embodiments, light emitting diodes on the controller node's front panel (fascia) can convey system state information, including initializing, on, fault condition, new node added, node removed, node fault condition, and off. Management computer 126 issues state information is to the fascia microcontroller 133, which sequences and controls the light emitting diode array in the controller node's fascia to indicate a corresponding state. For example, a fault condition in controller node 107 may be communicated to the fascia microcontroller through the management computer HTTP API. A call to the API corresponding with error state and severity will be relayed to the fascia microcontroller 133 through the master microcontroller 131. In response, fascia microcontroller 133 may adjust the color, light output, and pattern of light emitting diodes in the fascia to relate the failure state. One such representation may take the form of flashing red across the face of the failed controller node. Another example may include an API call placed to management computer 126 indicating that the main computer orchestration service is initializing. Such API call will be relayed to fascia microcontroller 133 through the master microcontroller 131. Fascia microcontroller 133 may then adjust the fascia LED array to pulsating blue. Incremental initialization states between uninitialized and fully initialized, such as building containers, initializing main network switch 125, and establishing communication with physical nodes, may be represented by different colors with similar flashing pattern. The speed of the flashing may be used to indicate progress during each step, such as increasing speed until solid to indicate success, or fixed change to flashing pattern to indicate processing or failure. Each of such combinations may be represented by single API calls with represent multi-step complex logic, or the grouping and sequential request of several individual API calls, which represent primitive hardware functions, such as on, off, flash, and adjust color. API definitions supporting the above examples may be for entering pulsating mode, set pulsation frequency, and set LED color, for example.

Power for controller node 107 may be provided by redundant, fault tolerant power supplies 135 attached to a power distribution unit 134 that communicates state data with the controller node using a protocol, such as the PMBus protocol. The power supplies and power distribution system in controller node 107 are able to accommodate the electrical requirements of each of the controller node's varied components. Voltages in the controller node comply with a specification, such as the Advanced Technology eXtended (ATX), power specification and are available in 12 v, 5 v, 3.3 v, and other voltages. The PMBus protocol is used to interrupt power to controller node 107 in the event of a thermal condition or other environmental condition outside of specified normal operating ranges to prevent physical damage to any of the controller node's components. In some embodiments, power is distributed throughout controller node 107 by means of PCB using blind mate interfaces. Traces are of sufficient width and copper content to accommodate expected voltage and amperage over given distances. For example, higher current traces, longer traces, or both, are wider and contain more copper content to prevent the trace from heating to the trace copper's melting point. In other embodiments, one or more insulated aluminum bus bars are used to carry high current power. Such bus bars are used in lieu of traditional PCB traces to prevent over heating or other power quality and safety issues. Each such bus bar conducts only one voltage. In various embodiments, standard power interfaces are exposed to connect with controller node subsystems that require specific power interfaces. For example, main computer 130 may require power interfaces in the form of two standard ATX 8 pin power connectors and one standard ATX 24 pin power connector.

Management Computer

Management computer 126 may be independent of the main computer 130 and is responsible for management of controller node 107. Management computer 126 and main computer 130 may be separate computing chips or processors such that management computer 126 can manage main computer 130. In other examples, management computer 126 and main computer may be the same processor or chip. Management computer 126 is the starting point and stable basis from which other controller node operations are provisioned, configured, and maintained. Management computer 126 may include a central processing unit with hardware public key cryptographic features, true random number generator, memory, storage, one or more network interfaces, one or more serial interfaces, and one or more universal serial bus interfaces. These interfaces provide multiple independent pathways between the management computer, the main computer, and the main switch. The availability of multiple communication pathways between management computer 126 and other controller node components ensures that the failure of any one interface does not obstruct all communication pathways with other controller node components.

At least one network interface on management computer 126 is attached to the controller node's internal network switch 121, thereby permitting communication with main network switch 125, main computer 130, microcontrollers, and other systems present on the internal network. At least one other network interface on management computer 126 is attached to a network interface accessible from outside the controller node chassis 138, permitting physical access from outside of the controller node's chassis. This interface is advantageous as it permits a technician to directly connect with management computer 126 and utilize its multiple, redundant pathways to the controller node's other internal systems, such as main computer 130 and main network switch 125. The management interfaces on main computer 130 and main network switch 125 may be otherwise inaccessible from outside of the controller node's chassis, and any maintenance or diagnostic tasks on these components would require opening the chassis and disassembling controller node 107. The externally accessible network interface coupled with the embedded management controller therefore provides an administrative and maintenance pathway to all controller node components without requiring disassembly of controller node 107. In some embodiments, such externally accessible network interface 138 is disabled when controller node 107 is operating normally, and may be selectively enabled through the controller node's physical administration interface 136, remotely, in response to fault conditions, or by other restricted means to provide authorized diagnostic and support functions.

At least one serial interface on management computer 126 is attached to a serial interface of the main network switch 125. This interconnection provides for management access to the main network switch 125 in addition to and independent of other management network interconnections with the main network switch 125. At least one other serial interface on management computer 126 is attached to a serial interface of the main computer 130. This interconnection provides for management access to the main computer 130 in addition to and independent of other management network interconnections with main computer 130. The management computer's universal serial bus may be used individually, or in conjunction with a universal serial bus hub, to expose additional required interfaces by means of adapters such as an Ethernet-to-universal serial bus adapter or serial-to-universal serial bus adapter. Management computer 126 interfaces with the master microcontroller 131 by means of universal serial bus interface.

Management computer 126 performs several functions within controller node 107, including initial provisioning of main computer 130 from signed disk images, upgrades of main computer 130 from signed upgrade disk images, an interface between the distributed computing orchestration system and lower level microcontrollers within controller node 107, initial provisioning and configuration of the main network switch 125, upgrades of the main network switch's 125 operating system, out of band management access to the main network switch 125, out of band management access to main computer 130, and an externally accessible diagnostic and support interface 138.

The management computer controls the basic states of main computer 130, such as on, off, and reset. It also controls the boot order of main computer 130, either through direct access to the main computer's bios, or by selectively disabling and enabling the main computer's primary boot disk, thereby controlling which boot device is available to main computer 130. If the main computer's primary boot device is not available to it during the boot process, it will attempt to boot from the next device in its boot order. Exercising this control, management computer 126 can force main computer 130 to search for a boot image through the main computer's network interfaces, to which management computer 126 is attached. Management computer 126 is then able to provide a boot image to main computer 130 by means of network interface. This process is used in main computer 130 initial provisioning as well as in upgrades of the main computer's software.

Management computer 126 contains a cryptographically signed factory disk image of the initial operating state of main computer 130. In some embodiments, main computer's 130 disk images are also encrypted. These cryptographic measures ensure the integrity of the main computer's disk image. Any modifications to the disk image, such as by user intervention, may change the image's signature. By verifying that the image is signed by distributed computing, management computer 126 prevents the execution of unauthorized software on controller node 107. In embodiments where the disk image is encrypted, the form and structure of the disk image is concealed so as to prevent potential attackers from inspect the controller node's system software.

Upon first boot, main computer 130 is configured to obtain its operating system image from its network interfaces using a protocol, such as the preboot execution environment (PXE) protocol. Management computer 126 verifies the cryptographic signature of main computer's initial disk image against cryptographic keys ephemerally or irreversibly written to management computer 126. Management computer 126 may store cryptographic keys as normal data on its storage disk, or it may write the cryptographic keys using a one-time write process where fuses or other circuits are permanently modified to prevent modification of the cryptographic keys. If verified, the disk image is made available to main computer 130 from management computer 126 by means of a protocol, such as trivial file transfer protocol (TFTP), for example, or other PXE compatible data distribution protocol, over the controller node's internal network. In one example embodiment, an intermediate network bootloader capable of HTTP and other communication protocols in delivered to main computer 130 from management computer 126 by means of TFTP. A server node may obtain the intermediate bootloader from main computer 130. The intermediate bootloader is a small application that is executed by a device asking for a network boot (e.g., main computer, server node). Once loaded, the intermediate bootloader causes main computer 130 to download the main boot image using HTTP or other communication protocols which improve reliability and efficiency of the download function. Main computer 130 downloads the disk image, writes it to a boot partition on persistent storage, and proceeds to boot from this disk image. Main computer 130 obtains its disk image from a management computer 126. A server node may obtain its disk image from main computer 130 in controller node 107, for example. The intermediate boot loader construct with reliable and scalable distribution protocol is advantageous when distributing boot images to multiple physical nodes 102 concurrently, such as when new physical nodes 102 are added and initialized.

Management computer 126 also provides an upgrade disk image to the main computer 130. This process will be described in more detail below. During an upgrade, main computer 130 downloads from management computer 126 the latest disk image (the upgrade) and saves it to storage 140 on management computer 126, marking the upgrade as the current version of the disk image and marking the previous disk image (the version operating before the upgrade) as the previous version. To aid in system restoration, management computer 126 retains original main computer 130 factory disk image as a baseline. Management computer 126 verifies the cryptographic signature of the main computer's upgrade disk image against cryptographic keys irreversibly written to management computer 126. In embodiments where the upgrade disk image is also encrypted, management computer 126 decrypts the disk image before transmitting it to main computer 130. In a multi-controller configuration, a subordinate controller is upgraded first. If successfully upgraded and joined back into the distributed computing rack, the lead controller node in the rack assigns the leader role to the upgraded controller node, which then iterates over the remaining controllers, upgrading each in turn according to the order in which the other controller nodes were added to the rack.

Each individual controller node 107, and the only controller node 107 in single controller node configuration, is upgraded by writing important configuration and state data to persistent storage 140 in partitions other than the boot partitions. When main computer 130 and the overall distributed computing system have written all essential data and are prepared for the temporary absence of controller node 107, controller node 107 restarts to obtain the upgrade disk image from management computer 126 over the controller node's internal network using the PXE protocol. During the main computer's absence, physical nodes 102 and any system services or virtual machines on the physical nodes 102 should remain operational and accessible as the controller node's main network switch 125 and physical node network components remain functional. Following the successful upgrade of the controller node's main computer 130, controller node 107 may issue software upgrade commands to attached physical nodes 102, potentially resulting in service disruptions. Such physical node software upgrades are performed on one physical node first, and if found successful, the upgrade commands iterate to the remainder of the physical nodes attached to the controller node.

Upgrades to the management computer 126 are achieved by partitions on the management computer's primary storage device (not shown). New management computer software is written to an inactive partition. When written, the management computer 126 restarts and boots from the partition containing the new software. In the event of a fault related to booting from the new software, management computer 126 restarts and boots from the previous software partition.

Using Management Computer as API to Bridge Software Functions with Hardware Functions Management computer 126 serves as a bridge between the main computer 130 and lower level controller node functions, including the physical administration interface, fascia LED arrays, and I2C communications through the master microcontroller 131. In some embodiments, a high level API 142, such as a RESTful HTTP API, is made available to the controller node's main computer 130. The API is an endpoint for remote procedure calls. The calls to this API 142 are translated to specific hardware functions, including on, off, read temperature, read speed, set speed, read luminance, set luminance, read color, set color, which are issued to the appropriate microcontroller by established communication pathways and protocols, including, for example, a universal serial bus using the protocol's human interface device class. A universal serial bus interface between management computer 126 and master microcontroller 131 may be used for reliability. The human interface device class typically used with computer input peripherals is used for its extensibility and suitability for translating API calls into instructions that may be processed by master microcontroller 131.

Management computer 126 is ideal for API 142 because management computer 126 has communication pathways to multiple hardware elements 140 in addition to the other components of controller node 107. Management computer 126 thus can be a broker to translate communications from different hardware elements 140 that may communicate in different low level hardware primitives to higher level software calls. This makes hardware elements 140 appear as software to software elements 138 as software elements 138 can use software commands, such as remote procedure calls, directed to hardware elements 140.

The HTTP API on management computer 126 is advantageous in the overall operation of controller node 107. For example, the various components in controller node 107 are each independently powered such that they may not directly affect the power state of other components. Therefore, when main computer 130 receives a user signal to power off controller node 107, software on main computer 130, including the orchestration service, may issue an API call to management computer 126 to initiate the power off process across all controller node components. Alternatively, a power off event triggered from the physical administration interface may be communicated to the rest of the system by relaying the appropriate instruction from the physical administration interface through management computer 126 to the relevant API endpoints within the system. System service state data may also be made available to the physical administration interface and front fascia through API call. Alert and fault API calls to management computer 126 may be related to the master microcontroller 131 to the physical administration interface and fascia such that specific details may be displayed on the physical administration interface and the fascia may adjust the color or pattern of its LED array to visually indicate the existence of an alert or fault.

Figure 2B:
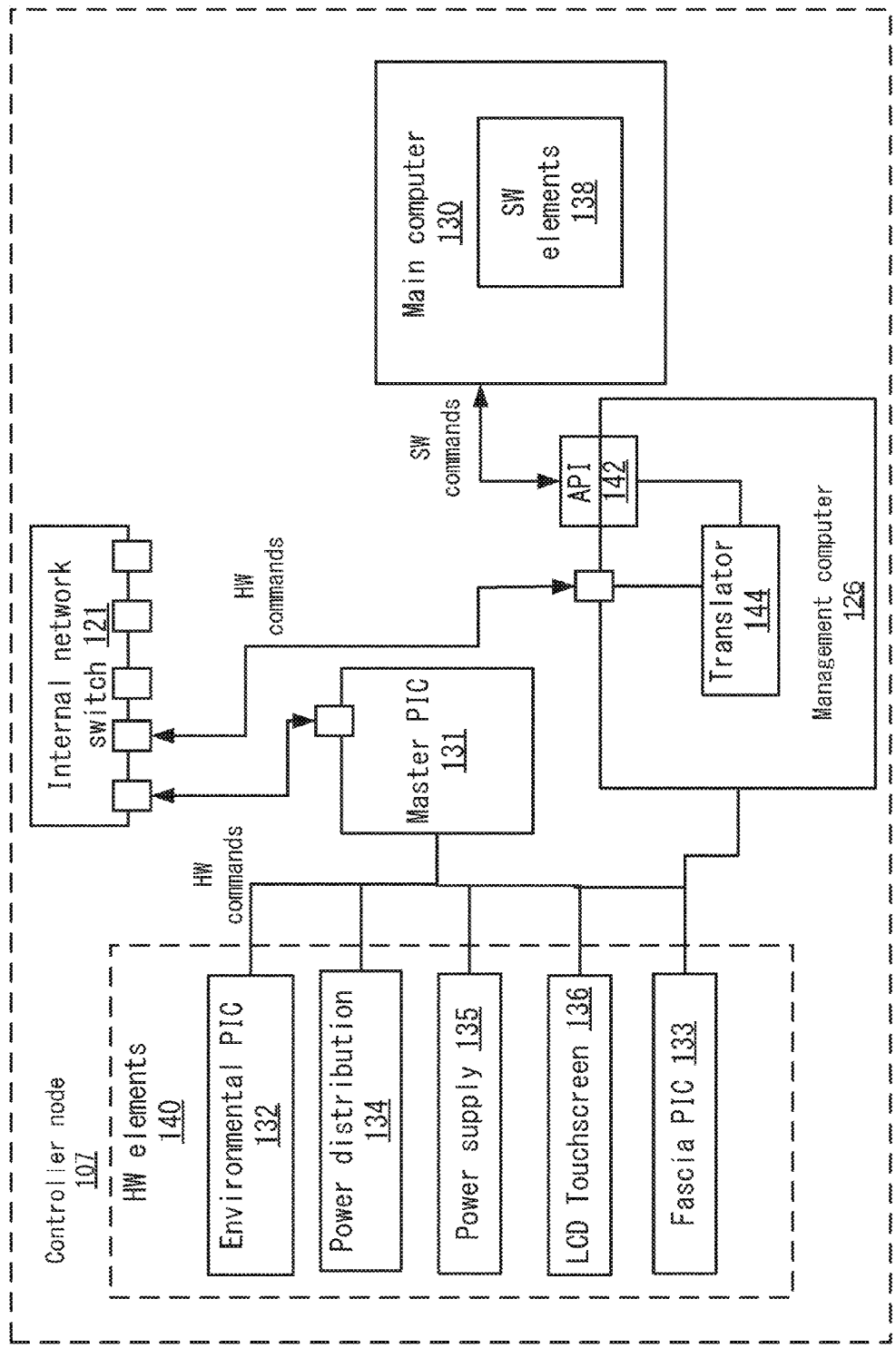
FIG. 2B depicts a more detailed example of a management computer for providing an API for access to hardware elements according to one embodiment.

FIG. 2B depicts a more detailed example of management computer 126 for providing an API for access to hardware elements according to one embodiment. Main computer 130 includes software elements 138. As will be discussed in more detail below, the software elements may include orchestration service instances running in containers in main computer 130 and also system services being managed by the orchestration service instances that are also running in the containers. The orchestration service instances and system services may communicate using high level software commands. However, software elements 138 may also need to communicate with hardware elements 140. But, as detailed above, hardware elements 140 may communicate using low level hardware commands, communication pathways, and protocols. Software commands include any of a number of remote procedure calls for communication between different systems while hardware commands are any of a number of basic electrical signals and related protocols to effect communication and commands between one hardware component and another, such as by means of serial connection or inter-integrated circuit communication. The remote procedure calls may be an inter-process communication that allows a computer program to cause a subroutine or procedure to execute in another address space (e.g., management computer 126) without the programmer explicitly coding the details for this remote interaction.

In one embodiment, the orchestration service instances or system services may need to communicate with hardware elements 140, such as environmental microcontroller 132, power distribution 134, power supply 135, LCD touch screen 136, and/or fascia microcontroller 133. For example, hardware elements 140 may contribute to the health, state, and configuration of both hardware elements 140 and software elements 138. The health means, for example, the availability, quality, and draw characteristics of electrical power, component and ambient temperature, and the availability and duty cycle of system fans. The state refers, for example, to the power state of controller node 107, either being on or off, and presentation of some useful subset of controller node 107's operational information. For example, the fascia may output a pattern of LED lights based on the operational state. The configuration refers to accepting configuration data for initial set up of the distributed computing system.

To communicate with hardware elements 140, software commands from software elements 138 may need to be translated into hardware commands that hardware elements 140 understand. To provide separation between the software commands and hardware commands, management computer 126 may be leveraged to provide the translation. This allows software elements 138 to be developed to solely communicate using software commands. In this case, a developer does not need to know how to interact with hardware elements 140 via hardware commands. Rather, software elements 138 may make software calls to an API 142 in management computer 126. In one embodiment, management computer 126 provides a RESTful API endpoint 142 that can be accessed by software elements 138. For example, the orchestration service instances may query and write to API 142 to communicate with hardware elements 140.

Having the API in management computer 126 provides many advantages. Management computer 126 operates a full operating system capable of hosting an HTTP API endpoint using software of the same type that operates elsewhere in controller node 107. This allows management computer 126 to communicate with other elements in controller node 107 such as main computer 130. Also, management computer 126 holds critical communications pathways in a variety of interfaces and through a number of protocols to hardware components in controller node 107. These pathways may be dedicated pathways. This allows management computer 126 to interface with the software on main computer 130 using the same type of remote procedure calls used by main computer 130 for inter process communication, effectively abstracting the business of hardware control into primitives easily manipulated by the software of main computer 130.

When API 142 receives the software call from software elements 138, a translator 144 translates the software calls into lower level hardware commands. Translator 144 may include logic that translates software commands into hardware commands that hardware elements 140 can understand. For example, management computer 126 may have an API for a /poweroff uniform resource identifier (URI) that, when a software element 138 on main computer 130, typically the orchestration service, makes a call to the /poweroff URI of the API, management computer 126 receives the command, interprets it, and issues a corresponding hardware command to perform the function over any of a number of communication pathways and protocols to the hardware. In this example, the call to /poweroff URI may be an HTTP call and may include the identifier for a specific hardware component. Management computer 126 parses this information, determines if the identifier corresponds to a hardware element 140 it has communication with, determines the corresponding command and pathway for the specific hardware element 140 in question from a predefined and configured array of choices, and issues the identified command. The translation is thus moved out of main computer 130 and also software elements 138 do not need to know how to perform the translation. Software elements 138 do not need to communicate with an API on main computer 130 to hardware elements 140 via hardware commands. Rather, the API on management computer 126 is accessed via software commands.

Once the translation is performed, translator 144 sends the hardware commands to hardware elements 140. In one embodiment, management computer 126 sends the hardware commands via internal network switch 121 through a universal serial bus interface. Then, the hardware commands are forwarded from internal switch 121 via the USB to master microcontroller 131. Master microcontroller 131 may then communicate the hardware command to hardware elements 140.

The communication may also be bi-directional. In this case, hardware elements 140 may communicate hardware commands to management computer 126. The hardware commands may include various information from hardware elements that may be used by software elements 138, such as power information. The hardware commands are communicated to management computer 126 via master microcontroller 131, or an internal network switch 121, or other available communication pathway and protocol, such as via the USB.

Translator 144 receives the hardware commands and may translate the hardware commands into software commands. Then, translator 144 sends the software commands through API 142 to main computer 130. Software elements 138 may then use the software commands to perform actions. In this case, software elements 138 do not need to translate hardware commands into software commands, which simplify the operation of main computer 130 and software elements 138.

In one example, activation of remote user support may be provided. A user may navigate to a menu on a touch screen interface or other hardware human interface device of controller node 107 to enable remote support. When selected, the hardware human interface device (e.g., touchscreen 136) communicates with management computer 126 to register the event. The communication may be using hardware commands. Management computer 126 may then determine software elements 138 that need to be notified of the hardware command. Also, translator 144 may translate the hardware command into a software command (or commands). Management computer 126 then issues the software command to relevant software elements 138. Each software element 138 may then configure itself to enable correct communication pathways to accept authorized connections to a system troubleshooting and diagnostics. In this case, hardware component input events may be translated into higher level API interaction that software elements 138 can use at its expected level of abstraction and not have to drop to lower level communication protocols to interact with hardware elements 140.

Accordingly, leveraging management computer 126 as an API endpoint, software elements 138 can communicate with hardware elements 140 using a constant level of abstraction that exists between other software elements of the distributed computing system. In other words, management computer 126 exposes hardware functions as software functions and may be called in the same way that software elements 138 interact with other components. This provides rapid development of software elements using hardware parameters and negates the need for other forms of hardware interaction such as fixed routines independently developed or written to EEPROM or other memory that would diverge from prevalent architecture present in the distributed computing system.

Management computer 126 may serve as the primary software support and diagnostics gateway to all other components in controller node 107. Multiple out of band interconnections with other controller node components, primarily by means of Ethernet network, serial, or universal serial bus, permit management computer 126 to fully access and administer main network switch 125, main computer 130, and microcontrollers.

In some embodiments, certain thermal sensor data is available only by means of internet protocol network, such as by the Simple Network Monitoring Protocol (SNMP). In such embodiments, management computer 126 interfaces with components offering thermal sensor data over SNMP to collect, process, and monitor thermal sensor data from these components. Examples of devices rendering thermal sensor data over SNMP include devices that host independent environmental regulation systems, such as main network switch 125 and main computer 130. Thermal sensor data gathered over internet protocol network are conveyed to master microcontroller 131 and to environmental microcontroller 132 for use in calculating fan duty cycle and determining whether power interrupt is necessary to prevent thermal damage from occurring to controller node 107.

The multiple independent components that comprise controller node 107 each require appropriate power supplies and thermal conditions. To accommodate these environment requirements; the controller node's active PCBs host at least one thermal sensor. The data from these thermal sensors is made available throughout the controller node, including to management computer 126, main computer 130, and main network switch 125. Microcontrollers supply thermal data to the controller node's components and respond to requests to increase or decrease fan speed from the various controller node components by making the appropriate adjustments to the controller node's fans. Controller node 107 includes at least three fans which are operable in both directions. Fan direction is recorded in memory and can be adjusted to match the desired airflow characteristics of the facility in which controller node 107 is deployed. A failure of any two or more fans triggers a power interruption to the chassis to prevent an unsafe thermal condition from occurring. Power consumption and power supply fan speed data is made available to controller node components by means of the PMBus protocol. If controller node components, such as the main network switch 125 and main computer 130, ordinarily have dedicated, fan cooled power supplies, signals from these components which query, increase, or decrease fan speed are intercepted by the environmental microcontroller. Such requests are accommodated by increasing or decreasing controller node fan speed, and appropriate response signals are provided to the requesting components in the signal format such components expect. Power supply fan speed response signals emulate those that would ordinarily be issued by a dedicated, fan cooled power supply, and include adjustments to fan speed data the requesting component would expect in response to commands to increase or decrease fan speed. This emulation ensures proper functionality of the independent controller component while maintaining a thermal and power environment common to and suitable for all controller node components. General fan data for controller node components that ordinarily have and expect independent fans is also emulated and provided to the requesting components, including the number and characteristics of the expected fans. Controller node component requests to increase or decrease fan speed are serviced by making the appropriate adjustments to controller node fan speed and responding to the requesting components in the signaling format the requesting component expects with emulated data, including the expected increase or decrease in fan speed, as appropriate.

Controller Node and Physical Node Interaction

Controller node 107 may have a physical administration interface in the form of an externally accessible, user facing touchscreen LCD display. The physical administration interface is powered independently of the main controller node components and permits the controller node's administrator to power on the remainder of the controller node's components. The physical administration interface displays real time data about attached physical nodes, including number, state, and capacity. In addition, the physical administration interface can be configured to display support information and controls, including log data, performance data, fault data, software version numbers, hardware version numbers, and enabling or disabling the external support network interface.

In some embodiments, each physical node 102 in the distributed computing system is attached to a controller node 107 by means of cloud cable terminated into a cloud card on the physical node. A cloud card is a network interface device containing at least one management processor and high performance storage. In one embodiment, the cloud card interfaces with the host physical node as an expansion card utilizing a PCI-E interconnection. Additional interfaces on the cloud card include an intelligent platform management bus interface, side-band Ethernet interface, general purpose input output pins, and serial bus interface. Where available, the intelligent platform management bus interface attaches to the corresponding intelligent platform management bus header on the physical node's motherboard, providing access to the physical node's baseboard management controller, which implements intelligent platform management (on, off, etc. . . . , as described above). A direct connection between the cloud card and the physical node's baseboard management controller by means of intelligent platform management bus interface permits the cloud card to control the physical node using standard intelligent platform management interface commands, including power on, power off, reset, read power status, read system event logs, and read sensor data. Alternatively, where the baseboard management controller cannot be interfaced directly by means of intelligent platform management bus interface, the cloud card may achieve some of the same command functions over physical node 102 by means of attaching the cloud card's general purpose input output pins to the physical node motherboard front panel header containing power switch, reset switch, power status indicator, and disk activity indicator pins. When attached to a physical node's front panel header, the cloud card is able to implement a subset of the intelligent platform management interface commands, including power on, power off, reset, and read power status. The cloud card's management processor is responsible for interfacing with an I2C protocol bus in the attached cloud cable, interpreting signals delivered thereby, and issuing appropriate commands to the physical node by means of intelligent platform management interface commands, front panel header switch emulation, or other suitable means of effecting control of the physical node's power state and configuration.

Other functions of the cloud card's management processor include configuration of baseboard management controller, configuration of the cloud card network interface, firmware upgrades for the cloud card network interface, firmware upgrades of the cloud card management processor, serial interface relay, and keyboard-video-mouse relay. In some embodiments, the physical node baseboard management controllers are configurable, including username and password. The cloud card management processor interfaces with the baseboard management controller through the intelligent platform management bus header and configures these properties to the distributed computing system's desired operational specification. For example, in the case of username and password, these properties are set to values controlled by the distributed computing system to ensure successful authentication and control of the baseboard management controller.

In some embodiments, the distributed computing system correlates physical node network interface MAC addresses with the physical location of the physical node in relation to controller node 107 and other physical nodes 102 in the same server rack. To maintain this consistency, a specific cloud cable is associated with a defined location in the server rack. When a cloud cable so associated is attached to a cloud card in a physical node, an expected MAC address is communicated with the cloud card from an associated controller. The cloud card then modifies the MAC address of its network interface device to match the MAC address received from the controller and expected by the distributed computing system for the particular rack location the physical node has been installed in. This level of correlation permits management and administration decisions to be made in accordance with defined rack location. For instance, a well-defined IP address scheme may be administered according to physical rack location, such that the physical node in a designated rack location will always receive a certain IP address in a given allocation of IP addresses.

In some embodiments, the cloud card provides additional channels for unattended management and control of the physical node through serial interface relay and keyboard-video-mouse relay functions. The serial interface relay attaches to the physical node's serial interface by means of universal asynchronous receiver/transmitter which permits the physical node's serial console to be interacted with over the cloud cable I2C bus. Due to the higher bandwidth requirements of keyboard-video-mouse, this functionality is implemented using the network controller sideband interface standard, which provides higher throughput up to controller node 107. In embodiments offering the keyboard-video-mouse channel, the cloud card management processor may contain a graphic subsystem and universal serial bus human interface device profile to relay the video output of physical node 102 and to issue keyboard and mouse commands, as needed.

In embodiments which do not utilize cloud cables and cloud cards, an out of band management network may be created between controller node 107 and physical nodes 102 independent of the primary network connections between controller node 107 and physical nodes 102. This independent out of band management network is used to issue intelligent platform management interface commands to physical nodes.

The basic controls controller node 107 has over the physical nodes 102, including on, off, restart, and change boot order, can be grouped and executed to achieve varying management and administration objectives. The power control commands are used by the distributed computing system to stagger the initial power on of physical nodes 102 in order to distribute the network and power impact of such initial power on events over a period of time, resulting in lower overall datacenter network and power consumption. The delay in starting subsequent physical nodes 102 can be configured to equate with either the amount of time a physical node 102 typically takes to complete power-on self tests, the amount of time required to become fully provisioned and operational, or another period which approximates the duration of initial high current consumption following a power on event. Staggered start is useful both in initial power on of a new system as well as recovering from electrical faults in an orderly fashion. Controlled power on can assist facility operators in managing overall power consumption by mitigating the high initial power draw of physical nodes when booting as opposed to power draw when operational. As a result, overall electrical current need not in all cases equate with the maximum potential current draw of a distributed computing system. In addition, the power control commands can be used by the distributed computing system to balance resource consumption and resource capacity. If the distributed computing orchestration service determines that overall system use as manifested in physical node resource consumption falls below system capacity, the distributed computing system can migrate and concentrate workloads onto a subset of physical nodes. Once physical nodes are freed of workloads, the appropriate management commands, typically in the form of intelligent platform management interface commands, may be issued to power down the unused physical nodes until needed. The distributed computing system may then power on additional physical nodes as needed and distribute workloads to those physical nodes to meet fluctuating workload demands.

Management controls may also be used for identification of physical nodes 102. This is useful in configurations with multiple physical nodes 102 when one such physical node fails or otherwise requires physical maintenance. By issuing management commands to a physical node 102, the distributed computing system is able to control the power and activity lights on physical node 102, illuminating them in patterns which distinguish the desired physical node 102 from other physical nodes 102, and thereby visually denoting physical node 102 requiring physical maintenance to facility personnel.

The ability to control the power state and configuration of physical nodes 102 permits the distributed computing system to provision newly attached physical nodes 102 from a powered but off state through to installation into the distributed computing system as an operational resource. This is achieved by either manually ensuring that physical nodes 102 are configured to seek a boot image through their network interface card (e.g., using the PXE protocol) or using management interfaces to configure the physical node's boot order to select boot from the network interface card. Upon initial network boot, physical node 102 will obtain its operating system image from the controller node that the physical node is attached to (e.g., through the PXE protocol). In particular example embodiments, controller node 107 provides attached physical nodes 102 with an intermediate boot loader (e.g., by means of TFTP). This intermediate boot loader may permit the physical node to obtain its primary operating system image by more reliable transport protocols, such HTTP. Once booted, this operating system image is configured to initiate communication with controller node 107 through a well-defined IP address scheme where controller node 107 uses a specified network address. Further configuration of physical node 102 may be delivered from the controller node once successful communication is established with the controller node. Configuration may include allocation of physical nodes 102 storage capacity for different tiers of storage, configuration of the orchestration service instance on the physical node, configuration of the cloud compute service scheduler on the physical node, and any software updates which may be required. Upon final configuration, software updates, and registration with the controller node, the physical node is fully provisioned and added to the resource pool.

Upgrade of Controller Node

The distributed computing system may be deployed in various configurations, some of which may not be remotely accessible, and the software installed on the distributed computing system should be operated and maintained with reliability and predictability. The distributed computing system is able to receive and authenticate new software, distribute the software among other nodes in the cluster configuration, and orchestrate the upgrade without significant operational impact to nodes in the distributed computing environment. The software upgrade may be performed using management computer 126, main computer 130, and physical nodes 102.

In one embodiment, a software upgrade package may be received by controller node 107. The software upgrade may be an operating system and/or applications that are running on controller node 107 for one or more components. For example, a system administrator may receive a signed software upgrade package in the form of an upgrade disk image and upload it to the distributed computing system through a user interface. In one embodiment, an internal network to a controller node 107 is used to upload the software upgrade package. The software upgrade package may be an upgrade disk image that contains a complete image of the software. That is, the previously-installed software being used by the distributed computing system may be replaced by software on the software upgrade package. This provides a consistent image to the distributed computing system.

Management computer 126 may coordinate the upgrade. In this way, the upgrade may be performed automatically and also in a controlled fashion without user input after receiving the software upgrade package. In the upgrade flow, management computer 126 may first upgrade itself. Then, management computer 126 may coordinate the upgrade of controller node 107 via main computer 130. This is in a single controller node 107 system. However, a multiple controller node 107 system upgrade may be performed and will be described in more detail below.

Figure 3:
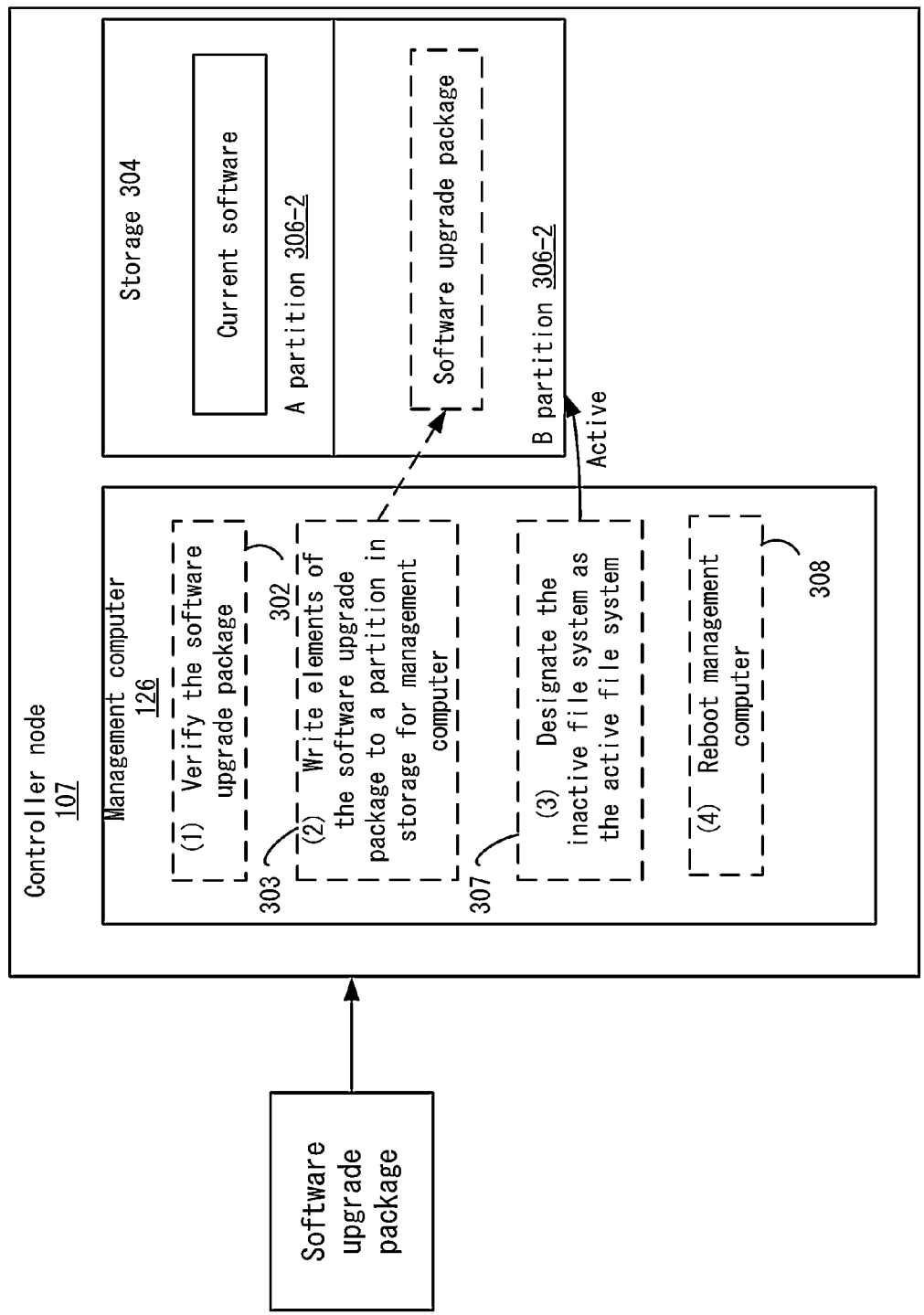
FIG. 3 depicts an example of initializing the upgrade of the management computer according to one embodiment.

FIG. 3 depicts an example of initializing the upgrade of management computer 126 according to one embodiment. When controller node 107 receives the software upgrade package, in one embodiment, controller node 107 validates the integrity and authenticity of the software upgrade package and decrypts the contents of the software upgrade package. If successful, controller node 107 sends the decrypted software upgrade package to management computer 126 with an instruction to upgrade itself. In one embodiment, main computer 130 may receive the software upgrade package, decrypt it, and then send it to management computer 126. Management computer 126 is used to coordinate the upgrade of main computer 130 such that the upgrade can be performed automatically without user input. Management computer 126 is essential to the process as the upgrade system utilizes whole images. Discrete components are not modified individually; rather, the entire system is replaced with a new image of the complete system reflecting changes to any of the various subcomponents of the overall system. State is persisted outside of main computer 130 and restored in an ordered and controlled fashion as a post-upgrade step. During this process, main computer 130's operational state is completely destroyed, albeit in an orderly and controlled fashion. When main computer 130 reboots, it discards a previous operating system or other system software, and must load the total upgrade image from management computer 126. Without management computer 126, there is no source for main computer 130 to obtain its operating software.

The above process provides many advantages. As the upgrade is a full image upgrade, main computer 130 (e.g., controller node 107) cannot wipe itself and load software upgrade without having a failure recovery scenario. By having management computer 126 provide the upgrade image and issue management commands to main computer 130 to effect the upgrade, management computer 126 ensure success of the upgrade or a failure recovery. Without using management computer 126, a failure may result in a broken state. However, using management computer 126, management computer 126 can attempt to roll back to the previous software version to recover from any failures. In the distributed computing system, this level of resiliency is very important. The threat of failure is minimized on management computer 126 as it is a fairly static configuration. However, main computer 130 may contain valuable date, such as customer data, and directly services customer requests, which can vary in load and can potentially produce unexpected outcomes that may obstruct the upgrade process. Management computer 126 can also access state and configuration data and pass that data to main computer 130 at key points in main computer's 130 startup and build out. Examples include network information, which varies on controller node 107, but remains static on management computer 126. Thus, management computer 126 provides a reliable, consistent, always-on system to navigate and debug the pre-install environment on main computer 130. The pattern of image wiping provides certainty as to outcome and is may be much faster than trying to upgrade the individual software components in-place.

In the upgrade process, in a step #1 (reference 302), management computer 126 may also verify the software upgrade package. For example, management computer 126 may verify the cryptographic signature of the upgrade disk image against cryptographic keys irreversibly written to management computer 126.

Management computer 126 may maintain the currently-installed software disk image as a baseline. In this case, the upgrade software package will not upgrade this baseline image. Rather, this image may be available for restoration at a later time. This allows management computer 126 to roll back to a known state if the update fails. To keep the currently-running disk image as a baseline, at step #2 (reference 303), management computer 126 may write elements of the software upgrade package relevant to upgrading management computer 126 to a partition in storage 304 for management computer 126. For example, storage 304 may include a first partition (A partition) 306-1 and a second partition (B partition) 306-2. These may be separate partitions on a persistent storage device that is associated with management computer 126. These partitions may be in an alpha-beta (A/B) scheme where one partition includes the active software and the other partition is inactive, but is suitable for storing the relevant portions of the software upgrade package. For example, as shown, management computer 126 has stored the relevant upgrade software components from the software upgrade package in a file system in B partition 306-2. The current software is stored in a file system in A partition 306-1, which is the active partition right now.

In a step #3 (reference 307), upon a successful writing of the update software to B partition 306-2, management computer 126 designates the inactive file system as the active file system (i.e., designating the B partition as active). This also causes A partition 306-1 to become inactive. Once this occurs, management computer 126 can start the upgrade transition. In a step #4 (reference 308), management computer 126 reboots itself. The rebooting ensures that management computer 126 starts from an initial state using the software upgrade. Upon rebooting, management computer 126 finds the active partition, which is B partition 306-2, and boots from the upgrade of the software stored in the file system. This effectively upgrades management computer 126. Management computer 126 may also perform other upgrade actions, such as upgrading the firmware for attached peripheral interface controllers through serial interfaces to those devices. The upgrade process for management computer 126 may now be complete.

Figure 4:
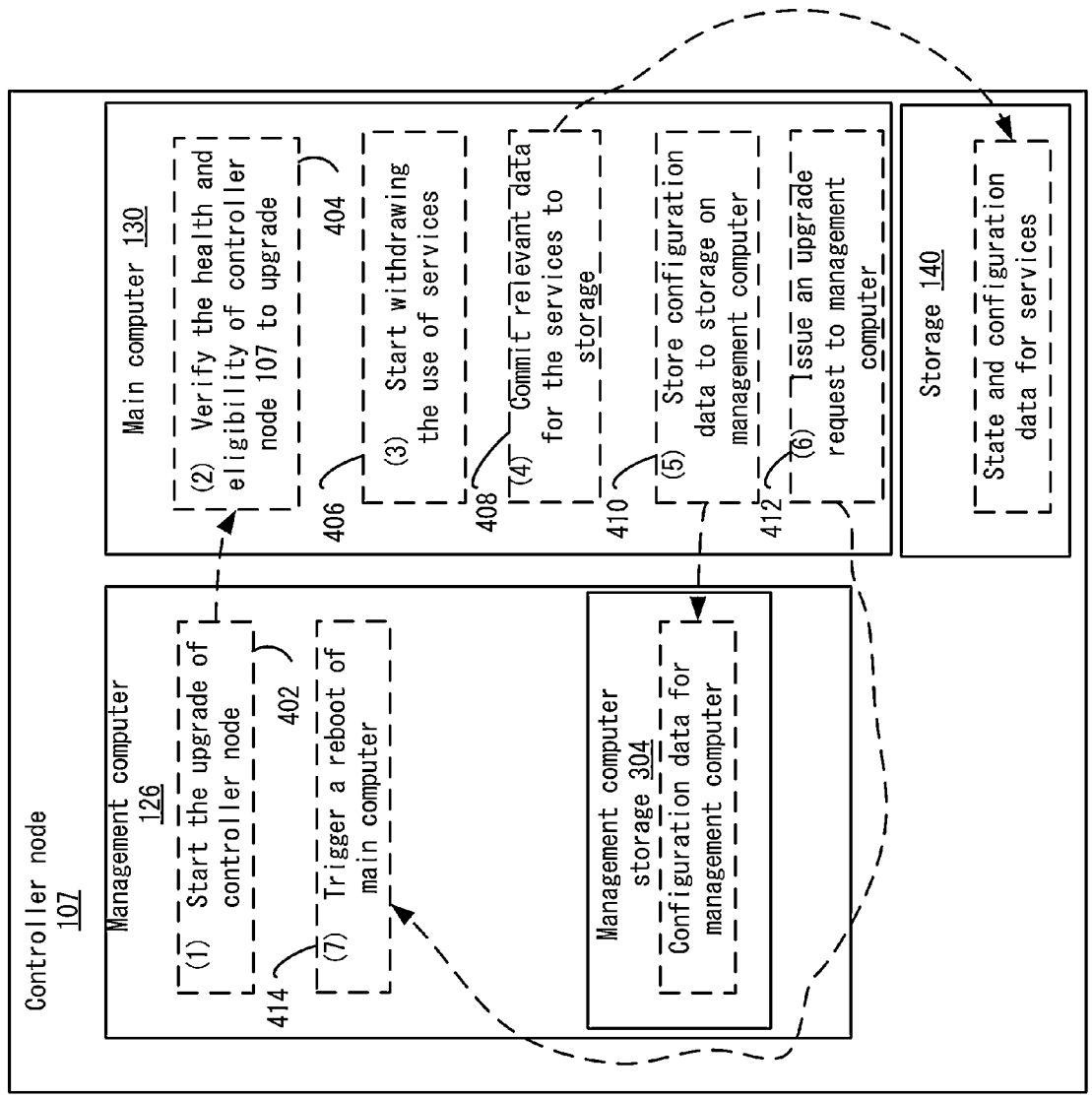
FIG. 4 depicts an example of the upgrade process of the main computer according to one embodiment.

After upgrading management computer 126, controller node 107 may upgrade itself via main computer 130. FIG. 4 depicts an example of the upgrade process of main computer 130 according to one embodiment. In a step #1 (reference 402) management computer 126 starts the upgrade of controller node 107 upon finishing the upgrade of itself. In one embodiment, management computer 126 may send a message to main computer 130 indicating the upgrade was successful and telling main computer 130 to initiate upgrade of controller node 107. In this case, upgrade of controller node 107 may include upgrading the software for main computer 130.

When main computer 130 receives the indication that management computer 126 has successfully upgraded itself, in a step #2 (reference 404), main computer 130 verifies the health and eligibility of controller node 107 to upgrade. For example, main computer 130 may evaluate that all expected services are available and that each expected service satisfies health checks specific to the service types. If the services conform to defined operational parameters in the health checks, then the health checks pass and the upgrade process can proceed. If one of the health checks fails, then main computer 130 may attempt to recover from the failure and the upgrade may proceed after that. The upgrade may not proceed if a failed health check cannot be resolved.

Assuming the verification is successful, in a step #3 (reference 406), main computer 130 starts withdrawing the use of services that controller node 107 is controlling with respect to physical nodes 102. The services being performed may be stateless services or stateful services. Stateless services do not need to have any state information stored that will persist across the upgrade. However, stateful services may need to have state information persist across the upgrade. In this case, in a step #4 (reference 408), main computer 130 commits relevant data for the services to storage 140, which is storage associated with main computer 130. Even though stateless services do not commit any state data, stateless services may commit configuration data to storage 140 before being withdrawn. In one embodiment, the configuration data includes an initial configuration for the service and state data may include data that was determined based on the operation of a stateful service. Stateless services do not need to use any state data. However, stateful services may store configuration data and also state data to storage 140. The state data may then be used by the stateful services upon the upgrade. Also, the configuration data and state data may persist across the upgrade in storage 140. In a step #5 (reference 410), main computer 130 stores configuration data to storage 304 on management computer 126. This configuration data may be configuration data for main computer 130 instead of for the services. This configuration data is stored with management computer 126 to ensure that the data persists across the upgrade process, which can be destructive to data stored elsewhere on main computer 130 or controller node 107. Other storage devices service main computer 130 and are attached during main computer 130's normal operations, and are not available prior to main computer 130 being operational. In addition, configuration and state data in management computer 126 may be accessed during the upgrade process prior to restoration of functionality in main computer 130. Upon the storing of the data, the withdrawal of the services is completed. The order of the withdrawal results in a consistent image of the state of controller node 107 prior to the upgrade being initiated.

In a step #6 (reference 412), main computer 130 issues an upgrade request to management computer 126. The upgrade request is sent to management computer 126 because management computer 126 coordinates the upgrade in an automatic manner. For example, management computer 126 is contacted to initiate the upgrade because management computer 126 may provide the upgrade image to main computer 130 upon reboot. In response to receiving the upgrade request, in a step #7 (reference 414), management computer 126 causes main computer 130 (i.e., controller node 107) to reboot. The reboot may be performed such that main computer 130 reboots from the new upgrade image. The reboot permits controller node 107 to download the upgrade image from management computer 126 and boot from the upgrade image.

Figure 5:
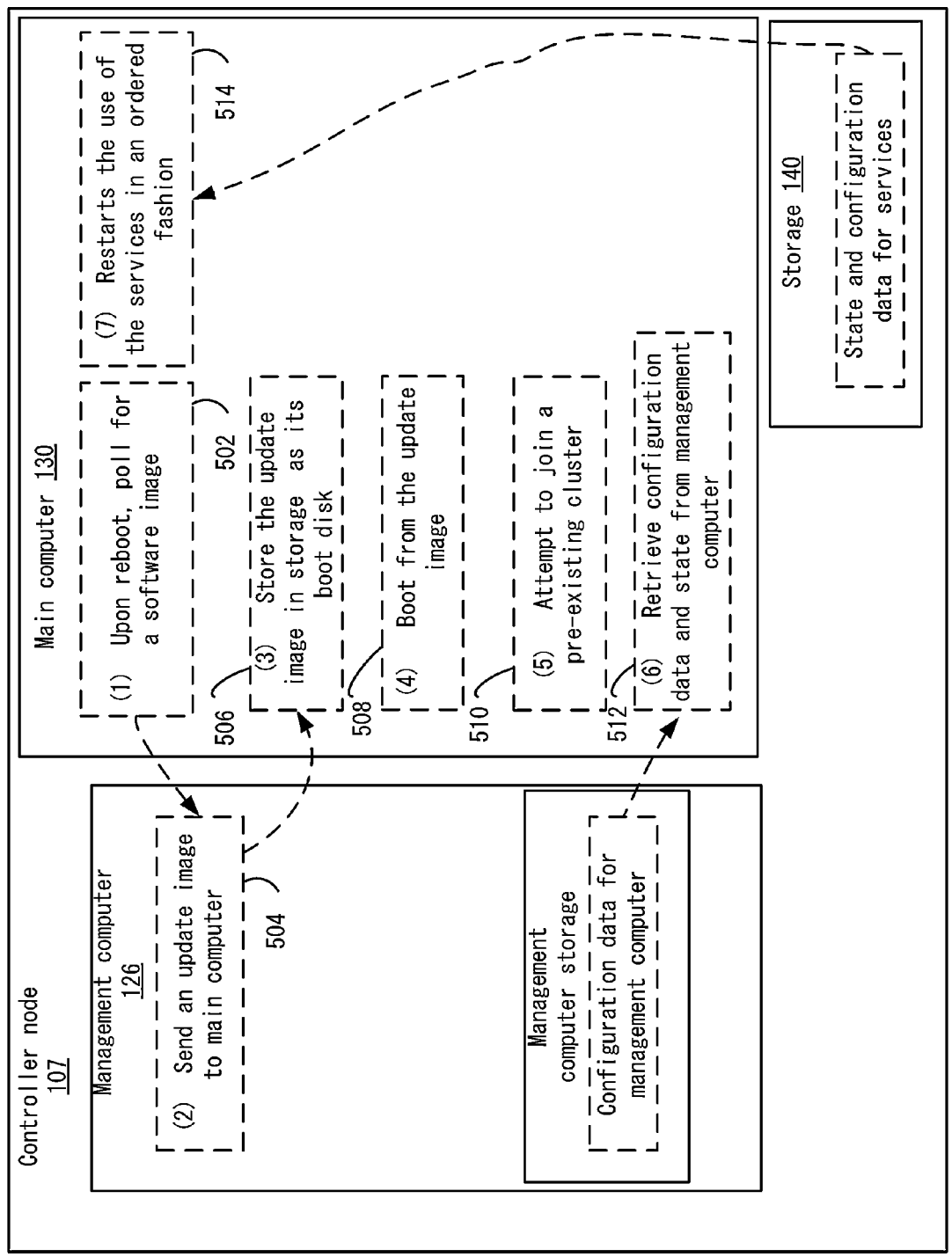
FIG. 5 depicts another example of the upgrade process for the main computer according to one embodiment.

Upon reboot, main computer 130 may start the upgrade process by attempting to determine the update image. FIG. 5 depicts an example of the upgrade process for main computer 130 according to one embodiment. In a step #1 (reference 502), main computer 130, upon reboot, polls management computer 126 for a software image, such as the update software image. For example, main computer 130 may send a request to management computer 126 for the update software image. The request is sent to management computer 126 because management computer 126 has received the software update package, has verified the software update package, and has communication pathways with main computer 130 sufficient for main computer 130 to download the upgrade image from management computer 126 during main computer's 130 start up routine. In a step #2 (reference 504), management computer 126 determines relevant components of the software update package and sends an update image to main computer 130. In a step #3 (reference 506), main computer 130 stores the update image in storage 140 as its boot disk. This is the image that main computer 130 boots from upon any restart. Once stored, in a step #4 (reference 508), main computer 130 concludes its start-up routine by booting from the update software image that was stored in storage 140. The reboot is used to ensure controller node 107 enters into a known state. This is on contrast to an in-place upgrade, which may permit the possibility of entering into unknown error states. In particular embodiments, main computer 130 is rebooted from a new or known master update image. The reboot permits controller node 107 to download its new update image from management computer 126 and boot from that new image.

At this point, main computer 130 (controller node 107) has no state data due to the update. Thus, controller node 107 does not know if controller node 107 is part of a multi-controller system (e.g., a cluster) or not. In this case, in a step #5 (reference 510), main computer 130 attempts to join a pre-existing cluster. In a case of a single-controller system, no cluster exists, and therefore main computer 130 does not join a cluster. In this example, it is assumed this is a single-controller system. However, a multi-controller system will be described in more detail below.

In a step #6 (reference 512), main computer 130 retrieves configuration data and state data that was written to management computer 126 previously. This is the configuration and state data for main computer 130 and can be used to reconstruct the previously-withdrawn services. Thus, in a step #7 (reference 514), main computer 130 restarts the use of the services in an ordered fashion. For example, stateful services, such as database services and databases, are initialized and populated with the pre-upgrade state data first. Main computer 130 may perform any migrations or transformations to this data before proceeding with further service restarting so that any services that rely on this data are presented with a consistent presentation of data. After restoring the stateful services, main computer 130 restores the stateless services by retrieving configuration data from storage 140 for the stateless services. Once the services have been restored, main computer 130 performs any post-update actions.

Figure 6:
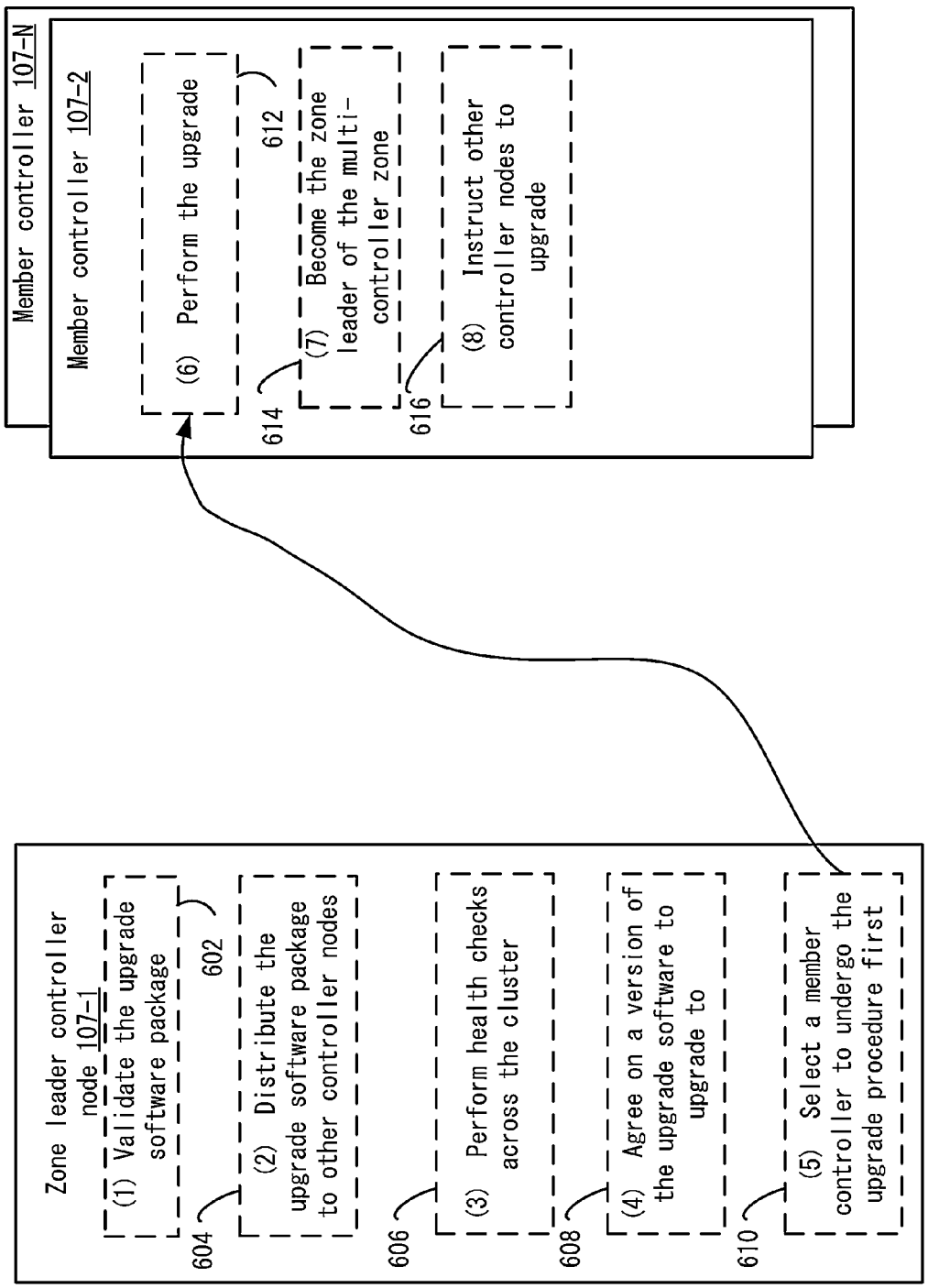
FIG. 6 depicts an example of the upgrade process in a multi-controller node system according to one embodiment.

In a multi-controller node system, orchestration of the upgrade between controller node systems 107 is needed. FIG. 6 depicts an example of the upgrade process in a multi-controller node system according to one embodiment. In one embodiment, the multi-controller node system may include two or more controllers. The individual controller upgrade steps may be the same as discussed above, but the order of upgrade for each controller node 107 may be defined. In one embodiment, the multi-controller node system may have a zone leader that acts as the leader and holds authoritative data for the cluster. As shown, a controller node 107-1 is the zone leader. Other member controller nodes 107-2-107-N are included in the multi-controller system.

In a step #1 (reference 602), zone leader controller node 107-1 may receive and validate the upgrade software package. In a step #2 (reference 604), when validated, zone leader controller node 107-1 distributes the upgrade software package to other controller nodes 107-2-107-*n*. Each controller node 107-2-107-N also validates the upgrade software package.

In a step #3 (reference 606), zone leader controller node 107-1 performs health checks across the cluster. The health checks ensure that all controller nodes 107 in the cluster are operating without any problems that may affect the upgrade.

Then, in a step #4 (reference 608), zone leader controller node 107 communicates with controller nodes 107-2-107-N to agree on a version of the upgrade software to upgrade to. This ensures that all controller nodes 107 are upgrading to the same version. In a step #5 (reference 610), if a consensus on a version is agreed on, zone leader controller node 107-1 selects a member controller 107-2-107-N to undergo the upgrade procedure first. In this case, zone leader controller 107-1 does not upgrade itself first. A member controller node 107-2 is selected to upgrade first, after which such controller node 107-2 can be named zone leader while zone leader 107-1 may maintain the essential data for the current software. This may be important if the upgrade fails. In the case of a failure, the cluster may revert back to the original software.

Once being elected to perform the upgrade, in a step #6 (reference 612), member controller 107-2 performs the upgrade. This upgrade may be performed as described above in the single-controller upgrade process. When member controller node 107-2 completes the upgrade process, member controller node 107-2 rejoins the cluster. In a step #7 (reference 614), member controller node 107-2 becomes the zone leader of the multi-controller zone. In this case, zone leader controller node 107-1 abdicates the zone leadership to member controller node 107-2, which has been upgraded. By abdicating the leadership, member controller node 107-2 is the zone leader and operating at the updated software version. This ensures that the zone leader is operating using the latest version of the software. This may be important because the zone leader is the master source of many key services, such as database services, and thus needs to reflect the latest version of the software.

In a #step 8 (reference 616), new zone leader controller node 107-2 instructs other controller nodes 107 to upgrade.

For example, former zone leader controller node 107-1 and other controller nodes 107 may perform the upgrade process in series and/or parallel. In one embodiment, the controller nodes may be upgraded in series such that a quorum may be maintained. For example, the multi-controller node system works on a quorum system so that a majority of the controller nodes 107 are available to ensure consistent data. When controller node 107-2 is successfully upgraded, new resources may be scheduled on controller nodes 107 or existing ones may be terminated, and preexisting resources will have been available throughout the upgrade process.

When controller nodes 107 have been upgraded, controller nodes 107 may also instruct attached physical resource nodes 102 to perform in-place upgrades of individual software packages. For example, the individual software packages may be updated in place without disrupting cloud instances that may be running on these physical nodes.

Accordingly, the upgrade process may be performed to upgrade a distributed computing system that includes insular, but interdependent components. The withdrawal of services prevents various services from generating or committing changes that may corrupt the state of the system. The consistent state image that is maintained provides for a reliable upgrade. Also, the multiple verification steps may establish a root of trust that chains the validation from management computer 126 to main computer 130, to physical nodes 102. The timing and sequence of events, the preservation of state and configuration data on management computer 126, other persistent data storage, and the coordination of functions across multiple controllers provide the ability to upgrade components of the distributed computing system without user intervention.

Orchestration Service

Orchestration Service Architecture

The distributed computing system is arranged in a hierarchy in which instances of an orchestration service are distributed in various entities and interact via a communication service. The orchestration service is responsible for creating and maintaining a cohesive and unified system that appears as a single system to the user, despite failures of both hardware and software, and for coordinating the execution and management of all system services and ensuring their availability. The orchestration service's basic functions include starting, stopping, restarting, monitoring, configuring, and reconfiguring various system components. The hierarchy of the orchestration service gives the distributed computing system its turnkey character. In this example, this turnkey cohesion is achieved by operating an instance of the orchestration service on each controller node 107, physical node 102, and zone 702, which collectively implement the overall orchestration system service. This example of loosely coupled orchestration service instances (OSI) is organized in a manner that decentralizes the overall management of a zone, requiring little direct communication between orchestration service instances in general, and enabling better scalability as a distributed computing system grows in the number of controller nodes 107 and physical nodes 102 without unacceptably increasing the cost of communication within the system.

Figure 7:
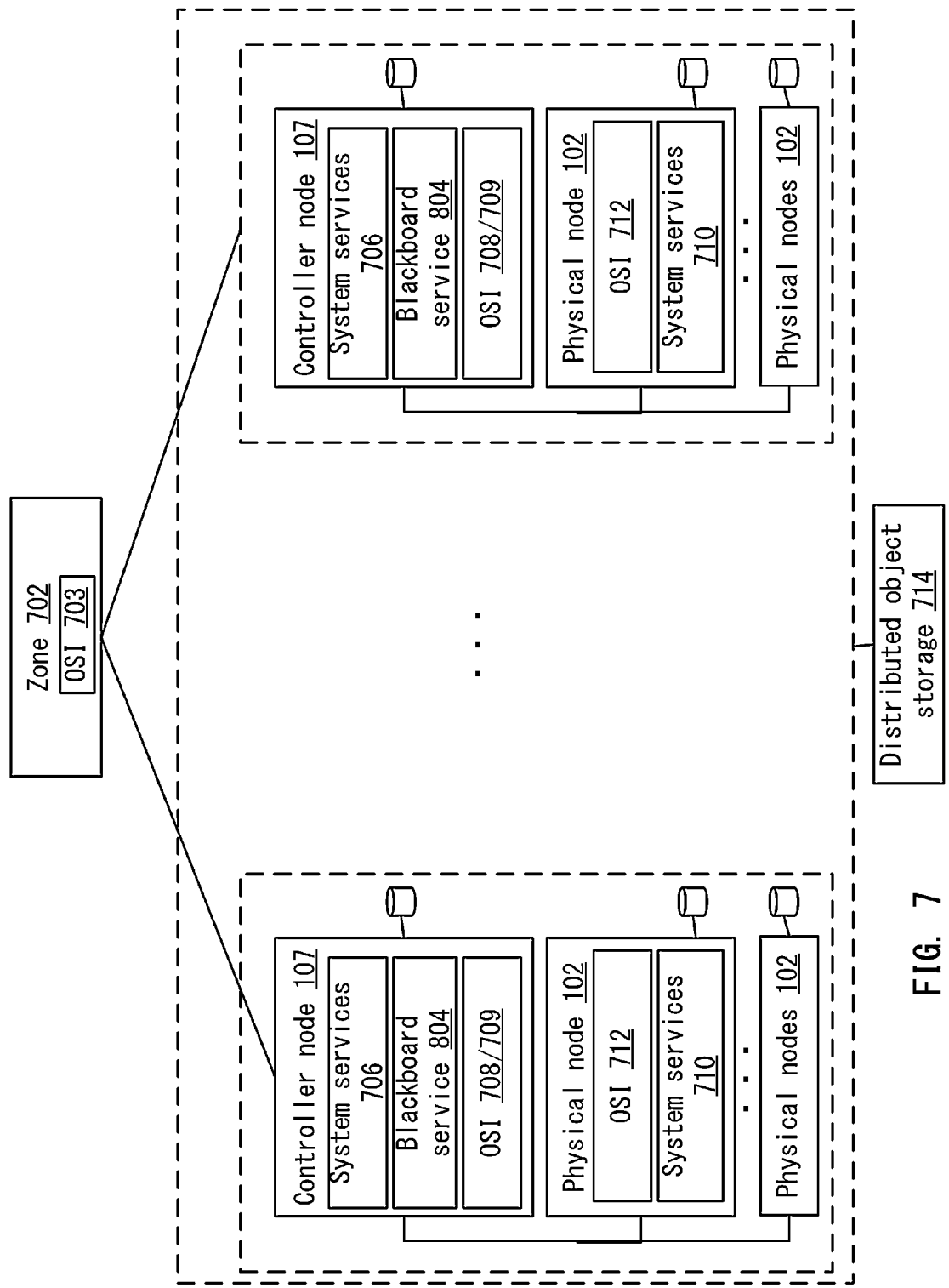
FIG. 7 depicts an example of a logical system model of the distributed computing system according to one embodiment.

FIG. 7 depicts an example of a logical system model of the distributed computing system according to one embodiment. In this logical system model, a distributed computing zone 702 comprises one or more racks (sometimes referred to as clusters). This abstraction of a zone provides the single system image of the physical distributed computing system to a user. Each rack may include a single controller 107 and one or more physical nodes 102. Controller node 107 is an abstraction of the general computing and switching capabilities of a controller node, and physical node 102 is an abstraction of general computing capabilities of a physical node. Each controller node 107 and physical node 102 hosts local persistent storage, shown as canonical disk icons attached to controller nodes 107 and physical nodes 102. Note that the disk icon merely illustrates the existence of a persistent store sufficient to provide enough storage capacity so that controller nodes 107 and physical nodes 102 are able to carry out their functions.

The distributed computing system may provide various services, such as an orchestration service, controller system services, physical node services, and object storage services. In particular, each controller node 107, physical node 102, and zone 702 runs an instance of the orchestration service (OSI) 703, which manages the overall functions of the distributed computing system. Further, a hierarchy of other orchestration service instances 708, 708, and 712 operate together to collectively implement the orchestration service. As will be described in more detail below, the hierarchy of the orchestration service instances communicate indirectly through a communication service referred to as a "blackboard service", which maintains a global system state of the distributed computing system. All orchestration service instances 708 and 709 on controller node 107 may maintain this global system state. The indirect communication allows the orchestration service to be decentralized and the distributed computing system can be scaled more efficiently as new physical nodes 102 and controller nodes 107 can communication through the blackboard service when added to the distributed computing system. The blackboard service is a highly available configuration and synchronization service. It may exist on each controller node 107 and can thus survive the failure of any single controller node 107 in a multi controller system. By appealing to this blackboard service for configuration and state data, the various subsystems and components in the distributed computing system have a common authoritative location for this information. This reduces cross talk in the distributed computing system and provides for consistent authoritative data that does not need to be replicated among each of the components of the distributed computing system.

Controller 107 may have multiple orchestration service instances running on it, such as orchestration service instances 708 and 709. Orchestration service instance 708 manages the controller node and orchestration service instances 709 manage respective system services 706. For example, system services 706 operate in the controller node within containers on a respective controller node 107. Orchestration service instances 709 are responsible for locally managing the system services in the containers. Also, orchestration service instance 708 may oversee the containers and other controller node operations. Additionally, orchestration service instance 708 may coordinate with other controller nodes 107 or other physical nodes 102 on demand. The inclusion of orchestration service instances 708 and 709 on controller nodes 107 allows the distributed computing system to manage the overall coordination and health of the service containers, as opposed to the services within those containers, and in the case of the zone leader, manage coordination and health of the cluster, such as controller node 107 and the services on those controller nodes 107.

Each physical node 102 runs a set of system services 710 that operate on respective physical nodes 102. These system services 710 perform operations, such as launching virtual machines (VMs) on behalf of customers, storing VM data on node-local persistent storage, and accessing the distributed Object Storage Service 714. In one example, a portion of a computer system service 706 runs on a controller node 107 and is responsible for choosing a physical node 102 that satisfies the resource requirements demanded by the customer for a given VM and coordinating with a compute service 710 on physical node 102. Each running VM is guaranteed a portion of the local disk storage attached to the node.

In the hierarchy of orchestration service instances, an orchestration service instance 712 also runs on physical node 102 to orchestrate a respective system service 710 running on physical node 102. Orchestration service instances 712 may be responsible for locally managing a compute service, a volume service, and a network service, verifying the local service's health, and ensuring the local services availability in spite of failures. The inclusion of orchestration service instances 712 on physical nodes 102 allows the distributed computing system to scale efficiently as physical nodes 102 can be added to the system in a reliable fashion. Orchestration service instance 712 on physical node 102 is responsible for ensuring that required services are running and configured to interact with the attached controller node 107. The detection of failures due either to software or hardware fault results in physical node 102 being marked as offline such that controller node 107 will no longer schedule new resources to be created or operated on the failed physical node 102.

In one example embodiment, an Object Storage Service (OSS) 714 consolidates all remaining physical storage from all disk storage on all physical nodes into a single large pool of storage. OSS 714 is decentralized and masks the inevitable failures of nodes and disks; it replicates data for high availability. To emphasize that OSS 714 is a zone-wide resource, FIG. 7 shows the distributed Object Storage Service spanning the entire zone of controllers and nodes, assimilating the disk storage from all physical nodes.

Example System Orchestration Service

Figure 8:
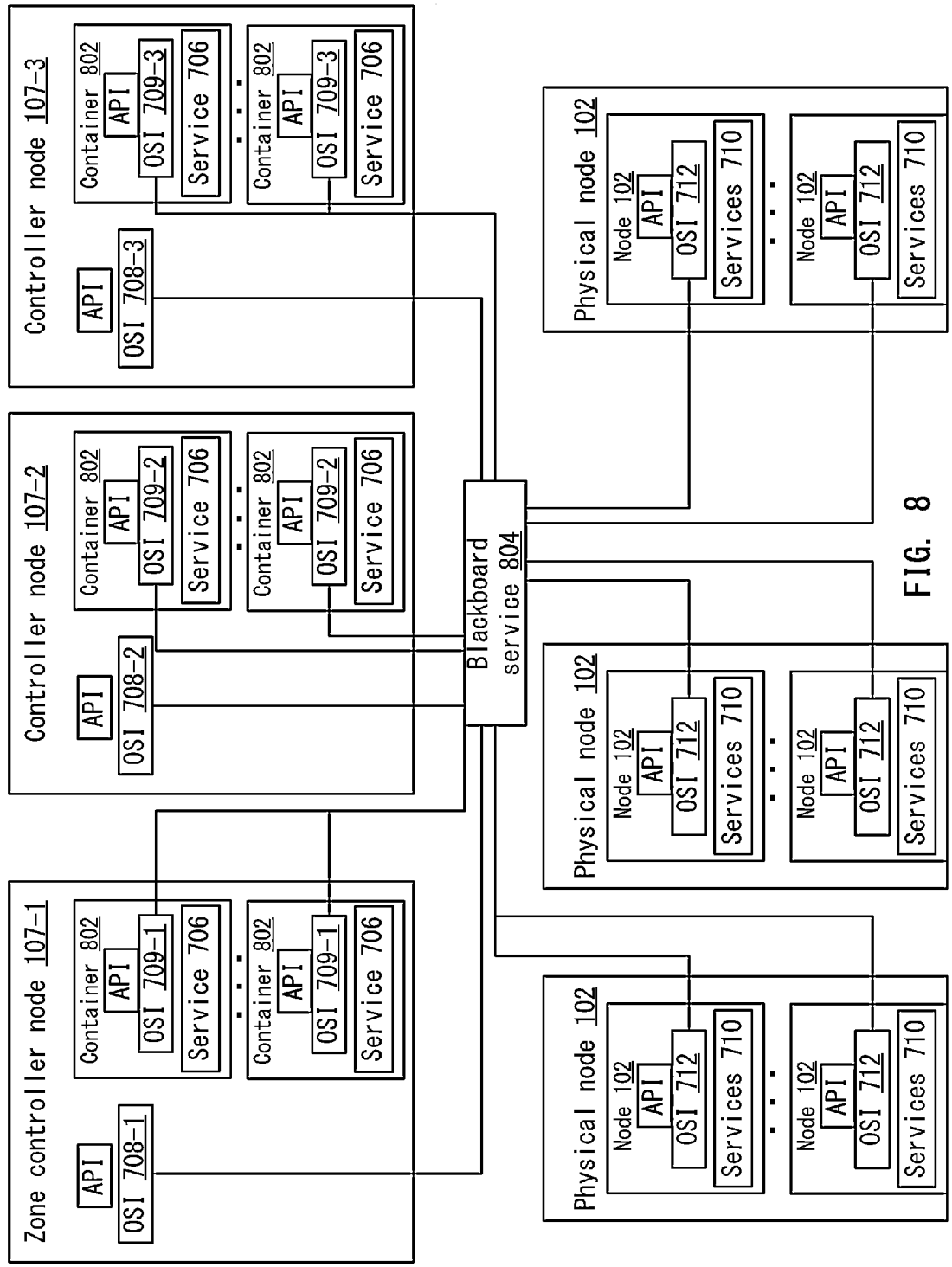
FIG. 8 illustrates a more detailed example of an orchestration service architecture in the distributed computing system according to one embodiment.

FIG. 8 illustrates a more detailed example of an orchestration service architecture in the distributed computing system according to one embodiment. There are three controller nodes 107-1, 107-2, and 107-3, one of which is the distinguished "zone" controller 107-1. The zone controller operates as a leader holding the master copies of certain databases and other systems that operate in master-slave configurations. Each controller node 107 has an orchestration service instance 708, but the zone leader's orchestration instance 708-1 is considered superior and authoritative for many functions to other orchestration service instances 708-2 and 708-3. That is, the zone leader is responsible not only for ensuring the operation of service containers 802 on its controller node, but also for the availability and operational health of other controller nodes 107 and physical nodes 102.

Each controller node 107 includes a set of system service containers 802. Containers 802 isolate system services 706, such as the operating system and application software, including user-space operation system virtualization such as LXC or chroot jails and full virtualization such as KVM. Although containers are described, the container may be are may be any means of isolating system services 706, and may be considered a virtual machine or other implementation that isolates a system service 706. Each container 802 contains an orchestration service instance 709 and associated system service 706. Orchestration service instance 709 monitors an associated system service 706 that is found in a container 802. This is in contrast to orchestration service instance 708, which monitors containers 802.

Each physical node 102 contains an orchestration service instance 712 and a set of one or more system services 710. Orchestration service instances 712 monitor the associated system services 710 on physical node 102. For example, for each system service 710, a corresponding orchestration service instance 712 may be provided to monitor a respective system service 710.

As mentioned earlier, orchestration service instances 703, 708, 709, and 712 are organized hierarchically, each with a core set of functionality and some additional functionality depending on their place in the hierarchy. The zone's orchestration service instance 703 may present the illusion of a single system and may be responsible for exposing customer-facing functionality, adding and removing controller nodes 107 and physical nodes 102 from zone 702, verifying the health of all nodes, maintaining the global state of the system, backing up any data or state information, and masking failures, for example. Orchestration service instances 708 have functionality that monitor controller node level information, orchestration service instances have functionality that monitor system service 706 information for containers 802, and orchestration service instances 712 have functionality that monitor system service 710 information in physical nodes 102.

In this example, the controller's node orchestration service instance 708 manages the controller node 107 including the status of service containers 802. This includes managing the set of controller-specific system services running on it (starting, stopping, restarting, and configuring), verifies their health, backs up any data or state information, and ensures that their capabilities are available in spite of failures. An example system service may include, for example, a system service provided in OpenStack™ for supporting cloud computing functionality. Local data or state information may be recorded on persistent storage associated with that controller node 102.

Orchestration service instances 709 manage system services 706 within a respective container 802. If any system service 706 fails for whatever reason, it is the responsibility of the associated orchestration service instance 709 to restart that service. Orchestration service instances 709, therefore, behave very much like a watchdog over that service.

The physical node's orchestration service instance 712 manages that physical node's system services 710 (starting, stopping, restarting, and configuring) and ensures their availability. Orchestration service instance 712 may also record local data and state information on persistent storage associated with that node.

There may be two types of communication in the present example orchestration service architecture. First, each orchestration service instance 708, 708, and 712 shares a common blackboard service 804 as a means of communicating state information, both static and dynamic, with one another. Each orchestration service instance 708, 708, and 712, whether in a controller node 107, container 802, or on a physical node 102, establishes a session to the blackboard service 804 to record and update the global system state. The global system state may include the names and states of all controller nodes 107 and physical nodes 102, as well as the names and states of all the system services 706 and 710 running in the zone. This global state incorporates the current known state of all the controller nodes 107 and physical nodes 102. Second, each orchestration service instance 708, 708, and 712 is equipped with an API. An entity in the distributed computing system may invoke operations of the API to cause that orchestration service instance to perform the indicated function, such as asking for status of a system service like MySQL.

Each controller node 107 may record its existence and some additional state information in the shared blackboard service 804. In addition, every system service 710 on a controller node 107 may also record its existence and some state information in the shared blackboard service (indicating which controller the system services 710 are running on). In one particular example, it is through the shared blackboard service 804 that the zone orchestration service instance 708-1 can learn about a new controller node 107 and all of the controller node's system services 706, which constitutes a portion of the global system state. Further, orchestration service instance 708 may directly communicate with the orchestration service instances 712 running on each physical node 102 in its rack only when that physical node 102 is booting for the first time and while that physical node 102 is being integrated into the cloud fabric. Orchestration service instance 712, too, directly communicates with the controller node's orchestration service instances 708/709 only during the physical node's booting sequence to incorporate it into the cloud fabric.

In one example implementation, unlike a controller node 107, every system service 710 (compute, volume, network) on a physical node 102 does not record its existence in the shared blackboard service. Instead, these services 710 update a central store residing on the physical node 102 at a pre-determined interval to indicate that they are alive (e.g., a "heartbeat"). Orchestration service instance 712, through its function definition, may detect whether the local store was updated or the service is not running; if the status has not been updated or the service is dead, for example, then orchestration service instance 712 updates the corresponding physical node's status to "offline" on blackboard service 804, which indicates that something is wrong, and the whole physical node may go offline. In this way, the zone controller node 107-1 may discover a problem with that physical node 102 through its own periodic probing of the global system state in the blackboard service 804. The service in question may be restarted by the orchestration service instance 712 on the physical node 102.

Particular embodiments maintain the currency of the state that captures and reflects an ever-changing distributed computing system over a period of time in the face of failures—especially as the distributed computing system grows in size in terms of increasing network traffic and in terms of the number of controller nodes 107, the number of physical nodes 102, and their storage capacity. The hierarchical organization of a distributed computing system mitigates this complexity by constraining the communication domains and limiting the impact of hardware failures. Physical nodes 102 in a rack are directly connected to their controller node 107 only—not to any other controller node 107, which might be done for high availability in other systems; such an organization both defines a communication domain for the physical nodes 102 in the rack and isolates physical nodes 102 from other physical nodes 102 in other racks. Communication patterns are well-defined, as described earlier, because the communication in the system flows over different system-wide logical networks that are layered on top of the same physical network. For example, data traffic between running virtual machines occurs over the guest logical network, whereas all the orchestration service server instances communicate over the management logical network.

A portion of this global system state is dynamic, changing as system components join or leave the system. A major portion of the global system state is static, characterized typically by configuration data that is fixed. This configuration data in the distributed computing system is represented by distributed computing "models", which are schema definitions for data that is gathered for objects in the system that have state information. Orchestration service instances 708, 709, and 712 create these model objects in the memory of the associated controller node 107, container 802, or physical node 102. Controller nodes 107 make changes to the state of these model objects, and these changes are reflected in the blackboard service 804 by invoking the appropriate methods on the objects; thus, the "clients" of the model objects leave the details of interacting with blackboard service 804 to the model objects. Some of the attributes of these objects change over time, and thus are dynamic, like the status of a container 802, which could be "online" or "off-line." What portion of the global system state is dynamic and what portion depends on the semantics of the objects that are stored in the state.

The following will now discuss the blackboard service in more detail.

Example Orchestration Service Architecture Using the Blackboard Service

Figure 9:
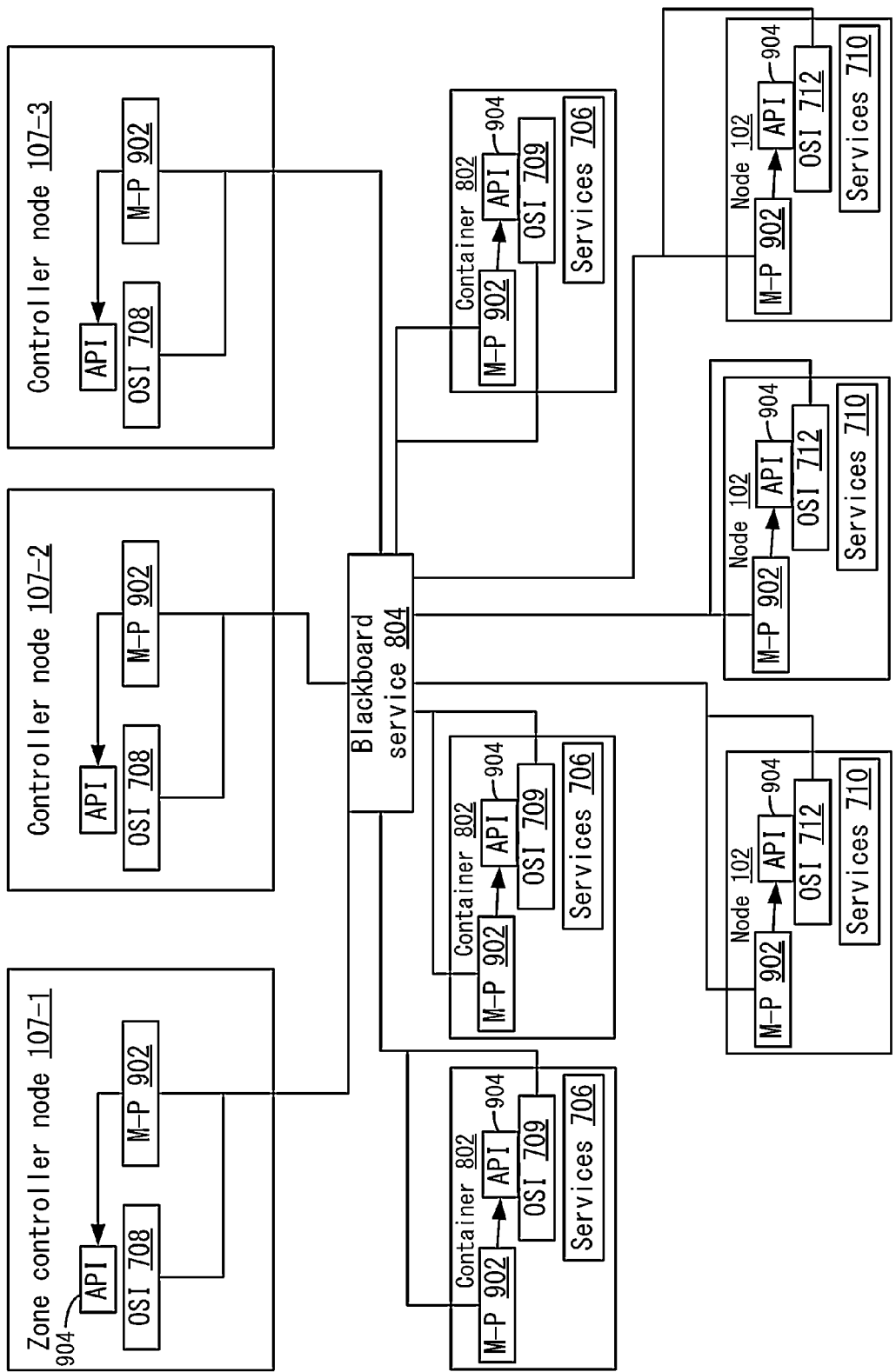
FIG. 9 shows a logical view of an example orchestration service architecture illustrating the orchestration service and a shared blackboard service according to one embodiment.

FIG. 9 shows a logical view of an example orchestration service architecture illustrating the orchestration service and a shared blackboard service 804 according to one embodiment. This logical view shows only the controller nodes 107, containers 802, and physical nodes 102 independent of what controller node the containers reside in and what racks the physical nodes reside in.

Each orchestration service instance 708, 708, and 712 may establish a session to blackboard service 804 to register its existence so that other orchestration service instances 708, 709, and 712 may become aware of it. In one embodiment, a presence service (M-P) 902 performs this function to announce the existence of an orchestration service instance. In one embodiment, the orchestration service instance and presence service 902 exist as a pair. They are logically part of the same service, and therefore may be a single component rather than separate components as illustrated in this example implementation. Presence service 902 may also perform a second function—conducting an election on behalf of a system service that must be organized as a master with one or more slaves, which will be discussed in more detail below.

Each presence service 902 may have a single session to the blackboard service 804. Also, each orchestration service instance 708, 708, and 712 may have a separate, distinct, session to the blackboard service 804. This session from each orchestration service instance 708, 708, and 712 may be used for its communication with as a shared service, rather than for existence, which is the function of the M-P server instance. When a single session is mentioned, it is generic and may actually encompass multiple sessions, depending on how presence service 902 and each orchestration service instance 708, 708, and 712 are configured and is not meant to limit the implementation. Note that the line indicating the session from the orchestration service is shown to intersect with the session line emanating from the M-P server instance for clarity; the sessions are, in this example, separate and distinct sessions and are not shared.

Each orchestration service instance 708, 708, and 712 may have a second communication path via an orchestration service API 904. Entities communicate with an orchestration service instance by invoking API operations. For example, presence service 902 can ask its associated orchestration service instance 708, 709, or 712: "Are you healthy?" through API 904 by sending an appropriate HTTP request. Further, orchestration service instance 708, 708, and 712 can respond to API invocations from other components, such as other orchestration server instances.

The dynamic state is determined by the existence or non-existence of presence service 902. For example, if either presence service 902 in a container 802 fails or the container 802 itself fails (causing presence service 902 instance to also fail), then the data node corresponding to container 802 will be automatically deleted from the global system state in blackboard service 804. It may not be enough to record existence or nonexistence of a data object because some entity may be required to detect these changes or be notified of them and in either case, take some appropriate action, if necessary. That entity is the set of orchestration service instances that are responsible for periodically checking the global system state for the existence of all the service containers 802 residing on their respective controllers, detecting these changes, and updating the affected model objects. In turn, this translates into updating the corresponding data objects in blackboard service 804.

Figure 10:
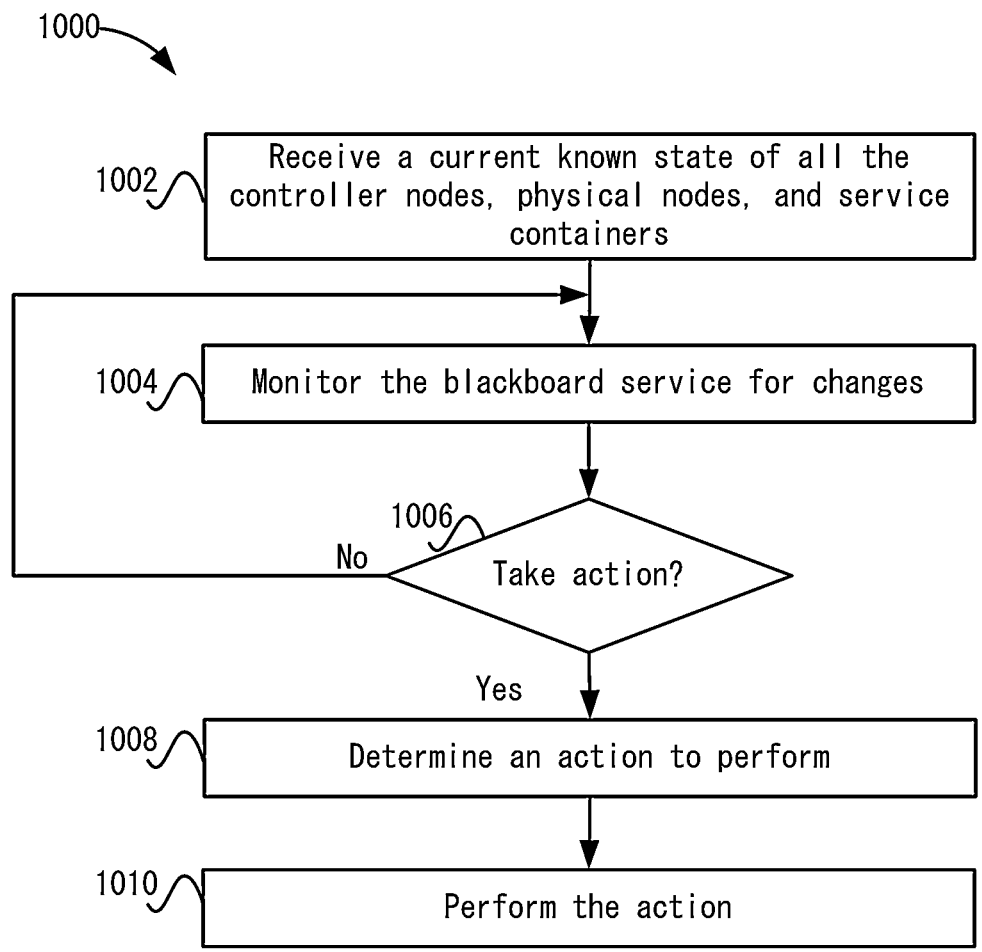
FIG. 10 depicts a simplified flowchart of monitoring the blackboard service according to one embodiment.

FIG. 10 depicts a simplified flowchart 1000 of monitoring blackboard service 804 according to one embodiment. At 1002, blackboard service 804 receives a current known state of all the controller nodes 107, physical nodes 102, and service containers 802. Upon initial startup, controller nodes 107, physical nodes 102, and service containers 802 register their presence in blackboard service 804. The current known state may also include state information determined during performing of system services. For example, problems discovered by any orchestration service instance 708, 709, and 712 may be sent to blackboard service 804. In one example, orchestration service instance 712 may detect a failure of physical node 102 and update the status of physical node 102 on blackboard service 804.

At 1004, orchestration service instances 708, 709, and 712 may monitor blackboard service 804 for changes. When changes are detected, orchestration service instances 708, 709, and 712 determine if an action needs to be taken. The actions may include changing data structures to represent the changes, or taking a remedial action if there is a problem. If no action needs to be taken, then the process reiterates to monitoring blackboard service 804 for more changes. If there is an action to take, at 1006, orchestration service instances 708, 709, and 712 determine an action to perform. An action may be restarting a service or electing a new master. At 1008, orchestration service instances 708, 709, and 712 perform the action. In the above, orchestration service instances 708, 709, and 712 perform the monitoring and performing the action through blackboard service 804. Indirectly communicating through blackboard service 804 allows the monitoring to be performed by a hierarchy of distributed orchestration service instances 708, 709, and 712. The blackboard exists outside of the hierarchy of distributed orchestration service instances 708, 709, and 712 and is therefore available of all components of the hierarchy. In addition, the blackboard itself is structured hierarchically, providing elements of the hierarchy the ability to walk a tree and determine the relationship of components in a hierarchical fashion.

In one embodiment, the hierarchy of orchestration service instances 708, 709, and 712 determines what each orchestration service instance is monitoring. For example, orchestration service instance 708 of controller node 102 manages controller node 102, which includes the status of service containers 802. Orchestration service instances 709 are responsible for monitoring the related system services 706 in service containers 802. This includes managing system service health, controlling and managing system services 706, and report system service status to blackboard service 804. Orchestration service instances 712 on physical nodes 102 monitor system services 710 on physical nodes 102. The zone controller node 107-1, in addition to performing controller node operations on the local controller, is responsible for sweeping the cluster and inspecting health and issuing management commands.

System services may be operated in a master-slave configuration. When a system service 706 is created in a container 802, an election process may be performed. This process is described below in the presence component.

Example Presence Component

Figure 11:
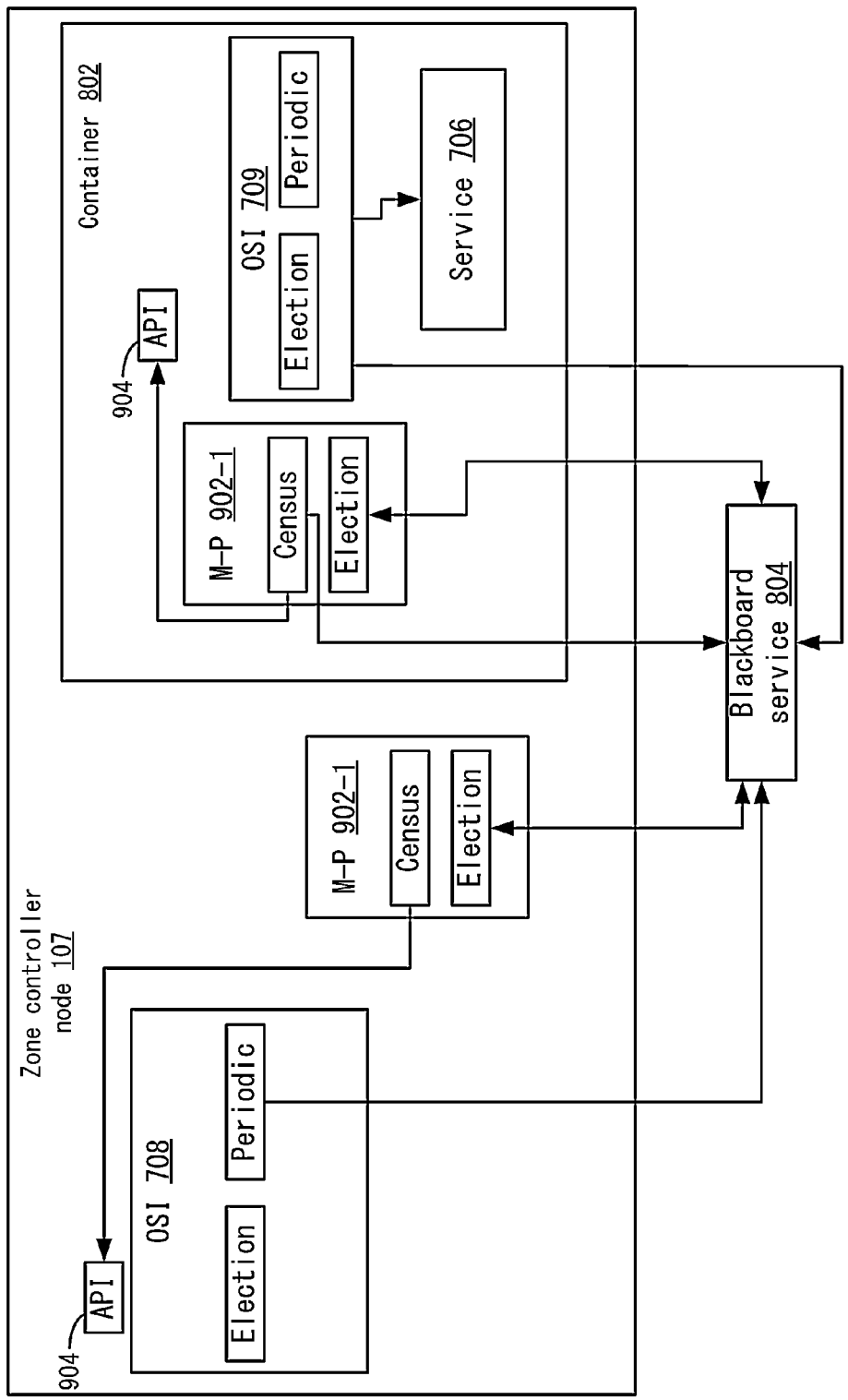
FIG. 11 depicts an example of a presence service according to one embodiment.

FIG. 11 depicts an example of a presence service 902 according to one embodiment. Presence service 902 may execute as either a single standalone process or a pair of processes, which are associated with an orchestration service server instance. More specifically, presence service 902 may include two modes, namely census and election. In FIG. 11, there is a presence service 902-1 associated with the zone controller node 107-1 and another presence service 902-2 associated with orchestration service instance 709 in a container 802. Presence service 902 may operate in two modes of census and election.

In census mode (configured based on a configuration file), presence service 902-2 executes is a process and may register itself with blackboard service 804 to indicate that presence service 902-2 exists and is operational on behalf of orchestration service instance 709. This registration involves creating a data node in an established session (the connection to the blackboard service) between presence service 902-2 and the blackboard service 804. In one example implementation, a data node under the blackboard service is named uniquely by a path that resembles a UNIX filesystem to a file or directory such as /orchestration/presence/node/ {controller#}-{MAC address}, which names a specific node as a combination of the controller node number of the controller node and the MAC address of the controller node's primary network interface. Controller nodes 107 are assigned integer values, and these are the controller node numbers. A data node representing existence is sometimes referred to as "ephemeral" because its lifetime is tied to the session and if either the session or the client application program fails, the data node may be automatically deleted by the blackboard service.

In order to test for existence, one approach is to query the blackboard service periodically and check to see whether the data node for orchestration service instance 709 in question exists. If the data node does not exist, then this means orchestration service instance 709 likely failed because presence service 902-2 died and ultimately released the data node. If the data node still exists, then the associated service still exists. In addition, census mode may further determine the "health" of the associated orchestration service instance 709. In census mode, presence service 902-2 queries its companion orchestration service instance 709 via the API and asks the question "Are you healthy?" In turn, the orchestration service instance 709 performs a service-specific health check of orchestration service instance 709. The path of the health check may start with presence service 902-2 in service container 802 making a query to orchestration service instance 709 via API 904 asking "Are you healthy?," which in turn invokes a probe to ask the same question of system service 706.

Orchestration service instance 708 (e.g., the zone controller node leader) may have two responsibilities: first, as explained earlier, orchestration service instance 708 manages all containers 802 for system services on controller node 107; and second, orchestration service instance 708 periodically inspects the blackboard service 804 for the presence of the ephemeral data nodes for all the controller nodes 107 and all physical nodes 102 in a distributed computing system. It is this second function that enables orchestration service instance 708 to quickly react to failure anywhere in the system and take appropriate measures to rectify the situation. The other controller nodes 107 pay attention only to their own containers 802. In FIG. 11, periodic inspection is shown with a line emanating from the "periodic" function group to blackboard service 804. Since the orchestration service leader is inspecting the global system state recorded in the blackboard service on a recurring basis for any changes, whether good (such as a node joining the system) or bad (such as a container failing), the orchestration service leader is also responsible for updating other portions of the global system state that were affected by the change. For example, the zone leader polls the blackboard services 804 periodically (inspects) to see if all the controller nodes 107 and physical nodes 102 that it expects to be in the state are present and accounted for by checking for the data objects corresponding to presence services 902. If the data object has disappeared, then the zone leader concludes that the controller node 107 or physical node 102 has failed and marks as "offline" the model or data object corresponding to this specific controller node or specific physical node. Alternatively, the zone leader could wait for a notification that the data object corresponding to presence service 902 has been deleted from the global system state and take action then, rather than constantly checking for changes. Waiting for notification about an event may be a more advantageous approach than polling, particularly as the system grows in size as well as the corresponding global system state because polling may consume unnecessary CPU cycles.

In election mode, orchestration service instances 709 run a second, standalone process, whose job may be to manage elections, which encompasses both electing and unelecting. Note that not every orchestration service instance requires presence service 902 to operate in both census and election modes. As explained earlier, if the system service is organized in a configuration with a single master and one or more slaves, then there will be presence service 902 of two processes to handle both the census and election modes.

In container 802, the election mode process in presence service 902-2 establishes a long-lived session to the blackboard service 804. Each election mode process works in conjunction with election mode processes on the other controller nodes 107 for a specific system service to ensure that if the service requires a single leader, then between themselves presence services 902 will elect a new leader. Further, the election mode processes ensure that there is always one leader, not two or three.

Figure 12A:
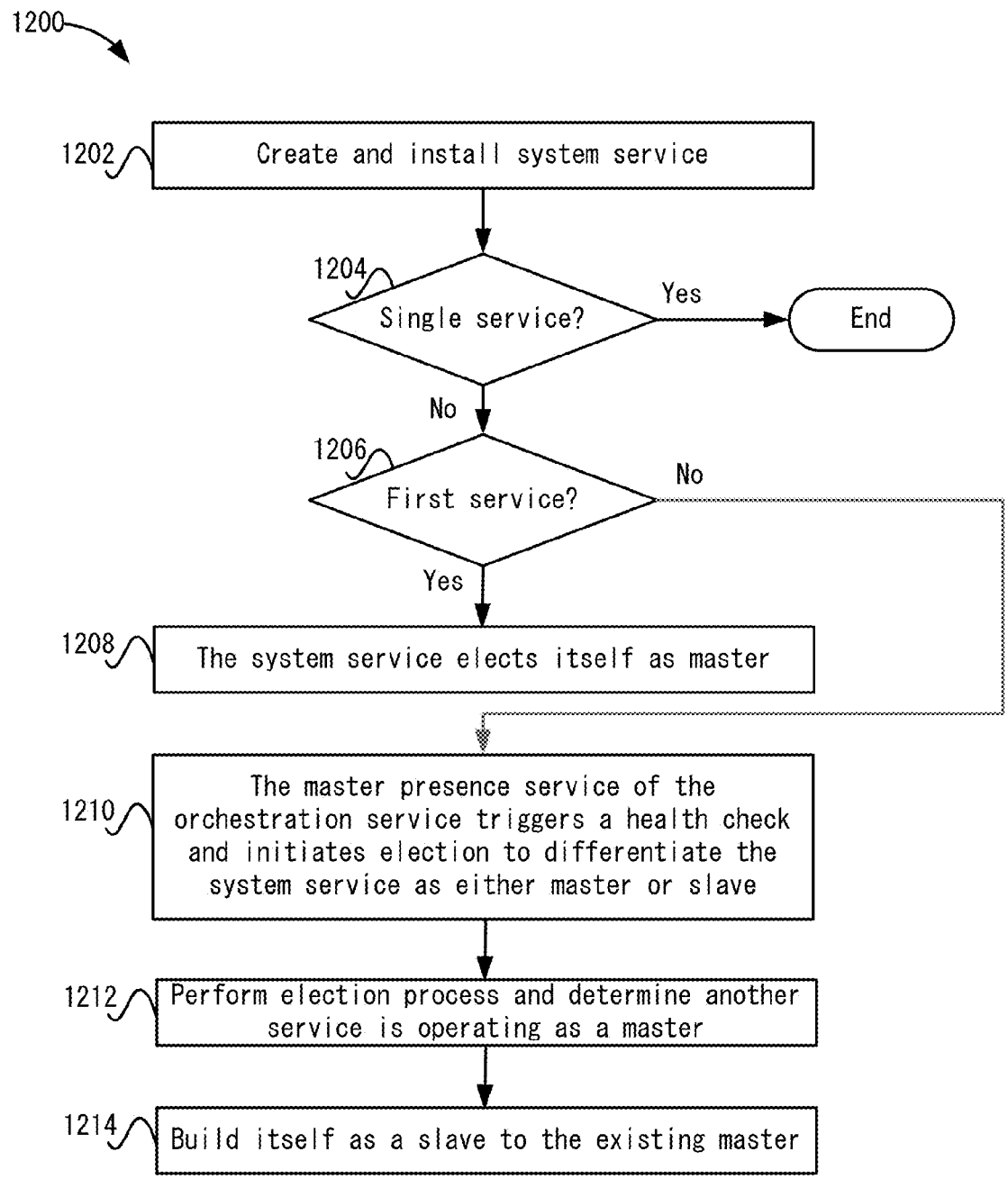
FIG. 12A depicts a simplified flowchart of a method for performing the election process according to one embodiment.

FIG. 12A depicts a simplified flowchart 1200 of a method for performing the election process according to one embodiment. At 1202, a system service 710 is created and installed. At 1204, presence service 902 determines if the service is a single service. If so, the process ends. However, if the service must be operated in a master-slave configuration, the service determines if it is the first instance at 1206. If so, at 1208, presence service 902 elects itself as master. If no other containers for this service are registered, the service elects itself as the lowest number registration of the service. This process includes changing the configuration of the service to act as master and loads all necessary data to bring the service online as master. In one embodiment, this includes assigning a well-defined floating IP address so that other system services may contact this service as the master. The IP address assigned to the master service is defined as always reflect the master instance of that service and is thus regarded as well defined in that all other service know to look to this address for the master. If the master were to change, the IP address would be updated to reflect the location of the new master.

If there are other instances, at 1210, the master presence service 902 of the orchestration service will trigger a health check and initiate election to differentiate system service 710 as either master or slave. At 1212, during the election process, presence service 902 will find that another instance of the system service 710 already exists and is operating as master. Finding this to be the case, at 1214, presence service 902 builds itself as a slave to the existing master if the master passes health checks and records its presence and operational state as a replicated slave in blackboard service 804.

Example Global System States

Figure 12B:
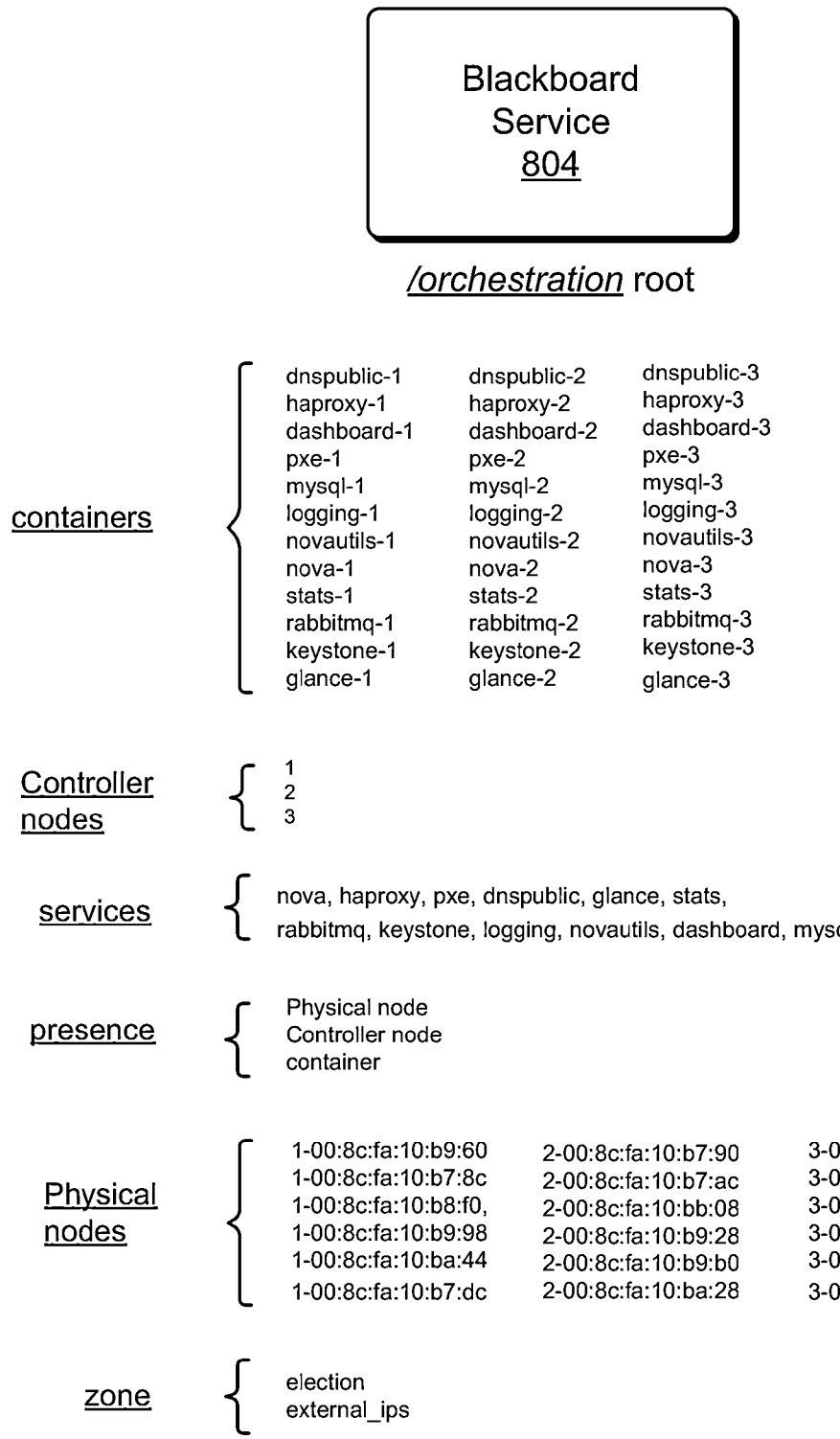
FIG. 12B describes the global system state of a three-controller distributed computing system with eighteen physical nodes apportioned across the three controller nodes 107.

As described above with respect to blackboard service 804, the global system state of the distributed computing system is composed of the state of all controller nodes 107, containers 802, physical nodes 102, and the zone, among other things. FIG. 12B depicts an example of the global system state according to one embodiment. Orchestration service server instances 708, 709, and 712 and presence service instances 902 create the global system state as controller nodes 107, physical nodes 102, and containers 802 are started up. As physical nodes 102, controller nodes 107, and containers 802 fail over time and leave the zone, or as they return to service and join the zone, the global system state keeps track of this ever-changing situation; all the controller nodes and the zone leader detect changes in the system and maintain this state. The state, as described earlier, is recorded in the blackboard service 804, a global resource shared by all orchestration service instances 708, 709, and 712 and all presence services 902. Blackboard aptly describes its function; data is written, and viewers with appropriate permission can read the data nearly instantaneously and determine if changes have been made. Any interested (but authenticated) party may query the global system state to find out at a glance such things like which controller nodes 107 are operational, which physical nodes 102 are down, and whether a specific system service is online FIG. 12B describes the global system state of a three-controller distributed computing system with eighteen physical nodes 102 apportioned across the three controller nodes 107. The data of the global system state stored in blackboard service 804 is organized much like a hierarchical Unix file system where any data object in the file system tree is identified uniquely by a path of components separated by a "/," starting at a root designated as "/"; the components are labeled with human-readable strings. Orchestration service specific state information may be rooted at /orchestration. For example, /orchestration/containers/pxe-1 may be the path name to the preboot execution environment (PXE) container named pxe-1 on controller 1. In the blackboard service, each component in the path is a data object that may both have data and "child" data objects, that is, it can behave as both a file and a directory to use file system terminology. Thus, the containers data object may have data but may also have several child objects, of which pxe-1 is an example. The pxe-1 data object contains information.

The path /orchestration/presence identifies all the presence service components for physical nodes 102, controller nodes 107, and containers 802. Every instance of presence service 902 whether in a controller node 107, physical node 102, or container 802, establishes a session to blackboard service 804 and creates an ephemeral data object on behalf of the controller node 107, physical node 102, or container 802 named respectively. FIG. 12D shows three examples of the presence state information registered on behalf of a controller node 107, a physical node 102, and a container 802 when presence service 902 is configured in census mode according to one embodiment. Specifically, presence state information for controller node 1, presence state information for physical node 2-00:8c:fa:10:b7:90 (Ethernet address) in controller node 2, and presence state information registered on behalf of container named 3-c2:7c:73:37:7e:61 (Ethernet address) on controller node 3. If a container 802, controller node 107, or physical node 102 fails, presence service 902 also fails, and consequently, the ephemeral data node in the blackboard service 804 is automatically deleted. If a client registered interest in the fate of this data node, blackboard service 804 would send a notification back to the client when it deleted the data node.

In FIG. 12D, the containers label is a component in the path /orchestration/containers and identifies all the service containers 802 created in the distributed computing system that have both created their models and registered their existence in the blackboard service 804 under the containers label. The presence service 902 associated with the service container 802 is responsible for establishing a session to blackboard service 804 and creating an ephemeral data node representing the existence of the service container 802. If the container 802 fails, then the data node is automatically deleted from the /orchestration/containers data object, and thereafter is no longer part of the global system state. Containers 802 are the data object stored in blackboard service 804 as a child of the orchestration data object. As an example, /orchestration/containers/dnspublic-1 identifies a specific service container 802 named dnspublic-1 for the system service called DNSPublic. In the distributed computing implementation, the name dnspublic-1 also identifies the unique name assigned to every controller node 102 starting with the number 1, and so in this case, the DNS-Public service container resides on controller node 1. This naming scheme can be seen in FIG. 12C for the other system service containers. Similarly, there is an instance of the service container for DNSPublic on controller node 2 and controller node 3, and the instances are named dnspublic-2 and dnspublic-3, respectively. FIG. 12D shows the state of a container data object in blackboard service 804 corresponding specifically to haproxy-1 residing on controller node 1. Some of the static attributes are "controller_num" (value 1), "external_ip" (10.13.56.8), and "container_name" (haproxy). There are two dynamic attributes for the container "status" (online) and "state" (running). Recall that these two dynamic attributes will be maintained by the orchestration service instance 708 in controller node 107.

The path /orchestration/controllers identifies all the controller nodes 107 that have registered both their "models" and their existence with blackboard service 804. Controller nodes 804 are named by a unique integer, starting at 1. There are three controller nodes 804 in the distributed computing system described by the global system state in FIG. 12B. The presence service 902 associated with the controller node 107 is responsible for establishing a session to blackboard service 804 and creating an ephemeral data node representing controller node 107. If the controller node 107 fails, then the ephemeral data node is automatically deleted in blackboard service 804. FIG. 12C shows the state information specifically for controller node 2 given the path /orchestration/controllers/2. The state information is stored directly in the data object labeled "2." The data resembles a dictionary that associates a key like "status" with a value like "online." In general, all state information for the distributed computing system is stored as a kind of dictionary. Further, "ip_addresses" identifies the three logical networks to which the controller is attached, namely, "data_net," "pxe_net," and "mgmt_net." "switch_net" is empty (null). The orchestration service instance and the associated presence services 902 communicate with each other over the management logical network identified by "mgmt_net." The "mac_address" key identifies the Ethernet, or MAC, address of the network interface card on controller node 107.

The /orchestration/nodes path in blackboard service 804 identifies all physical nodes 102 that were operational at some point in their lifetime and have registered their "model" with blackboard service 804. Operational at some time is used because unless that physical node 102 is taken out of service permanently, it remains in the structure of the global system state as an entry; only its "state" requires updating. FIG. 12C shows the physical node state for physical node named 1-00:8c:fa:10:b9:60 in controller node 1. The name of a physical node is a two-tuple, including the controller node number (an integer) and the Ethernet or MAC address associated with the physical node's network interface card: <controller#>-<Ethernet address>. Physical node 102 is associated with controller node 1 and an Ethernet address 00:8c:fa:10:b9:60 and so has the name 1-00:8c:fa:10:b9:60. Nearly all of this physical node state is static configuration data that will not change. There is a dynamic component indicated by "state," which shows whether physical node 102 is "online" or "offline." If physical node 102 fails, then it is this "state" attribute in the model that will be updated by the Zone leader to "offline."

The /orchestration/zone path in blackboard service 804 includes the election and external_ips data objects. As described above, an orchestration service controller node has an elected leader and thus must participate in any election amongst the orchestration service controller nodes. Associated with the orchestration service controller node is presence service 902 configured in both census and election mode, the former to register existence and the latter to conduct the election if one is needed. Election mode uses the blackboard service to help in conducting an election. Specifically, the blackboard service does this by assigning monotonically increasing and non-overlapping sequence numbers (starting at 0) to the data objects as they are created. If three presence services 902 in election mode try to create the data object in blackboard service 804 to register its existence, the first to succeed in creating a data object has integer 0 assigned as part of the name of the data node, the second has integer 1 assigned as part of the name of the data node, and so on. The leader is the data object with the lowest assigned integer, in this case, 0, and so presence service 902 associated with that data node is deemed the "leader." The other two presence services 902 in election mode "watch" these data objects just in case the acknowledged leader dies (and the data object removed) and set in motion a new election. FIG. 12E shows the data objects for the orchestration service zone controller node as children in the path /orchestration/zone/election in the blackboard service according to one embodiment. This method of electing a leader is a particular recommended example, but other ways may exist. The path—

_c_60855840-7d0e-4426-8953-fae43d415760-lock-0000000000 ← leader
_c_898a913b-72ec-46f1-924f-d15453aa6fa1-lock-0000000013
_c_41c9d9ac-80be-4921-bcb0-ceef3caeeedb-lock-0000000012

/orchestration/zone data object in the blackboard service also has a significant amount of state, as is shown in FIG. 12F. The zone leader has an IP address, namely "zone_ip" with value "172.17.0.150" as part of the state. Another attribute is named "customer_config," which is, as the name suggests, customer configuration information actually provided by the customer and stored in a distributed computing system as part of the global system state.

The /orchestration/zone/external_ips data object contains an exhaustive and complete set of all the external IP addresses that can be assigned to controller nodes, physical nodes 102, and containers 802 in a specific distributed computing system. These IP addresses are divided into two sets, a set of reserved IP addresses in a set of available IP addresses. A reserved IP address is prefixed with the letter "r", separated from the IP address by a hyphen. An available IP address is prefixed with the letter "a" with a hyphen separating them. In the following example the available IP addresses are shown in bold from amongst all the reserved IP addresses.

r-10.130.61.160, r-10.130.61.161, r-10.130.61.162, r-10.130.61.163, r-10.130.61.169, r-10.130.61.168, r-10.130.61.165,
r-10.130.61.164, r-10.130.61.167, r-10.130.61.166, r-10.130.61.151, r-10.130.61.152, r-10.130.61.150, r-10.130.61.159,
r-10.130.61.158, r-10.130.61.157, r-10.130.61.156, r-10.130.61.155, r-10.130.61.154, r-10.130.61.153, r-10.130.61.180,
r-10.130.61.181, r-10.130.61.182, r-10.130.61.183, r-10.130.61.184, r-10.130.61.185, r-10.130.61.187, r-10.130.61.186,
r-10.130.61.189, r-10.130.61.188, a-10.130.61.254, a-10.130.61.253, a-10.130.61.255, r-10.130.61.10, r-10.130.61.11,
a-10.130.61.9, r-10.130.61.170, r-10.130.61.173, r-10.130.61.174, r-10.130.61.171, r-10.130.61.172, r-10.130.61.178,
. . . .

The path /orchestration/services names all the system services that run on the controller node 107, not those that run on physical nodes 102. They include services named nova, haproxy, pxe, dnspublic, glance, stats, rabbitmq, keystone, logging, novautils, dashboard, and mysql. For those services that are organized in a master-slave relationship, there must be an election to pick a leader. This is implemented using blackboard service 804 and the same recipe for selecting a leader, namely, the lowest numbered integer. FIG. 12E shows the path for two of the services dnspublic and mysql, each ending in the election component. Below that component in the path is another data object that corresponds to presence service 902 (in election mode) associated with an instance of that service.

In summary, the orchestration service instance on behalf of some controller node 107, physical node 102, or container 802 creates a corresponding configuration model as a data object in blackboard service 804 when that system component is created. This model is represented as a kind of dictionary that maps keys to values and is the state of the system component. It has a configuration portion that is static and unchanging, and has a dynamic component that may change during the lifetime of the service. When a presence service 902 instance in census mode registers its existence in the blackboard service, it creates an ephemeral data object corresponding to a controller node 107, container 802, or physical node 102. If that presence service 902 fails or the associated orchestration service instance fails (or the controller node 107, container 802, or physical node 102), then the data object will be automatically deleted in blackboard service 804. Since the state of that service has now changed, it is the job of the zone leader to determine what has changed by periodically inspecting the global system state and updating the corresponding models. It is the collection of orchestration service instances and the associated presence services 902 (in census mode or in election mode, or both), in conjunction with the zone leader, that maintains the global system state for a running distributed computing system. The global system state is a view into the "health" of the distributed computing system, enabling a whole host of actions, such as the following: potentially faster recovery from failures, isolating parts of the system that may be offering degraded performance, better capacity planning, and more effective use of system resources.

Failure Recovery

In one example embodiment, a distributed computing system copes with failures of a physical node 102, a controller node 107, or a service container 802 by detecting failures and by automatically restoring service functionality. The orchestration service instance functions may include keeping the system infrastructure running despite failures. A separate sub-component of the orchestration service operates to detect and report presence data by registering its controller node existence in the global state. Orchestration service controller nodes 107 periodically probe the shared blackboard service 804 to detect changes in the dynamic attributes of all service containers 802. In addition, an orchestration service zone controller node periodically inspects all controller nodes and physical nodes. Changes are detected by noting the presence or absence of the existence registration. When changes are detected, controller node 107 updates status information for the affected records in the shared blackboard service 804. If a problem occurs, action is taken appropriate to the affected service, such as restarting a service or electing a new master.

Failures may occur in the distributed computing system. However, due to the distributed nature, portions of the distributed computing system may continue to operate. That is, the distributed computing system may be partially operational and partially failed at the same time. As described above, controller node 107 includes containers 802 that isolate services 706 from other services 706 operating in other containers 802 on controller node 107. The containerization of services 706 is required as the software is designed to operate across machine boundaries. The distributed computing system expects dedicated file systems, process name space, and network stacks to be available for communication with other discrete components each with their own file system, network stack, and process name space. Each service 706 in a container 802 provides an aspect of the overall service being provided by the distributed computing system, but operates independently without sharing elements such that containers 802 may be easily replaced by another container 802 designed to perform the same service. Particular embodiments leverage this concept to recover from failures quickly.

Figure 13:
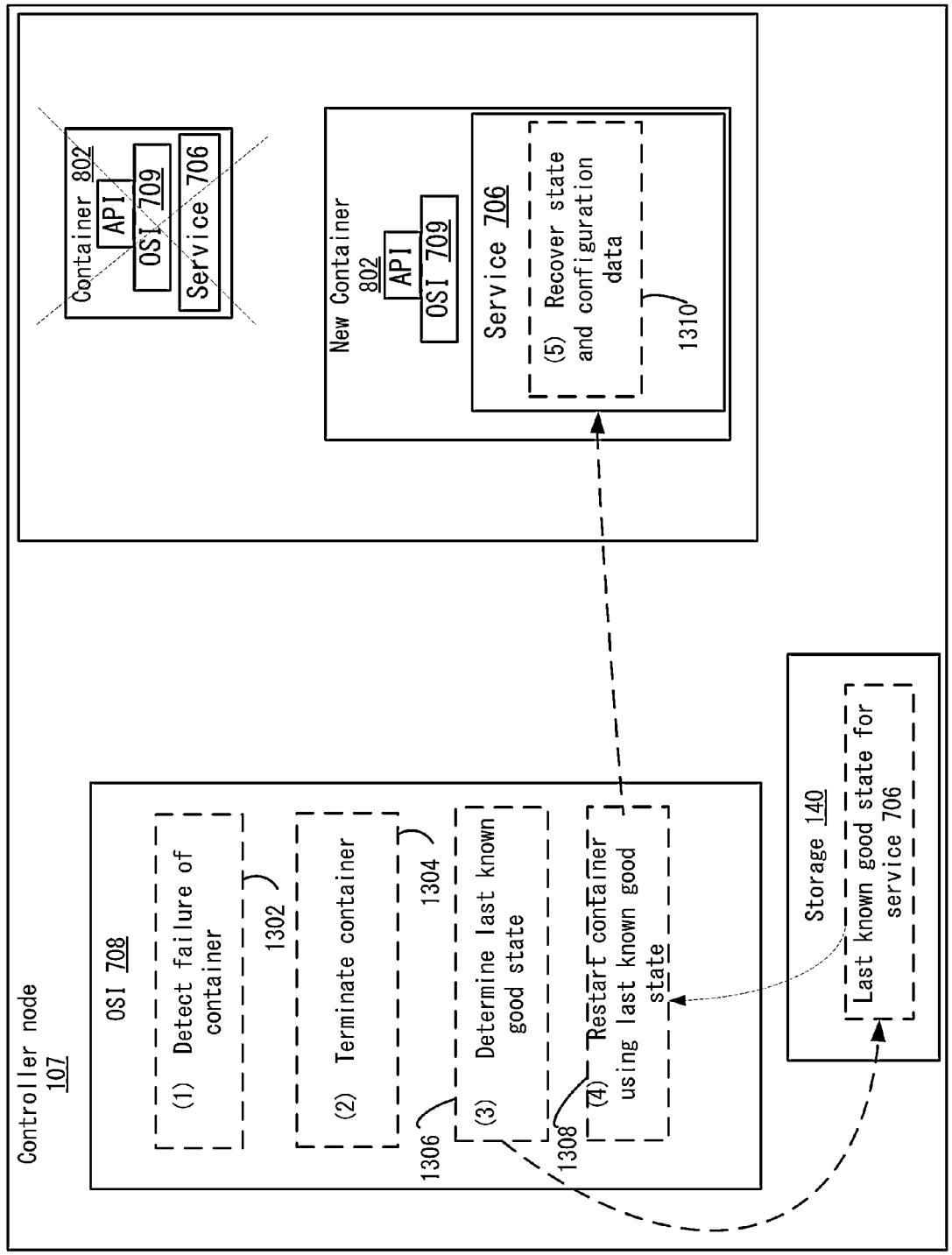
FIG. 13 depicts an example of a controller node for recovering from a failure according to one embodiment.

FIG. 13 depicts an example of a controller node 107 for recovering from a failure according to one embodiment. Orchestration service instance 708 is configured to manage containers 802 that operate on controller node 107 as described above. Container 802 includes orchestration service instance 709 and service 706. As discussed above, orchestration service instance 708 manages service 706. At some point, service 706 may fail, which may be a known or unknown failure. For example, an unknown failure is a failure in which a root cause cannot be determined or has not been predicted and accounted for previously such that the distributed computing system can recover according to a procedure defined specifically to address a known failure signature or state. A known failure may be where the root cause could be determined or has been previously defined such that the present failure matches a signature or profile of a known failure and thus may be acted on with specific knowledge as to the cause and effect of the known failure, such as by employing a specific remediation procedure designed to address the known cause or remedy the known effects. However, orchestration service instance 708 does not care if the failure is known or unknown. This is because orchestration service instance 708 does not troubleshoot the failure. Rather, orchestration service instance 708 determines a last-known good state and restarts a new container 802 with service 706 operating from the last-known good state.

In the process flow, in a step 1 (reference 1302), orchestration service instance 708 detects a failure of container 802. In one embodiment, orchestration service instance 708 may detect the failure by monitoring blackboard service 804. For example, as discussed above, presence service 902 may lose its session to blackboard service 804 when service 706 fails. This may cause the removal of state information for service 706 in blackboard service 804. Orchestration service instance 708 may detect the change in the status on blackboard service 804. In this case, service 706 in container 802 does not directly notify orchestration service instance 708 of the failure. This simplifies the communication of failures in the distributed computing system as orchestration service instance 708 can monitor from a central point whether failures are occurring.

In a step 2 (reference 1304), orchestration service instance 708 terminates service container 802. Instead of troubleshooting the failure and attempting to continue using service 706 in container 802, orchestration service instance 708 terminates the container. By not troubleshooting the failure, speed in recovering from the failure may be gained as will be discussed in more detail below.

In a step 3 (reference 1306), orchestration service instance 708 determines a last-known good state for service 706. For example, because operating system-level virtualization or containerization is used such that various services 706 are isolated from other services 706 and also other components, such as main computer 130, using process name space partitioning and independent or otherwise isolated network stacks, the last-known good state of service 706 can be determined. In one example, a copy on write scheme is used where a file system for container 802 is frozen and service 706 in container 802 operates from this frozen file system image, recording deviations from the frozen file system in the course of operating the service. The frozen file system may constitute the last known good state of service 706 and is a full image needed to restart the service from scratch. Since the changes have not been written to the known good state of service 706, orchestration service instance 708 can use this last-known good state with confidence that it will not fail.

In a step 4 (reference 1308), orchestration service instance 708 restarts a new service container 802 using the last known good state of service 706. New service container 802 includes orchestration service instance 708 and service 706. However, the differences from the file system of the last known good state have been discarded and service 706 in new service container 802 begins anew from the known good state. This may remove any problem that occurred while operating from the last known good state. This method of failure recovery is faster than recovering from the failure. Because of the isolation of services 706 in containers 802, orchestration service instance 708 can terminate a failed container 802 and restart a new container 802 very quickly.

In a step 5 (reference 1310), service 706 in new container 802 may recover state data and configuration data for service 706. The state data and configuration data may be found in blackboard service 804, persistent storage 140, or other local storage for container 802.

In a distributed computing system, failures are inevitable. However, due to the speed and knowledge that services 706 will be started from a known good state, the distributed computing system may reliably perform in light of failures. The failure recovery leverages operating system-level virtualization, storage of configuration and state data outside of container 802, using a copy-on-write approach for the file system of container 802 to recover from the failure and allow for a new container 802 to be used when a failure occurs. This allows the recovery from a failure from a broad array of known and unknown failures. The distributed computing system does not need to determine the failure state, the path of that state, and a remediation from the failure. Rather, the failure is recovered from by rapidly reverting to a known good state.

Entropy Generation

Figure 14:
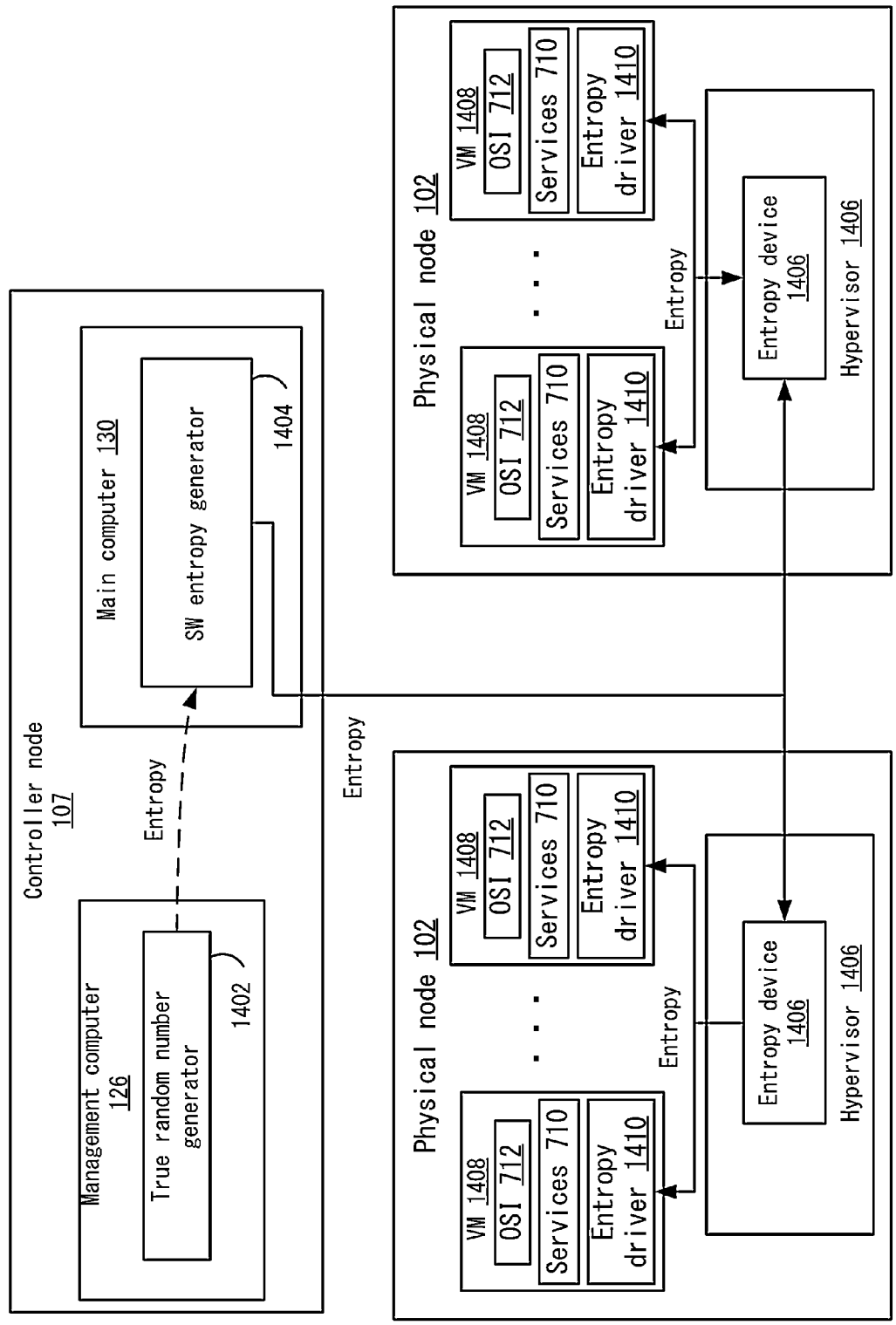
FIG. 14 depicts an example of providing entropy in the distributed computing system according to one embodiment.

FIG. 14 depicts an example of providing entropy in the distributed computing system according to one embodiment. The entropy may be a time-based finite resource. Applications, such as ciphers, rely on high-quality entropy to produce secure cryptographic results. Cryptographic software elements of operating systems in the distributed computing system rely on entropy to operate. Because the entropy is a finite resource, exhaustion of the entropy can result in significant software operational delays as the software elements have to wait to gather the needed entropy. In the distributed computing system, there may be limited sources of entropy and exhaustion may affect the operational performance of the distributed computing system. For example, due to the possible addition of entities in the distributed computing system, such as multiple new virtual machines may be started on physical nodes 102 to provide services 712, the providing of reliable and sufficient entropy is necessary. In one example, as multiple new virtual machine instances are started, cryptographic operations running within the virtual machines need entropy to generate cryptographic material for securing communications. When a large number of virtual machine instances are created concurrently, the virtual machine instances may compete for entropy and may suffer performance degradation when launching as the virtual machine instances wait for the needed entropy to complete the cryptographic operations.

Accordingly, particular embodiments provide high-quality entropy throughout the distributed computing system. In one embodiment, a true random number generator is used to generate entropy. The true random number generator generates random numbers from a physical process rather than from a computer program. The random numbers provided by the true random number generator may be completely unpredictable and thus reliable. The true random number generator may be a hardware random number generator.

As shown, management computer 126 includes a true random number generator 1402. True random number generator 1402 may be included in management computer 126 as an independent hardware platform separate and apart from main computer 130. True random number generator 1402 generates the random numbers as entropy in a time-based manner via a hardware process. Then, management computer 126 sends the entropy to main computer 130. Management computer 126 may communicate the entropy through a communication network using a protocol, such as transfer control protocol/internet protocol (TCP/IP), UNIX sockets, UNIX devices, or combinations thereof. Main computer 130 may communicate the combined entropy via a communication network through protocols as discussed above, such as through TCP/IP.

To provide additional entropy, a pseudo-random software entropy generator 1404 is used to add entropy to be combined with the entropy received from true random number generator 1402. By using the true random number generator and the software random number generator, a larger amount of entropy may be generated, but may be reliable in that the true random number generator is generating a part of the entropy. Other sources may also contribute to the entropy. In contrast to using just pseudo-random software entropy generator 1404, using true random number generator 1402 in management computer 126 provides more reliable entropy and more entropy than can be generated by pseudo-random software entropy generator 1404. That is, true random number generator 1402 may be able to generate entropy faster than pseudo-random software entropy generator 1404. Also, true random number generator 1402 generates higher quality and more reliable entropy than pseudo-random software entropy generator 1404 resulting in superior cryptographic functions. Further, hardware resources of main computer 130 do not need to be used to generate entropy when the hardware entropy is generated by management computer 126. Rather, as discussed above, main computer 130 operates containers 802 that include services 706, and services 706 control services 712 that are operating on physical nodes 102. Resources for these operations may not be used in using a hardware generator in main computer 130.

Main computer 130 then sends the entropy to physical nodes 102 in which controller node 107 is controlling. For example, physical nodes 102 may be located in the same rack as controller node 107. In other embodiments, main computer 130 may send the entropy to other physical nodes 102 in other racks.

Each physical node 102 may receive the entropy. For example, a hypervisor 1406 within physical node 102 may receive the entropy. Multiple virtual machines 1408 may be running on top of hypervisor 1406. Each virtual machine 1408 may be running a service 710 in addition to an orchestration service instance 712. Service 710 may require the entropy for performing certain operations, such as for cryptography operations.

To provide the entropy from hypervisor 1406 to virtual machine 1408, hypervisor 1406 may provide an emulated entropy device 1410. Emulated entropy device 1410 may be a virtual device that is stored in an address space. To read the entropy, virtual machine 1408 includes an entropy driver 1412 that knows the address where to read the entropy from entropy device 1410. When entropy is needed, entropy driver 1412 retrieves entropy from entropy device 1410. In this case, hypervisor 1406 may retrieve the entropy from main computer 130, present the entropy to entropy device 1410, and then entropy driver 1412 retrieves the entropy from entropy device 1410. The above process may be performed in each physical node 102 where a hypervisor 1406 provides entropy retrieved from main computer 130 of controller node 107 to virtual machines 1408. Due to the large amount of entropy provided using management computer 126 and main computer 130, it is possible to have a distributed computing environment that can on demand expand the number of virtual machines 1408 without exhausting the entropy. The use of true random number generator 1402 in management computer 126 allows the distributed computing system to generate the large amount of entropy.

The providing of a large amount of entropy is important in the distributed computing system because there is potential for great variance and demand for entropy. Some operational states of the distributed computing system may be so virtual machine turnover, that is, the creation and destruction of virtual machines 1408, while other states may see exceptionally high turnover. When high turnover results, the need for entropy may increase dramatically. The distributed computing system can handle the high turnover using the generation of entropy via true random number generator 1402 in management computer 126. The entropy provided via controller node 107 to physical nodes 102 allows the creation of virtual machines 1408 on physical nodes 102. By leveraging management computer 126 to generate the entropy, the number of components in the distributed computing system is reduced as physical nodes 102 do not need to generate entropy. There may be hundreds of physical nodes 102, and having each one have to have a true random number generator increases complexity. Instead, management computer 126 serves as a true random number generator for a collection of physical nodes 102 attached to a single controller node 107.

Example Service Specific Behavior

In one example embodiment, physical nodes 102 each of which exhibits a service-specific behavior or personality. These personalities are captured in function definitions, which in this example may be referred to as "melodies." The function definitions may manage the service configuration, monitor the health of the associated system service, controller or node, and/or react to changes in the health status, and cope with failures in the system, for example.

In certain example embodiments, each orchestration service instance 708, 709, and 712 is configured to be service-specific and is not just a single, monolithic entity. What functions a particular orchestration service instance 708, 709, and 712 might perform may depend on the associated system service. For example, the orchestration service instance 709 associated with a MySQL server service in a container 802 is configured to check the health of the MySQL server, elect a new master, periodically back up the database into a file, determine the virtual IP address of the MySQL Server, or initialize a new MySQL slave, among many other functions.

Service-specific behavior of an example orchestration service instance 708, 709, and 712 may be referred to as a "personality." For example, there may be a personality for the orchestration service instance 712 residing on a physical node 102, which is configured to manage the system services 710 on physical node 102, varying personalities for the orchestration service instance 708 residing in a container 802 that is specific to the system service 706, and there may be a personality for the orchestration service instance 708 running in a controller node 102. A controller node instance of an orchestration service instance 708 may have a very different personality from the orchestration service instance 709 in a container 802 and the orchestration service instance 712 on the physical node 102 because the controller node instance manages all the containers 802 for system services on controller node 802, for example.

Figure 15:
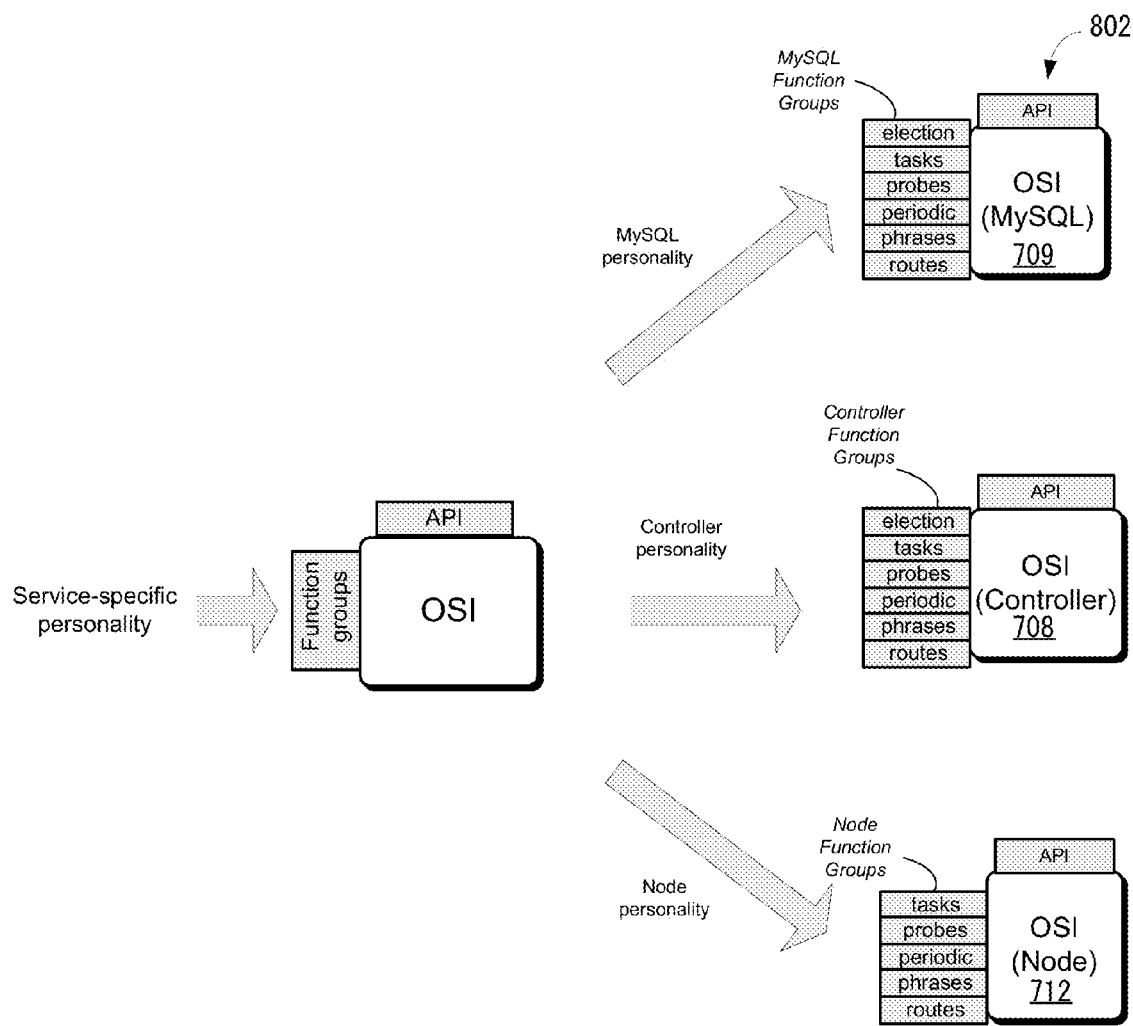
FIG. 15 shows some examples of an orchestration service instance configured with service specific personalities according to one embodiment.

In this example, orchestration service instances 708, 709, and 712 capture this notion of a personality in certain function definitions. Each orchestration service instance 708, 709, and 712 is configured at runtime with its specific personality by loading specific modules that correspond to a particular function definition. In one example implementation of the distributed computing system, these modules may be Python programs. In one example embodiment, there may be six such modules making up the function definition. FIG. 15 shows some examples of an orchestration service instance 708, 709, or 712 configured with service specific personalities according to one embodiment. The following are descriptions of example function definitions:

1. Phrases: A phrase is a recipe for the specific business logic for the service, such as installing a MySQL server in a container, obtaining the revocation status for a MySQL rack, or managing the MySQL rack.
2. Periodics: A periodic is a recurring task such as backing up a MySQL database every two minutes, or managing the MySQL rack every five minutes. A periodic may be specific to a system service.
3. Tasks: A task is typically a function performed by an orchestration service instance 708, 709, and 712 (e.g., in the background) and may be invoked from phrases or directly from routes. For example, in the MySQL service container 802, a common task is to install the service container by spitting up an instance of the MySQL server, or initializing a slave replica in a MySQL rack (such as when a new slave replica is created on the new controller that has joined the distributed computing zone).
4. Probes: A probe is typically a query to discover some status information about the service in question. As an example of a probe, in MySQL, the probe might ask which MySQL server replica has the floating (or virtual) IP address associated with it.
5. Routes: A route may be an endpoint (e.g., an API endpoint typically using the HTTP protocol) for accessing a function definition. For example, if a user wants to know the status of a presumably operational MySQL service container 802, particular embodiments invoke the "get_status" route against the API of the associated orchestration service instance, which may invoke the GET operation given a URL that describes the route.
6. Election: An election function group is configured only for those system services that are organized in a master-slave relationship, such as MySQL system service. Other system services, such as Identity or Compute, are organized as peers, and do not require an election. As described above, an election function definition comprises "elect" and "unelect" functions, which are called by the presence service in the present example.

Figure 16:
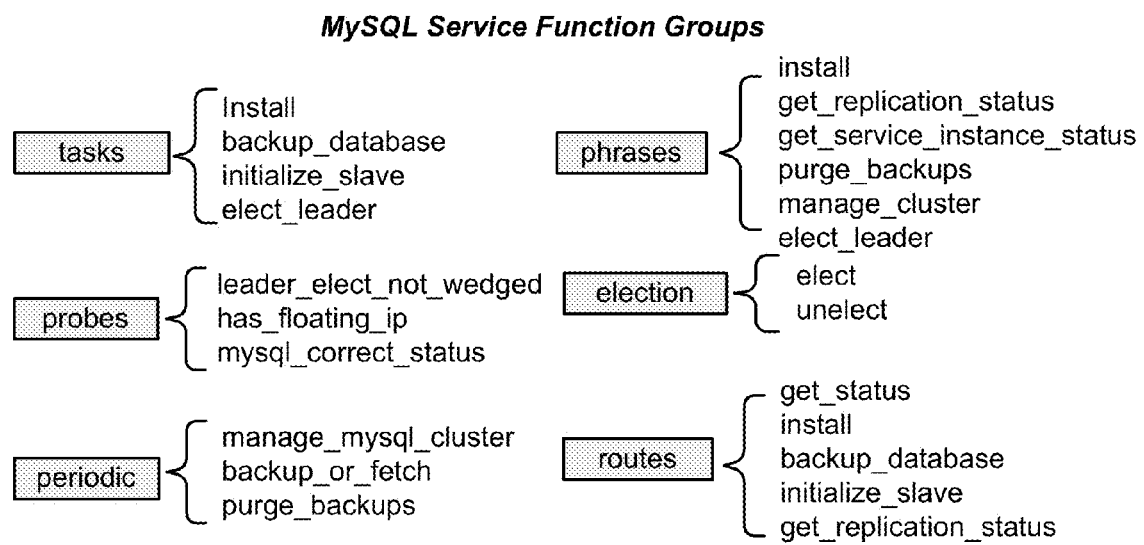
FIG. 16 shows an example of the MySQL function definition according to one embodiment.

FIG. 15 shows generically a "service-specific personality" feeding into an orchestration service instances 708, 709, and 712. This personality is incorporated into a function definition, as described above. For example, to obtain a MySQL personality for an orchestration service instance 709, controller node 107 loads the associated MySQL function definitions and configures the orchestration service instance 709. In this example, the election function definition is required because a MySQL rack is organized into a master with multiple slaves. The result is an orchestration service instance 709 specific to managing a MySQL server replica. FIG. 16 shows an example of the MySQL function definition according to one embodiment. As another example, to obtain the controller node personality for an orchestration service instance 708, controller node 107 loads the associated controller node function definitions and configures orchestration server instance 708 accordingly. Finally, as a third example, controller node 107 loads the physical node function definition into an orchestration service instance 712 to obtain the physical node personality.

Example Service Implementation

Figure 17:
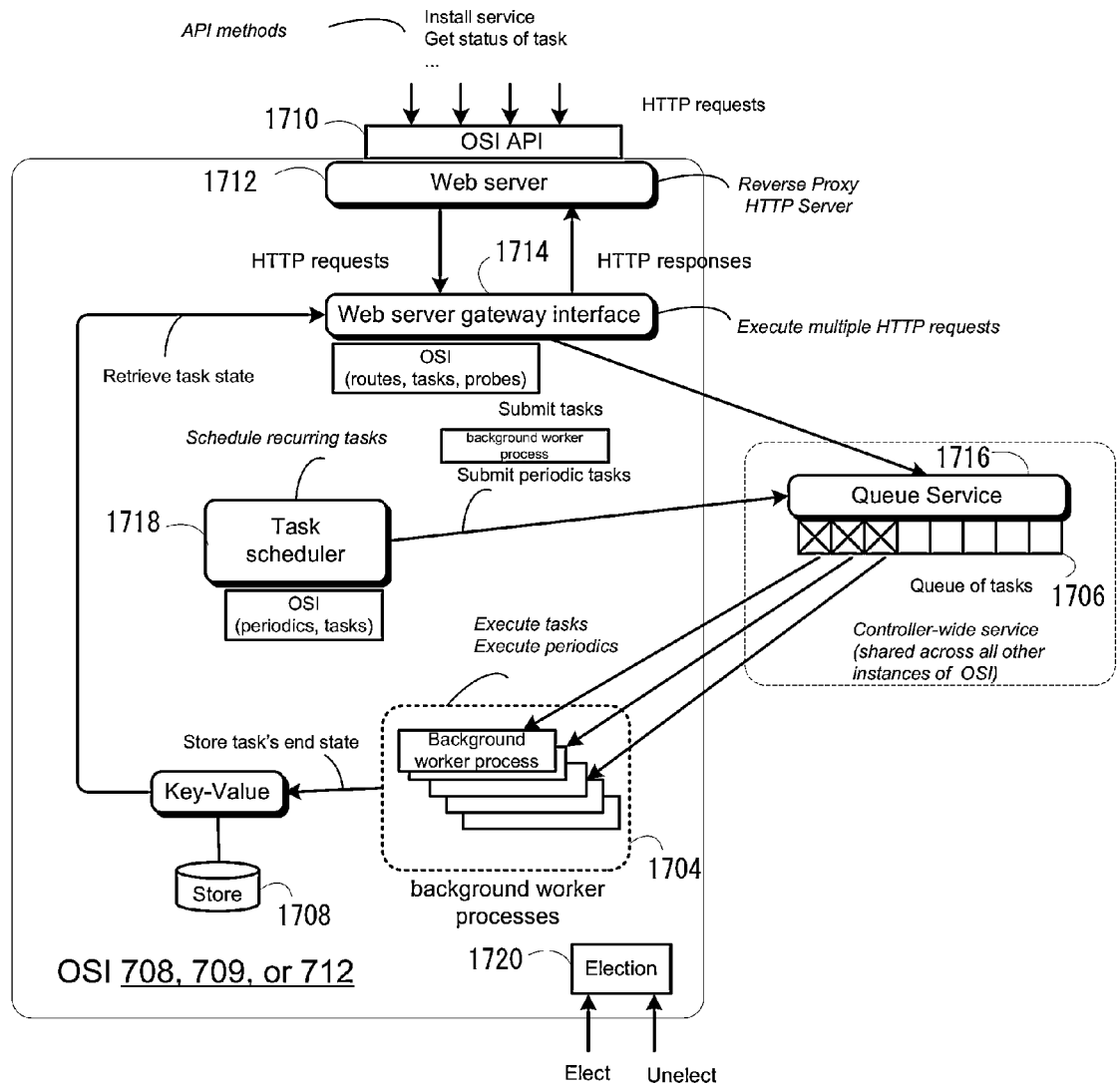
FIG. 17 illustrates the components that make up one implementation of the orchestration service instance according to one embodiment.

In one embodiment, the orchestration service is implemented as a large web-based application. FIG. 17 illustrates the components that make up one implementation of the orchestration service instance 708, 709, or 712 according to one embodiment. A front-end component 1702 fields all orchestration service API operations and may handle multiple, simultaneous operations. A backend component 1704 executes all background tasks and periodic tasks, drawn from a queue of tasks 1706 submitted by front-end component 1702. Since the end state results of background tasks and periodic tasks are typically transient, they are recorded on a persistent data store 1708 associated with the orchestration service instance. The present example orchestration service server instance is not a single component or even a single process, but a collection of processes that work in concert.

Front-end component 1702 includes an orchestration service API 1710 and two separate processes. The methods available on orchestration service API 1710 vary depending on whether the API fronts the orchestration service instance for a controller node 107, a container 802, or a physical node 102. There is a core set of methods common across controller nodes 107, containers 802, and physical nodes 102. For example, installing a system service 710 in a container 802 and retrieving the status of a task are examples of common methods not peculiar to a personality. FIG. 17 shows these two methods among others entering OSI API 1710. In this example, these methods are invoked using the HTTP protocol.

A first server 1712 may act as an HTTP server and reverse proxy server. The first server is one of the two separate processes making up the front-end. A reverse proxy server is a type of proxy server that retrieves resources on behalf of the client from one or more servers. These resources are then returned to the client as though they originated from the proxy server self. The idea of a reverse proxy is that it can hide the existence and the characteristics of the originating servers. The orchestration service API methods are, in this example, HTTP requests using a well-defined URL and HTTP operation such as put and get. A web server fields these HTTP requests and passes the requests onto the next layer. Any responses to these HTTP requests are returned to the client that invoked the API method, so the client is does not know that the method was actually executed by a collection of processes hiding behind the API.

A second management process is the second of the two separate processes making up the front end. Though a reverse proxy server fields orchestration service API methods as HTTP requests, it does not itself handle multiple simultaneous HTTP requests. The second management process may be a server that manages a dynamic set of worker processes that execute the individual HTTP requests and responses passed to it from a reverse proxy server. In this example, the second management process is implemented using web server gateway interface server 1714. The second management process may be the set of worker processes that can execute HTTP requests concurrently. Further, as part of an orchestration service instance, the web server gateway interface process 1714 is loaded with at least three of the components of a service-specific function group, which are the HTTP endpoints for orchestration service: routes, tasks, and probes. In the figure, this is shown as a box labeled "orchestration service (routes, tasks, probes)" under the web server gateway interface process 1714. Each HTTP request is not necessarily executed immediately. Some, like asking for the status of the system service may be executed immediately as a synchronous, or blocking call, since a timely answer is demanded. Others, like initializing a MySQL slave replica, are potentially time-consuming tasks, for which the client making the request may not have the patience to wait for such blocking invocations. These sorts of requests are usually executed asynchronously as background tasks. Though web server gateway interface 1714 can accommodate applications making long blocking calls or streaming requests and responses asynchronously, an orchestration service instance may instead employ a separate task queue 1706. In one example implementation, each task is a program written in Python. The web server gateway interface process 1714 submits the HTTP requests as individual tasks to a task queue service 1716.

Task queue service 1716 is a message broker. It accepts and forwards messages (e.g., as a post office eventually delivers mail to a recipient on behalf of a sender). Each task submitted to the message broker from the web server gateway interface 1714 process is assigned a unique task ID and queued for eventual execution. Task queue service 1716 does not execute any of the submitted tasks, instead, that function is assigned to a background worker process. Task queue 1706 is shared across all other orchestration service instances running on a controller node 107, that is, it is a controller-wide service. Since any task can originate from any controller node or any container 802, each task must be uniquely identified across all controller nodes 107 and all containers 802 to avoid conflicts in naming a task. The task ID may be a 128-bit UUID, which is highly likely to be unique (and not clash with other UUIDs) across all controller nodes 107 over a long period of time. The tasks stored in the task queue 1706 may not be persistent; therefore, the tasks may not survive failure of either the task queue process itself or the controller node 107. Clients may need to reissue their API operations when the task queue returns to service.

The other part of the task queue service 1716 is implemented by worker processes each of which may be run in the background. Background workers comprise a set of worker processes, each of which is usually a daemon run in the background. Each worker process dequeues the next task from the task queue and operates on it. This is shown in the figure by the "background worker processes" 1704 operating on the first three tasks in the queue. Other than reporting success or failure, a worker process may record any end state results of the task in a persistent store 1708 such as a key-value store. There is a single persistent storage server process for each orchestration service instance. Each end state result for an executed task is associated with a task ID such as [taskID, endState]. As long as the task ID is known the end state results can be retrieved given the task ID, as can be seen in FIG. 17 where one of the core set of orchestration service API methods is obtaining the status of a task. In this example, the only data that is persistent is the end state result of an executed task. The data manipulated in memory by a worker process executing a task is not persistent; if the process fails before it has completed executing the task then any data it was operating on may be lost and presumably the uncompleted task has no effect on the state of the system. The task may need to be resubmitted by the client.

Some embodiments may process a recurring task, for example, a task that must be executed every two minutes. To implement recurring tasks, a time-based task scheduler 1718 executes jobs (commands or shell scripts) to run periodically at certain times or dates (e.g., similar to cron in UNIX-like computer operating systems). This example includes another independent process that kicks off tasks at regular intervals, which are not executed directly by the background worker processes, but first are submitted as tasks to the task queue service 1716 and thereafter are treated just like any other task that has been enqueued. There may be one such process per orchestration service instance, for example. The scheduled tasks may be defined in the periodics and tasks of the associated function group for the system service. An example of a periodic comes from MySQL where each MySQL server replica is either backed up via a dump or has fetched a backup from the master.

Finally, another purpose of a function group is the "election," which is mandatory in this example implementation for all system services organized in a master-slave configuration and optional for all other system services. When the associated presence service process discovers that a master for some system service has failed—it determines failure when the ephemeral node it was watching is no longer present in blackboard service 804—it "elects" a new master by invoking the elect method of the election function group associated with the orchestration service instance. There is a corresponding unelect method in the function group. These two methods are shown in an election process 1720, which corresponds to the election in the function group. The election process includes the "elect" path and the "unelect" path. The election may use a backdoor to an orchestration service instance. In this example, the "election" part of a function group directly executes the elect and unelect functions.

Note that presence service 902 does not itself elect a new master, but merely informs the associated orchestration service instance that it should schedule the election of a new master. The orchestration service instance code delegates leader election to the blackboard service 804; the blackboard service 804 already provides a recipe to correctly implement leader election, ensure that a leader will be elected and ensure that there will be exactly one leader. In addition, the elect method may also perform some service-specific functions when the election complete such as clean up and initialization or, in the case of MySQL, asserting its mastership and reconfiguring other replicas to be slaves.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   detecting a failure of a container, of a set of containers, in a controller node, the container executing a service being performed and isolated from at least one other service being performed in at least one other container on the controller node;
   terminating, by the controller node, the container executing the service;
   determining, by the controller node, a particular known state for the service, wherein the particular known state is known to be operational without including one or more changes that caused the failure, and wherein the service saves the changes to the particular known state during operation separately from the particular known state;
   restarting, by the controller node, the service in a new container that replaces the terminated container, wherein the restarted service starts from the particular known state without using the changes;
   wherein an orchestration service, configured to manage the set of containers, detects the failure;
   wherein the orchestration service detects the failure via monitoring a communication service in which a status of the service is input; and
   wherein the method is performed by at least one device including a hardware processor.

2. The method of claim 1, wherein the particular known state comprises a full image of the service required to start the service from the new container.

3. The method of claim 1, wherein the failure of the container is not resolved.

4. The method of claim 1, wherein detecting comprises:
   determining from a communication service that a presence of the service has been lost; and
   determining the failure based on the presence being lost.

5. The method of claim 1, wherein restarting comprises:
   restarting an orchestration service instance that manages the service in the new container.

6. A method comprising:
   detecting a failure of a container, of a set of containers, in a controller node, the container executing a service being performed and isolated from at least one other service being performed in at least one other container on the controller node;
   terminating, by the controller node, the container executing the service;
   determining, by the controller node, a particular known state for the service, wherein the particular known state is known to be operational without including one or more changes that caused the failure, and wherein the service saves the changes to the particular known state during operation separately from the particular known state;
   restarting, by the controller node, the service in a new container that replaces the terminated container, wherein the restarted service starts from the particular known state without using the changes;
   upon restarting with the particular known state, determining, by the service, configuration data or state data for the service from storage; and
   wherein the method is performed by at least one device including a hardware processor.

7. A method comprising:
   detecting a failure of a container, of a set of containers, in a controller node, the container executing a service being performed and isolated from at least one other service being performed in at least one other container on the controller node;
   terminating, by the controller node, the container executing the service;
   determining, by the controller node, a particular known state for the service, wherein the particular known state is known to be operational without including one or more changes that caused the failure, and wherein the service saves the changes to the particular known state during operation separately from the particular known state;
   restarting, by the controller node, the service in a new container that replaces the terminated container, wherein the restarted service starts from the particular known state without using the changes;
   wherein:
      the particular known state is included in a file system,
      the service with the failure records differences to the file system without changing the file system,
      the changes are not used in restarting the service in the new container, and
      the method is performed by at least one device including a hardware processor.

8. A system comprising:
   at least one device including a hardware processor;
   the system being configured to perform operations comprising:
      detecting a failure of a container, in a set of containers, in a controller node, the container executing a service being performed and isolated from at least one other service being performed in at least one other container on the controller node;
      terminating, by the controller node, the container executing the service;
      determining, by the controller node, a particular known state for the service, wherein the particular known state is known to be operational without including one or more changes that caused the failure, and wherein the service saves the changes to the particular known state during operation separately from the particular known state;
      restarting, by the controller node, the service in a new container that replaces the terminated container, wherein the restarted service starts from the known state without using the changes; and
   wherein an orchestration service, configured to manage the set of containers, detects the failure;
   wherein the orchestration service detects the failure via monitoring a communication service in which a status of the service is input.

9. The system of claim 8, wherein the particular known state comprises a full image of the service required to start the service from the new container.

10. The system of claim 8, wherein the failure of the container is not resolved.

11. The system of claim 8, wherein detecting comprises:
determining from a communication service that a presence of the service has been lost; and
determining the failure based on the presence being lost.

12. The system of claim 8, wherein restarting comprises:
restarting an orchestration service instance that manages the service in the new container.

13. A system comprising:
at least one device including a hardware processor;
The system being configured to perform operations comprising:
detecting a failure of a container, in a set of containers, in a controller node, the container executing a service being performed and isolated from at least one other service being performed in at least one other container on the controller node;
terminating, by the controller node, the container executing the service;
determining, by the controller node, a particular known state for the service, wherein the particular known state is known to be operational without including one or more changes that caused the failure, and wherein the service saves the changes to the particular known state during operation separately from the particular known state;
restarting, by the controller node, the service in a new container that replaces the terminated container, wherein the restarted service starts from the particular known state without using the changes; and
upon restarting with the particular known state, determining, by the service, configuration data or state data for the service from storage.

14. A system comprising:
at least one device including a hardware processor;
the system being configured to perform operations comprising:
detecting a failure of a container, in a set of containers, in a controller node, the container executing a service being performed and isolated from at least one other service being performed in at least one other container on the controller node;
terminating, by the controller node, the container executing the service;
determining, by the controller node, a particular known state for the service, wherein the particular known state is known to be operational without including one or more changes that caused the failure, and wherein the service saves the changes to the particular known state during operation separately from the particular known state;
restarting, by the controller node, the service in a new container that replaces the terminated container, wherein the restarted service starts from the particular known state without using the changes;
wherein:
the particular known state is included in a file system,
the service with the failure records differences to the file system without changing the file system, and
the changes are not used in restarting the service in the new container.

15. A non-transitory computer-readable storage medium containing instructions, that when executed, control a computer system to be configured for:
detecting a failure of a container, in a set of containers, in a controller node, the container executing a service being performed and isolated from at least one other service being performed in at least one other container on the controller node;
terminating, by the controller node, the container executing the service;
determining, by the controller node, a particular known state for the service, wherein the particular known state is known to be operational without including one or more changes that caused the failure, and wherein the service saves changes to the particular known state during operation separately from the particular known state;
restarting, by the controller node, the service in a new container that replaces the terminated container, wherein the restarted service starts from the particular known state without using the changes; and
wherein an orchestration service, configured to manage the set of containers, detects the failure;
wherein the orchestration service detects the failure via monitoring a communication service in which a status of the service is input.

16. The non-transitory computer-readable storage medium of claim 15, wherein the particular known state comprises a full image of the service required to start the service from the new container.

* * * * *